Sept. 22, 1959   E. H. SONNANSTINE, JR   2,905,244
RECORDING DEVICES

Filed Feb. 23, 1956   24 Sheets-Sheet 1

INVENTOR
EDGAR H. SONNANSTINE, JR.
BY
HIS ATTORNEYS

Sept. 22, 1959  E. H. SONNANSTINE, JR  2,905,244
RECORDING DEVICES
Filed Feb. 23, 1956  24 Sheets-Sheet 2

INVENTOR
EDGAR H. SONNANSTINE, JR.
BY
HIS ATTORNEYS

Sept. 22, 1959    E. H. SONNANSTINE, JR    2,905,244
RECORDING DEVICES
Filed Feb. 23, 1956    24 Sheets-Sheet 3
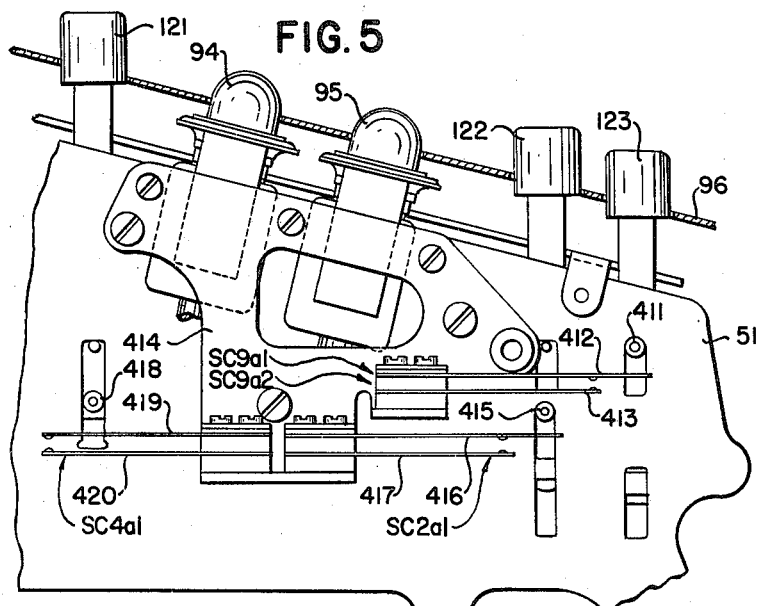
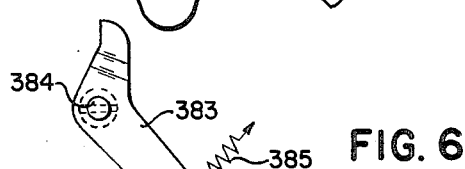
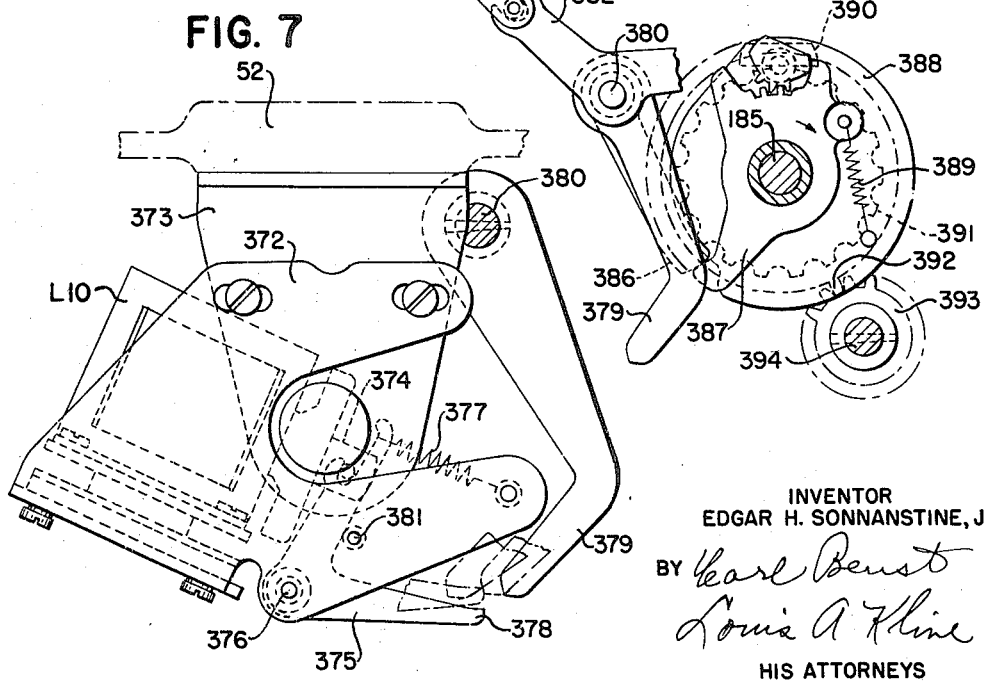
INVENTOR
EDGAR H. SONNANSTINE, JR.
BY Carl Benst
Louis A. Kline
HIS ATTORNEYS

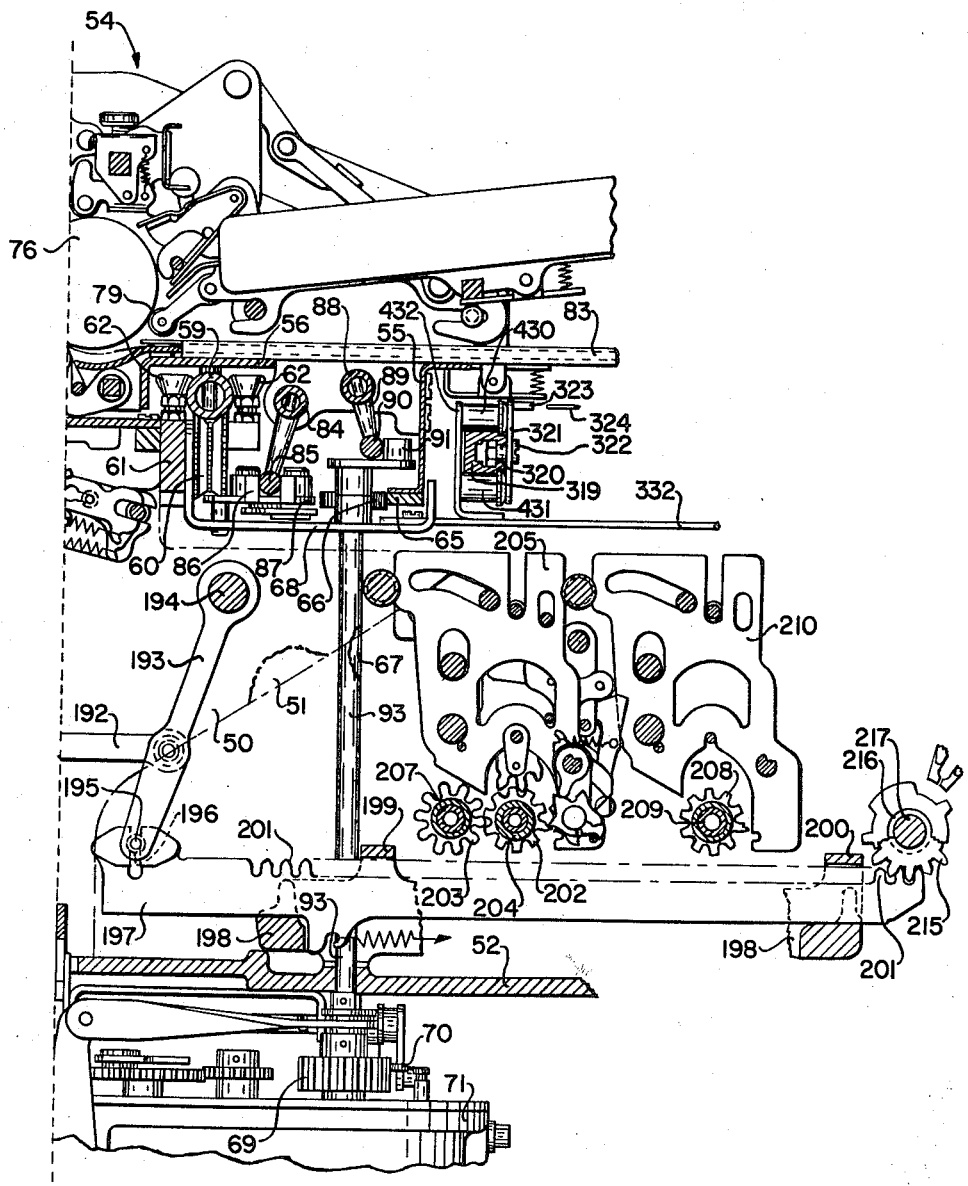

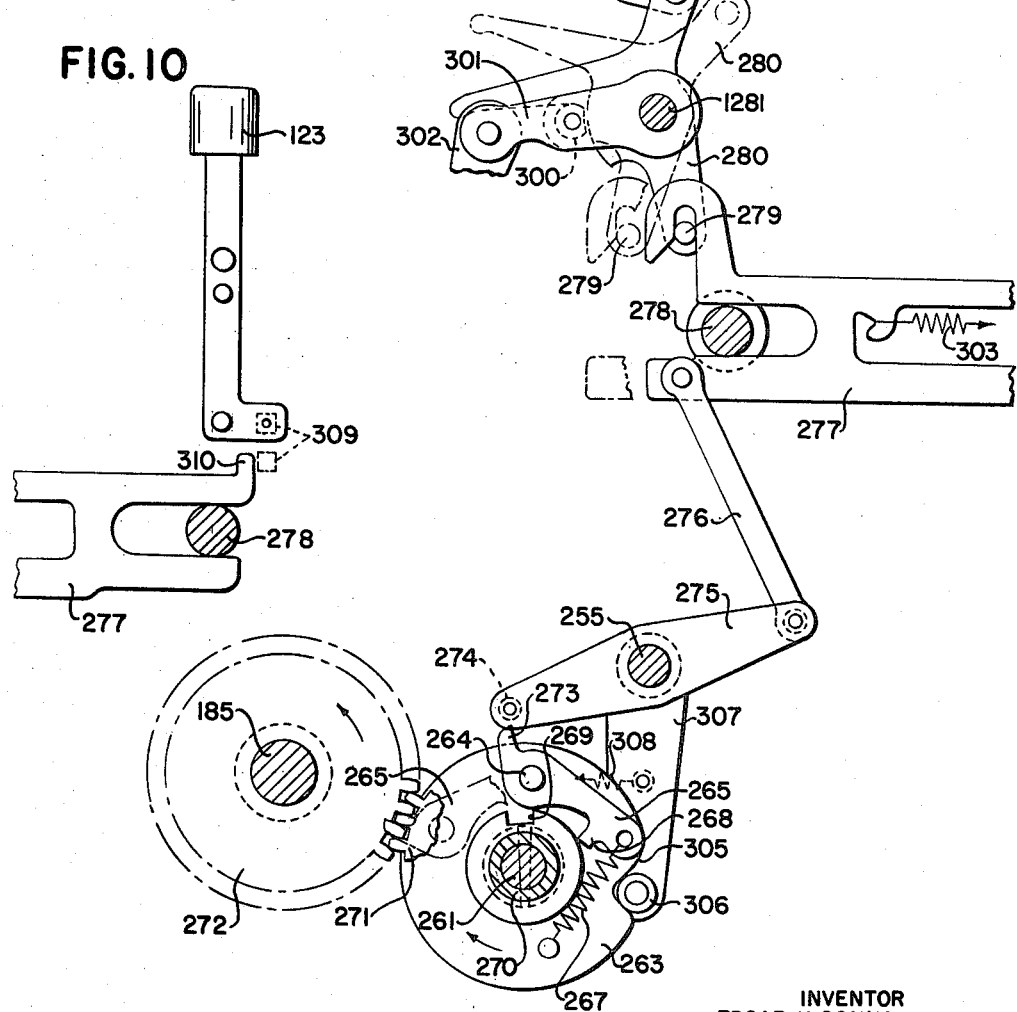

Sept. 22, 1959    E. H. SONNANSTINE, JR    2,905,244
RECORDING DEVICES
Filed Feb. 23, 1956    24 Sheets-Sheet 7

INVENTOR
EDGAR H. SONNANSTINE, JR.
BY
HIS ATTORNEYS

Sept. 22, 1959 E. H. SONNANSTINE, JR 2,905,244
RECORDING DEVICES
Filed Feb. 23, 1956 24 Sheets-Sheet 8

INVENTOR
EDGAR H. SONNANSTINE, JR
BY Carl Beust
Louis A. Kline
HIS ATTORNEYS

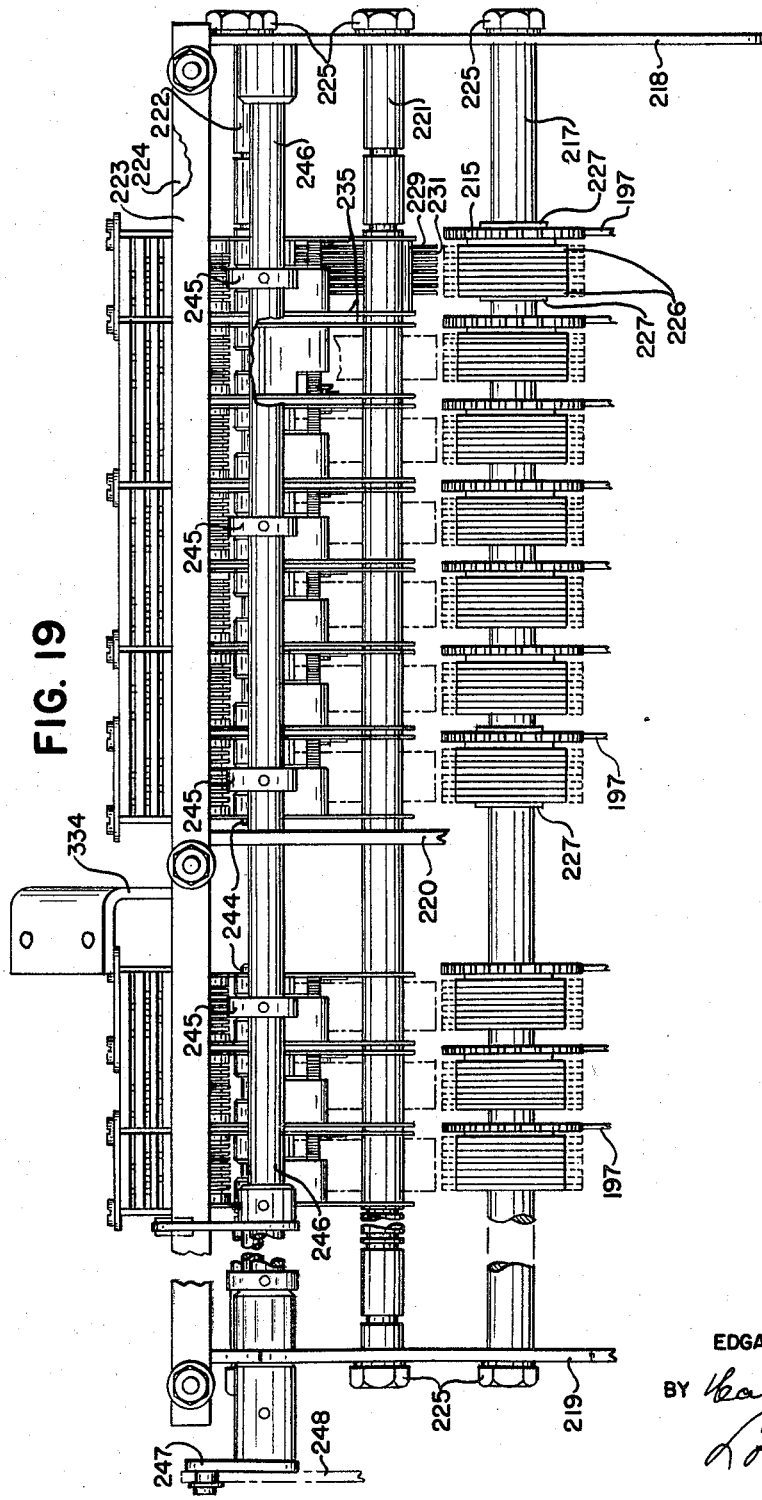

Sept. 22, 1959     E. H. SONNANSTINE, JR     2,905,244
RECORDING DEVICES
Filed Feb. 23, 1956     24 Sheets-Sheet 10
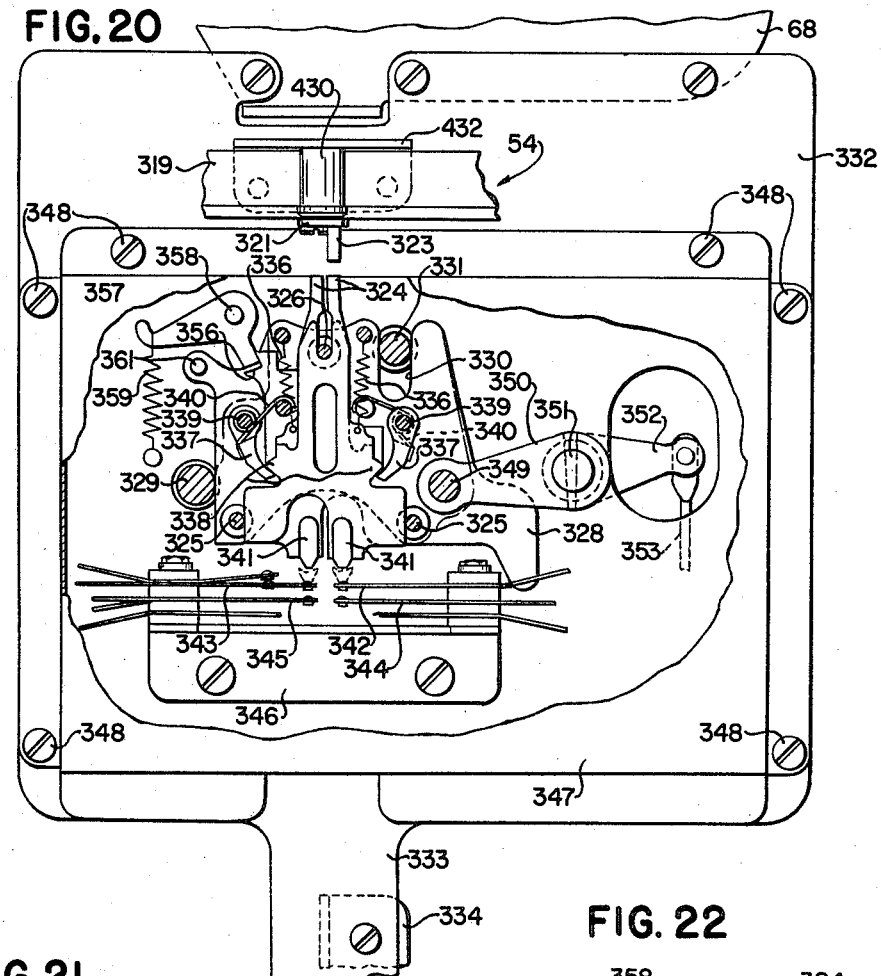
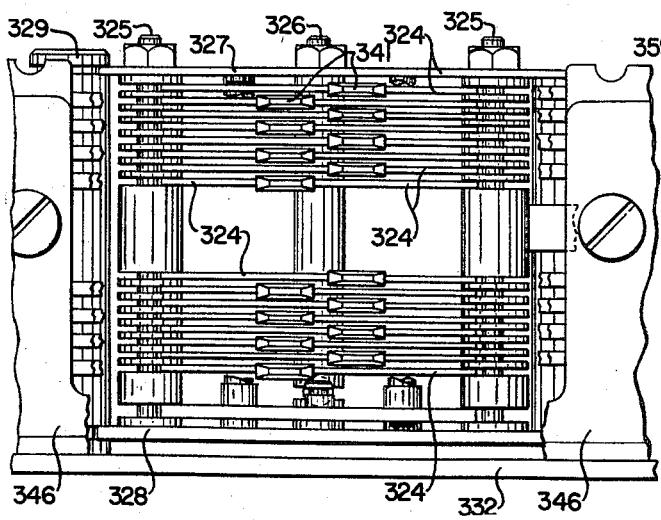
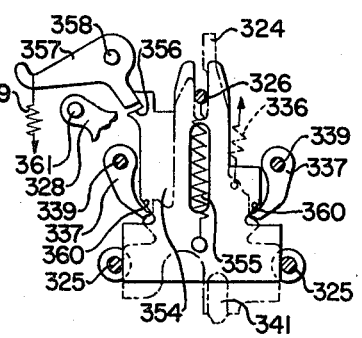
INVENTOR
EDGAR H. SONNANSTINE, JR.
BY
HIS ATTORNEYS Sept. 22, 1959   E. H. SONNANSTINE, JR   2,905,244
RECORDING DEVICES
Filed Feb. 23, 1956   24 Sheets-Sheet 11

INVENTOR
EDGAR H. SONNANSTINE, JR.
BY
HIS ATTORNEYS

Sept. 22, 1959 E. H. SONNANSTINE, JR 2,905,244
RECORDING DEVICES
Filed Feb. 23, 1956 24 Sheets-Sheet 12
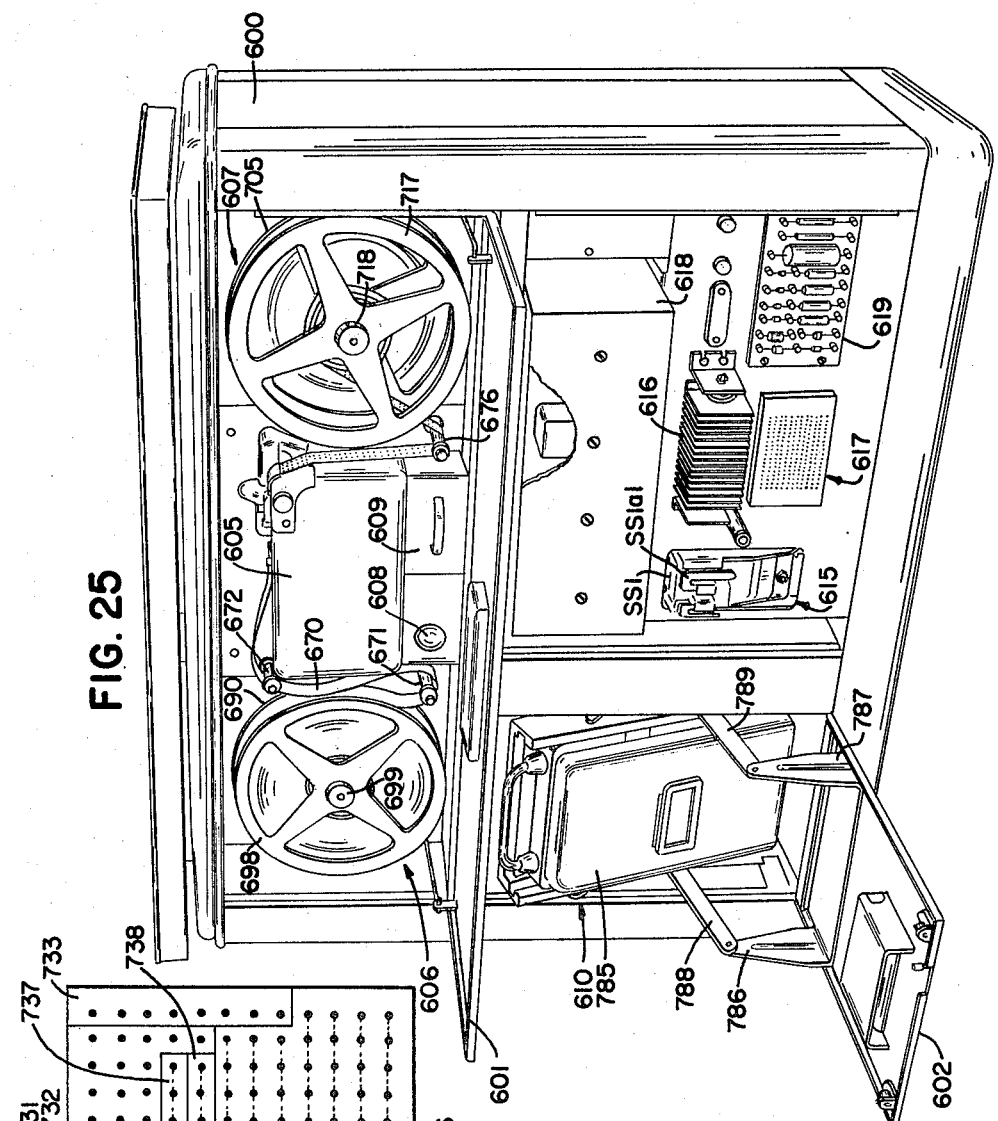
INVENTOR
EDGAR H. SONNANSTINE JR.
BY
HIS ATTORNEYS

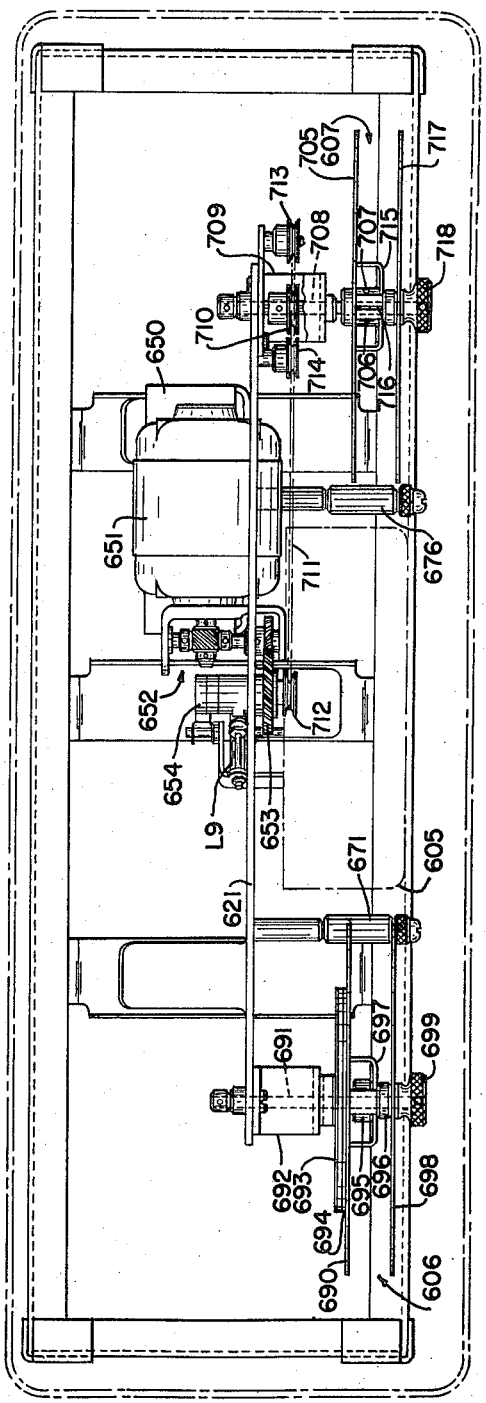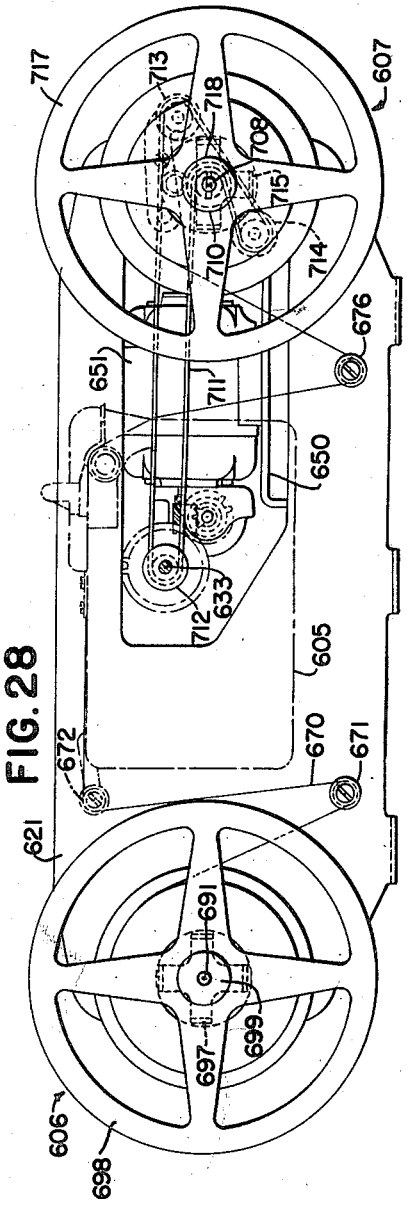

Sept. 22, 1959  E. H. SONNANSTINE, JR  2,905,244
RECORDING DEVICES

Filed Feb. 23, 1956  24 Sheets-Sheet 14

INVENTOR
EDGAR H. SONNANSTINE JR.
BY *Pearl Beust*
*Louis A. Kline*
HIS ATTORNEYS Sept. 22, 1959 E. H. SONNANSTINE, JR 2,905,244
RECORDING DEVICES
Filed Feb. 23, 1956 24 Sheets-Sheet 15

INVENTOR
EDGAR H. SONNANSTINE JR.
BY
HIS ATTORNEYS

Sept. 22, 1959　　　E. H. SONNANSTINE, JR　　　2,905,244
RECORDING DEVICES
Filed Feb. 23, 1956　　　　　　　　　　　　24 Sheets-Sheet 18

INVENTOR
EDGAR H. SONNANSTINE JR.
BY
HIS ATTORNEYS

Sept. 22, 1959  E. H. SONNANSTINE, JR  2,905,244
RECORDING DEVICES
Filed Feb. 23, 1956  24 Sheets-Sheet 19

JOHN DOE INC.

SOLD TO
RICHARD ROE AND CO.
123 MAIN STREET
ANYTOWN, OHIO

④ (ADD 3)  ⑥ (ADD 4)  ⑨ DATE  ⑪ ⑬ (ADD 5)
CUSTOMER  BRANCH  SALESMAN  OCT 9, 45  INVOICE NO.
2384  10  03  125785

| QUANTITY | ITEM NO. | DESCRIPTION | UNIT PRICE | EXTENSION | DISCOUNT | AMOUNT | TOTAL |
|---|---|---|---|---|---|---|---|
| ③ | ⑤ | | ⑦ | ⑧ | ⑩ | ⑫ | ⑭ |
| 32 | 10482 | ABC ASSEMBLY | 8.50 | 272.00 | | 272.00 T | |
| 10 | 14368 | RIM STOP CLAMP | 1.76 | 17.60 | 5.50 | 12.10 T | |
| ® | | | | (ADD 8) | (SUBTRACT) | (TOTAL 8) | 284.10 S |
| | | | | | 8 ® | (ADD-1) (ADD-6) ® | (SUB-TOT 6) (ADD-2) |

(INVOICE)

(COPY)

(JOURNAL)

① (NON PRINT CUSTOMER NUMBER) (SUB TOT 3) ®

② (NON PRINT BRANCH SALESMAN NO) (SUB TOT 4) ®

INVENTOR
EDGAR H. SONNANSTINE, JR.
BY *Earl Beust*
*Louis A. Kline*
HIS ATTORNEYS Sept. 22, 1959   E. H. SONNANSTINE, JR   2,905,244
RECORDING DEVICES
Filed Feb. 23, 1956                       24 Sheets-Sheet 20

FIG. 35B (JOURNAL)
(LEDGER)
(STATEMENT)

2384                    .04
ACCT. NO.        STATEMENT NO.

TO RICHARD ROE CO.
   123 MAIN ST.
   ANYTOWN, OHIO

DATE
                                          OCT. 12, 45

| ACCT. NO | DATE | REFERENCE | MEMO | CHARGE | CREDIT | PREV. BAL. | BALANCE | PROOF |
|---|---|---|---|---|---|---|---|---|
| 2384 | SEPT 2, 45 | 119867 | | 197.75 T | | | 197.75 T | .00 T |
| 2384 | OCT 1, 45 | | | | 200 | 197.75 △ | 2.25 CR. | .00 T |
| 2384 | OCT. 9, 45 | 125785 | | 284.10 | | 2.25 ◇ | 281.85 T | .00 T |
| | | ⑰ (TOTAL 5) | | ⑲ (TOTAL 6)(SUBTRACT 2) | ⑳ | ㉑ (SUBTRACT 2) | ㉒ (TOTAL 1) | ㉓ (TOTAL 2) |
| ⑮ (TOTAL 3) | | | | | | | | 197.75 2.25 ㉔ (ADD 1)(ADD 2) |
| (TOTAL 4)(NON PRINT) | | | | | | | | |

INVENTOR
EDGAR H. SONNANSTINE, JR.
BY *Pearl Beust*
   *Louis A. Kline*
HIS ATTORNEYS

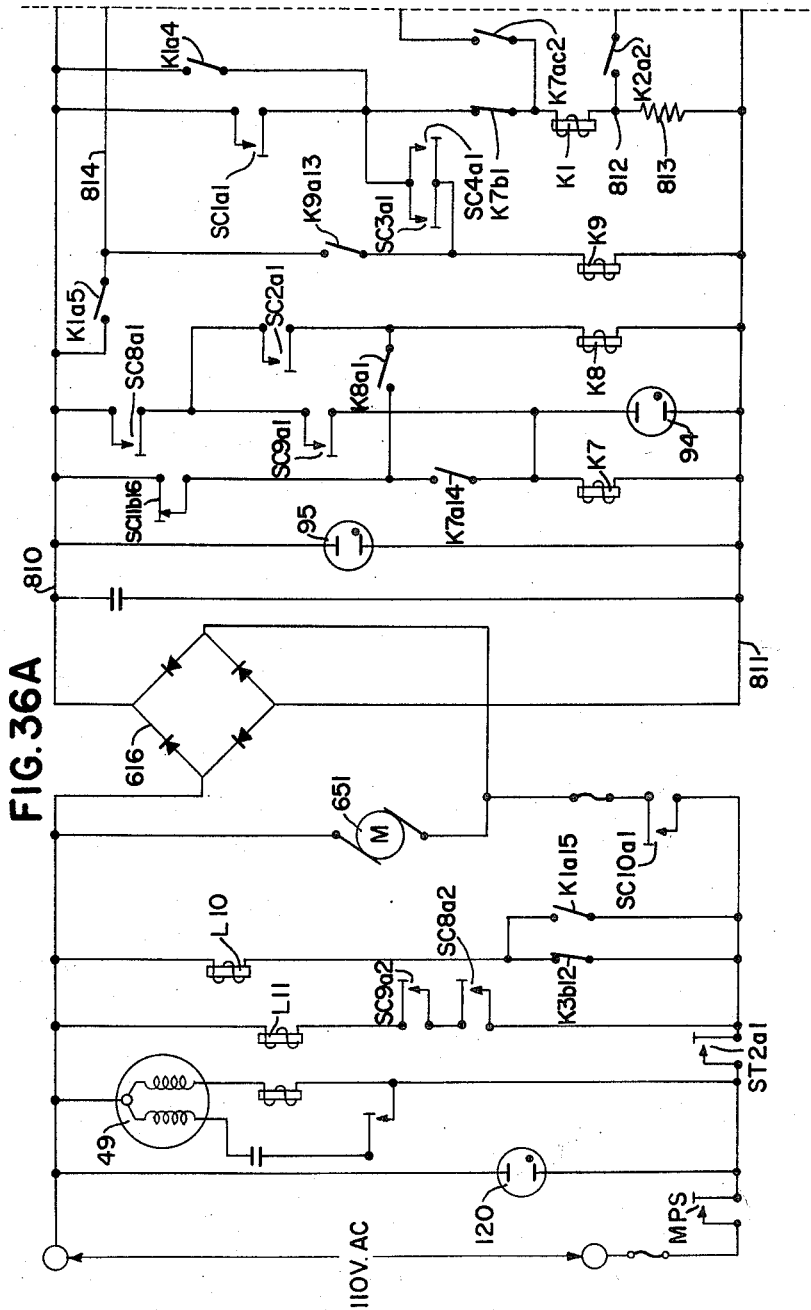

Sept. 22, 1959     E. H. SONNANSTINE, JR     2,905,244
RECORDING DEVICES
Filed Feb. 23, 1956     24 Sheets-Sheet 22

INVENTOR
EDGAR H. SONNANSTINE JR.
BY
HIS ATTORNEYS

Sept. 22, 1959  E. H. SONNANSTINE, JR  2,905,244
RECORDING DEVICES
Filed Feb. 23, 1956  24 Sheets-Sheet 23

INVENTOR
EDGAR H. SONNANSTINE JR.
BY Karl Beust
Louis A. Kline
HIS ATTORNEYS

Sept. 22, 1959  E. H. SONNANSTINE, JR  2,905,244
RECORDING DEVICES

Filed Feb. 23, 1956  24 Sheets-Sheet 24

INVENTOR
EDGAR H. SONNANSTINE JR.
BY Earl Beust
Louis A. Kline
HIS ATTORNEYS

United States Patent Office 2,905,244
Patented Sept. 22, 1959

2,905,244

RECORDING DEVICES

Edgar H. Sonnanstine, Jr., West Carrollton, Ohio, assignor to The National Cash Register Company, Dayton, Ohio, a corporation of Maryland Application February 23, 1956, Serial No. 567,411

16 Claims. (Cl. 164—113)

This invention relates to a novel data recording apparatus and particularly relates to an extremely flexible recorder which can be controlled to punch data under control of a data-entry machine.

In the embodiment which will be described to illustrate the invention, the data-entry machine is an accounting machine of the type having a laterally movable paper carriage. This machine operates in its usual manner to perform desired accounting procedures and to prepare printed records and, in addition, is capable of controlling the recorder to punch a tape with corresponding data as required.

The novel recorder is provided with a punching mechanism of the step by step type for punching data on a tape and is provided with program forming means which is capable of very flexible programming of the step-by-step operation of the punching mechanism to punch "frames" of related data on the tape as an incident to the operation of the accounting machine. Each "frame" of data will utilize only the number of program steps actually necessary to punch the necessary information, up to a maximum of one hundred and two steps in the disclosed embodiment, and can be built up of from one to fifteen "segments" or sub-programs which are related to different carriage positions. The "segments" making up the "frame" are not necessarily of uniform length but rather are made up of only the number of program steps required for punching the particular bit of information. Each "segment" is made up of a Start control which is identified with a particular carriage position, punching controls for the number of steps required to punch the data and a Halt control which terminates the punching of the "segment" of data.

The programming of each "frame" is serial in that the required number of "segments" to be included in the "frame" are programmed one after another in sequence corresponding to the several positions which the carriage will occupy in the several accounting machine operations necessary to provide the data for the "frame" of information to be punched in the tape. With this type of programming it is not necessary to have "segments" of uniform length nor is it necessary to reset the program controls after each "segment" or sub-program has been punched, the Start controls for the next "segment" being programmed to follow the Halt control for the preceding "segment" and the resetting of the program controls taking place only after the last "segment" of the "frame" has been punched in the tape.

The program forming means includes an insertable form board which contains the necessary connections for setting up any particular punching program. When properly in place in the recorder, it will control the operation of the recorder to cause it to punch the required "frame" of information.

The accounting machine is provided with various controlling means for controlling the recorder to punch selected data on the tape as an incident to the operation of the accounting machine. One of the controlling means consists of amount storage and read-out switches which are set by the differential mechanism of the accounting machine to store the data and to provide the controls for the punching of the data as required in a punching program of the recorder.

Other control means in the accounting machine consist of additional control switches to control the operation of the recorder according to the type of operation of the accounting machine when such a control is necessary.

A further control of the recorder is obtained from the paper carriage of the accounting machine, which carriage is provided with program selecting control stops on a bar at the rear of the carriage. These stops control the closing and opening of carriage position switches which cooperate with the program forming means in the recorder to control the selection of the proper programs in various positions of the carriage and to provide other desirable controls.

The usual control stops on the stop bar at the front of the accounting machine carriage are provided with means to cause an initiation of an operation of the recorder to be effected in conjunction with an operation of the accounting machine when the carriage is in predetermined positions.

The accounting machine and recorder are provided with interrelated controls to cause a Skip symbol to be punched in the tape if the accounting machine is not operated when the carriage is in a position which would normally call for the recording of a "segment" of the "frame," but moves to the next carriage position in which a "segment" is to be recorded. Accordingly by either recording the data for the "segment" or recording a Skip symbol to indicate when a "segment" has been skipped, the sequence of "segments" within the "frame" is maintained.

If, in the operation of the accounting machine and recorder to record a "frame" of data, certain data is incorrectly set up and entered in the accounting machine and recorded in a "segment" of the "frame," controls are provided in the accounting machine and recorder to control the recorder to "void" the portion of tape containing this "frame." Specifically, the controls are rendered operable under control of a Void Key on the accounting machine and prevent the punching of further amounts on the tape, causing Skip symbols to be punched for each "segment" which was not recorded and also causing a special Void symbol to be punched in the tape at the end of the "frame" to indicate to the machine which reads the tape that the "frame" is not to be read. The Void Key can be used in conjunction with any accounting machine operation which is made prior to the completion of the "frame." The use of the "void" feature enables the "frame" on the tape in which the error was recorded, to be ignored and enables the "frame" which is recorded when the correction is made, to be used in its place.

Various other controls are provided as required in the punching of the tape according to the desired program, and suitable interlocking circuits are provided to insure that the proper coordination and sequence of operations of the recorder and the accounting machine will be had. These controls and interlocks will become apparent from the following detailed description.

It will also be clear from the following description that the program controls are very flexible and enable the program to be changed for different uses of the accounting machine, such as preparing invoices, pay-rolls, account receivable records, etc., merely by replacing the stop bars at the front and rear of the carriage with bars having the proper stops for the new program and by replacing the form board with another form board wired according to the new program. This feature is of particular importance where the accounting machine is used for different kinds of work and it is desirable to change the punching program of the recorder to match the particular use to which the accounting machine is being put.

It is an object of the invention therefore to provide a recorder which can be controlled from a data-entry machine in an extremely flexible manner to record data according to a desired program.

A further object of the invention is to provide a recording means capable of being programmed to record "frames" of data under control of a data-entry machine, each "frame" of data being made up of a plurality of "segments" which are selected by the data-entry machine.

A further object of the invention is to provide a recorder capable of being programmed to record "frames" of data, each frame being made up of a series of "segments" and to provide control means which are operable at any time during the recording of a "frame" of data, to prevent the recording of the remaining "segments" of the "frame" and to record special data to indicate that the control means has been effective.

A further object of the invention is to provide a recorder which can be controlled from a data-entry machine having a movable control member and to provide programming means for controlling the recording of data in various positions of the member and for recording a special indication if no data is recorded in any position of the member which is programmed to control the recording of data.

A further object of the invention is to provide controls including switches which can be selectively closed a data-entry machine having a movable carriage, the controls including switches which can be selectively closed in different carriage positions and can be integrated with the programming means for controlling the recording operations.

A further object of the invention is to provide a serial type programming means for controlling a recorder to record "frames" of data, each "frame" of data being made up of a plurality of "segments," the programming means delineating sub-programs of lengths required for the various "segments" and operable from sub-program to sub-program in sequence within the "frame" without resetting the programming means between sub-programs.

A further object of the invention is to provide a programming means for controlling a recorder to record frames of data under control of a data-entry machine having a movable control member settable to different control positions, each "frame" of data being made up of a plurality of "segments," the programming means including Start controls and Halt controls delineating sub-programs of lengths required to record the various segments, including means controlled by the settable member to coordinate the recording of the "segments" with the position of the member and including sequentially operable means for "hunting" for the Start control of the "segment" corresponding to the setting of the member.

A further object of the invention is to provide a programming means for controlling a recorder to record "frames" of data consisting of a series of "segments," the program for each "frame" consisting of a series of sub-programs, and to provide means to automatically record a Skip symbol if any sub-program is passed over without having controlled the recorder to record its related "segment" of data.

A further object of the invention is to provide a recorder with programming means in which the program can be set up on a form board which can be inserted in the recorder to make the necessary connections according to the program and in which the program can be changed readily by substituting one form board for another.

With these and other incidental objects in view, the invention includes certain novel features of construction, circuits, and combinations of parts, the essential elements of which are set forth in the appended claims and a preferred form or embodiment of which is hereinafter described with reference to the drawings which accompany and form a part of the specification.

In the drawings:

Fig. 5 is a left side elevation of certain of the control keys and two signal lights for controlling and indicating certain functions of the machine.

Fig. 6 is a right side elevation of a portion of the machine releasing mechanism.

Fig. 7 is a right side elevation of a Lock-up solenoid and connected mechanism for controlling the releasing of the accounting machine for operation, under certain conditions.

Figure 8A:
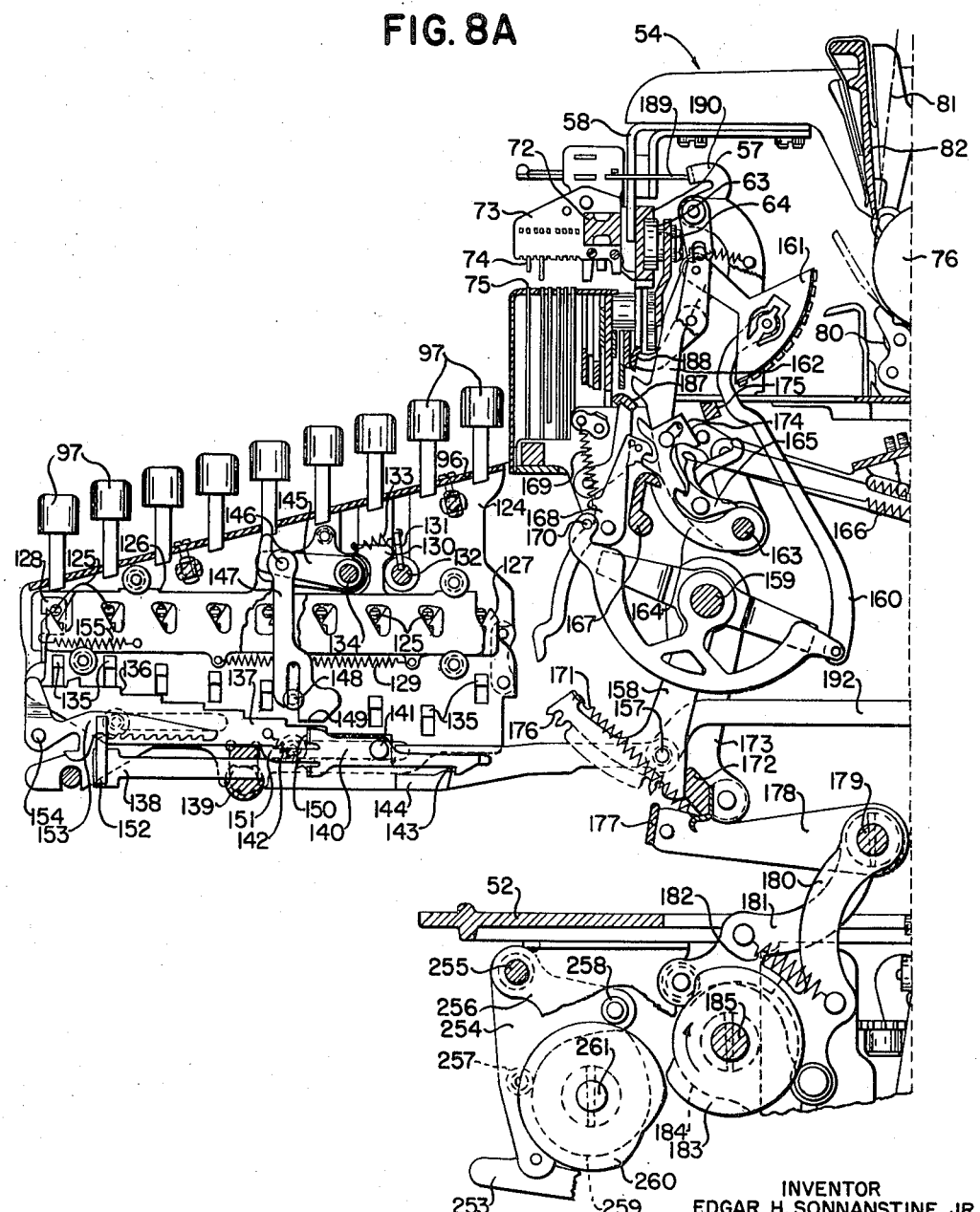

Figs. 8A and 8B together constitute a cross-sectional view of the entire machine, taken generally just to the right of one of the amount banks.

Fig. 9 is a right side elevation of the carriage controlled mechanism for selectively controlling the operation of the recorder.

Fig. 10 is a detail view of the Void key for controlling "void" operations in the recording unit.

Figure 11:
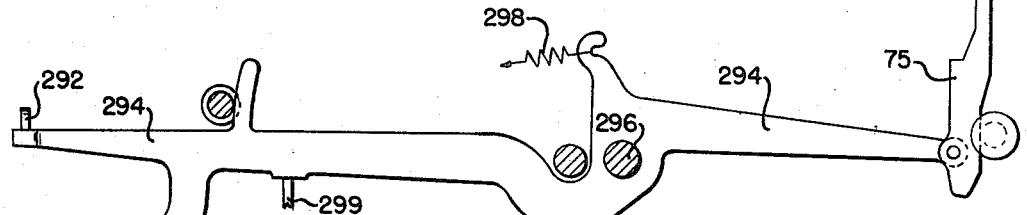

Fig. 11 is a front detail view of the selecting lever and associated mechanism, shown in Fig. 9, for controlling operation of the recorder.

Figure 12:
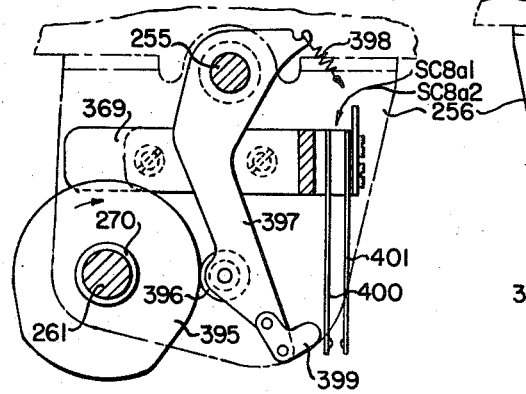
Figure 13:
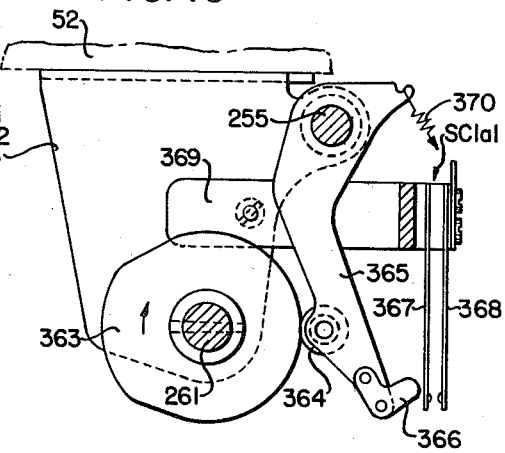

Figs. 12 and 13 are detail views, as observed from the right, of switches and their operating cams for controlling the operation of the recorder.

Figure 14:
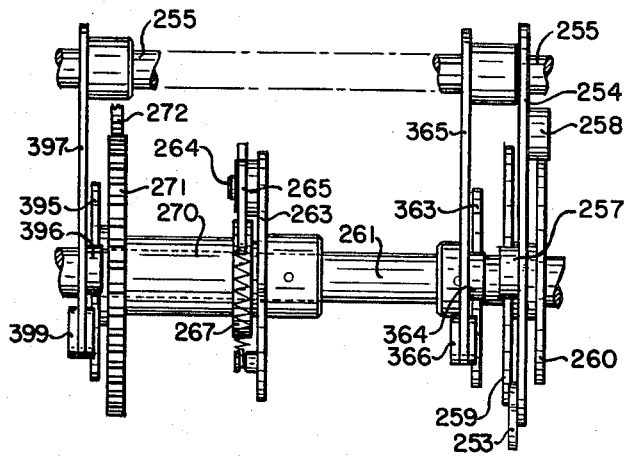

Fig. 14 is a front side-spacing view of the mechanism shown in Figs. 12 and 13, and other mechanism associated therewith.

Figure 15:
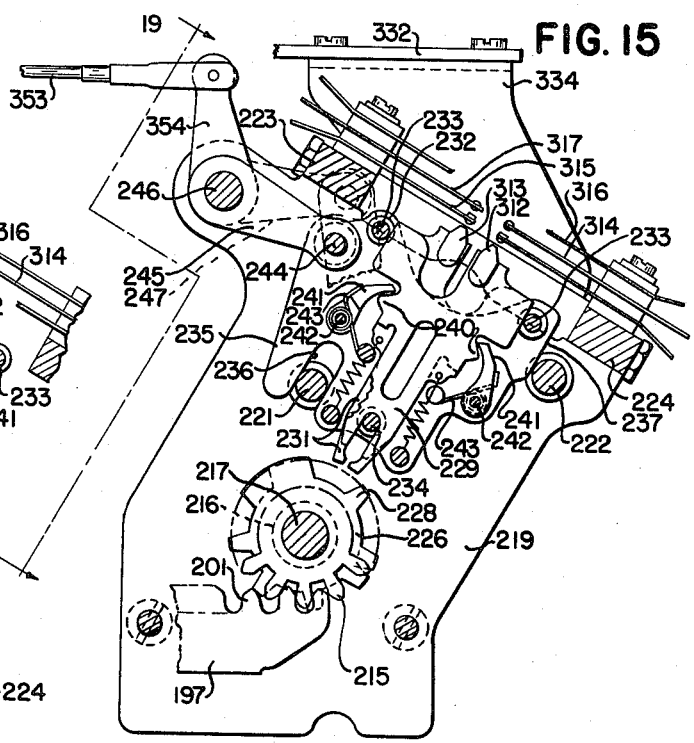

Fig. 15 is a cross-sectional view, as observed from the right side of the machine, showing one denominational order of amount storage and read-out switches for controlling the recording of data by the recorder.

Figure 16:
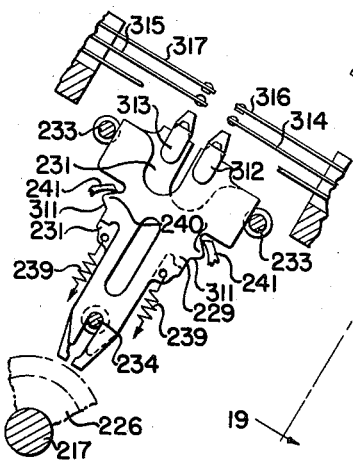

Fig. 16 is a detail view of one set of contact operating plungers and associated mechanism.

Figure 17:
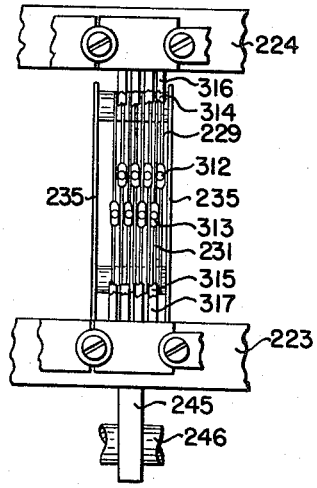

Fig. 17 is a fragmentary top plan view showing the eight contact operating plungers for one denominational order.

Figure 18:
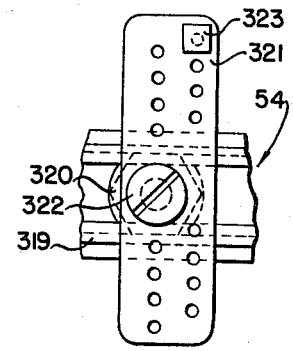

Fig. 18 is a detail view of a control plate or stop adjustably mounted at the rear of the traveling carriage in preselected columnar positions for seelectively controlling operation of the recorder.

Fig. 19 is a front plan view of the amount storage and read-out switch mechanism, as observed in the direction indicated by arrows 19—19 in Fig. 15.

Fig. 20 is a top plan view of the carriage position switch mechanism controlled by the traveling carriage in preselected columnar positions, for controlling the operation of the recorder.

Fig. 21 is a view, as observed from the rear of the machine, of the assembly of switch operating plungers shown in Fig. 20.

Fig. 22 is a detail view of the retaining and releasing mechanism for the switch plungers shown in Figs. 20 and 21.

Figure 23:
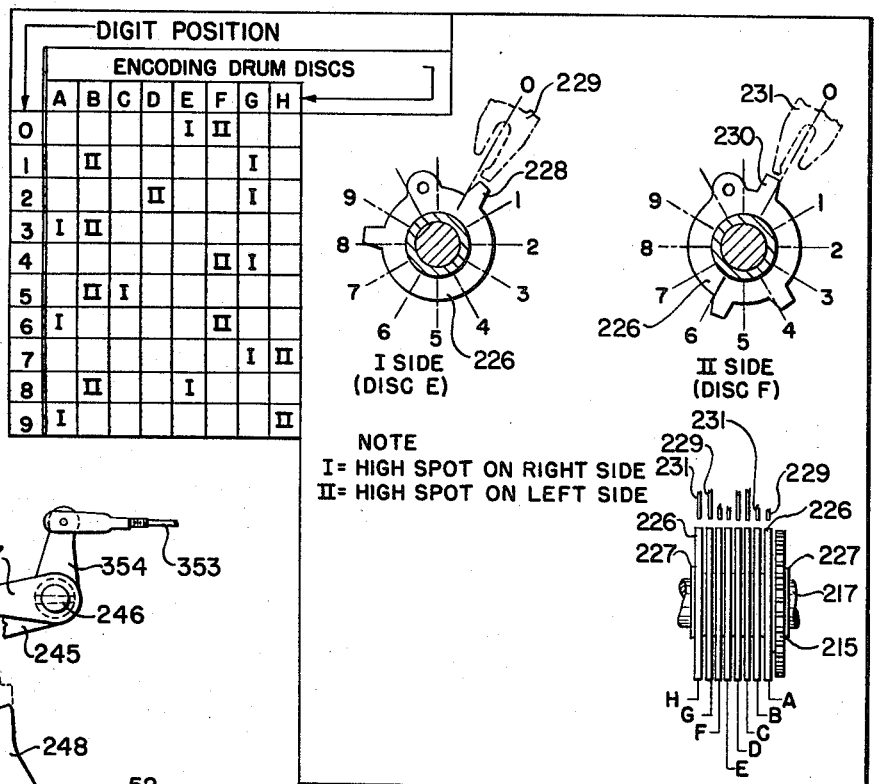

Fig. 23 is a chart depicting in graphic form the amount storage and read-out switch (control) controlling encoding drum disks and associated switch operating plungers, for one denominational order.

Figure 24:
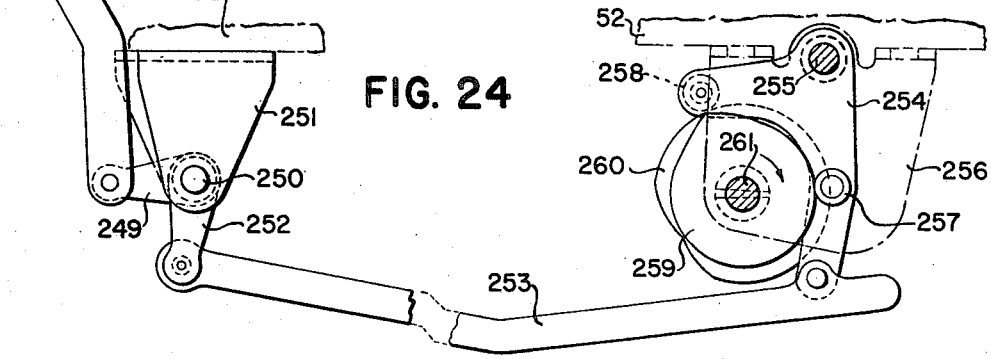

Fig. 24 is a side elevation, as observed from the left of the machine, of the mechanism for operating the switch operating plungers.

Fig. 25 is a view of the recorder portion of the apparatus with certain doors and covers in open position to show the various parts of the recorder more clearly.

Fig. 26 is a diagram of a plugboard in the recorder.

Fig. 27 is a top plan view of the recorder with the cabinet and tape punch shown in phantom.

Fig. 28 is a detail front elevation of the tape handling and punching section and the drive therefor.

Figure 1:
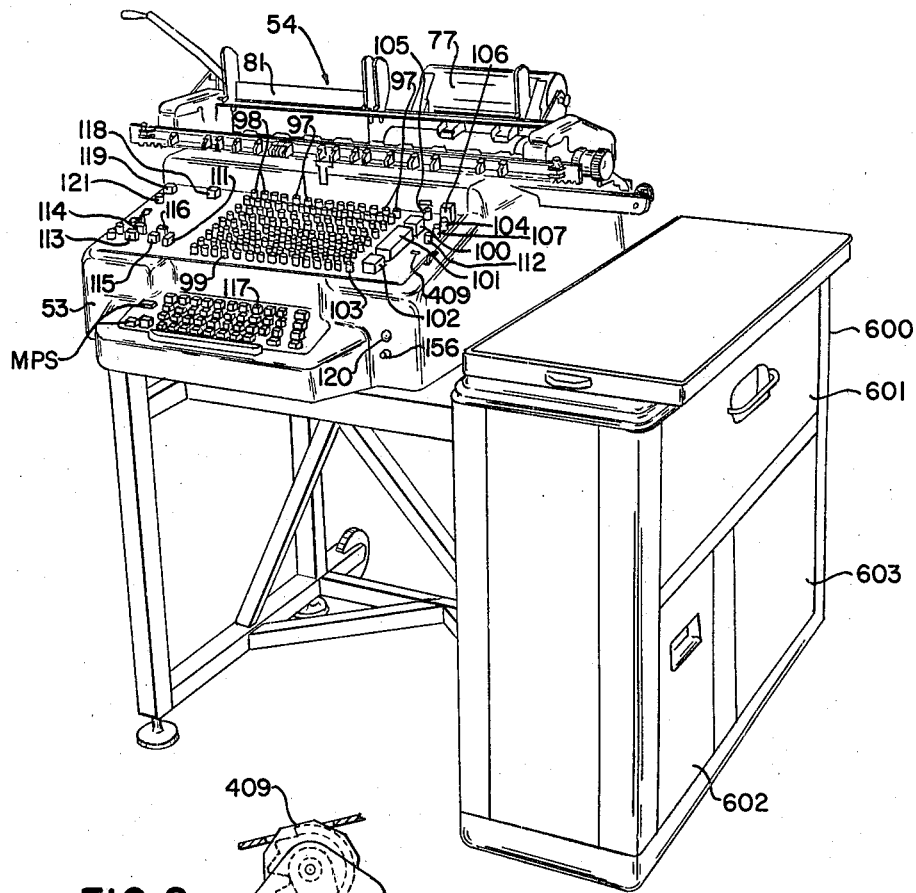
Fig. 1 is a perspective view of a known type of accounting machine having a tape recorder at its right side.
Figure 29:
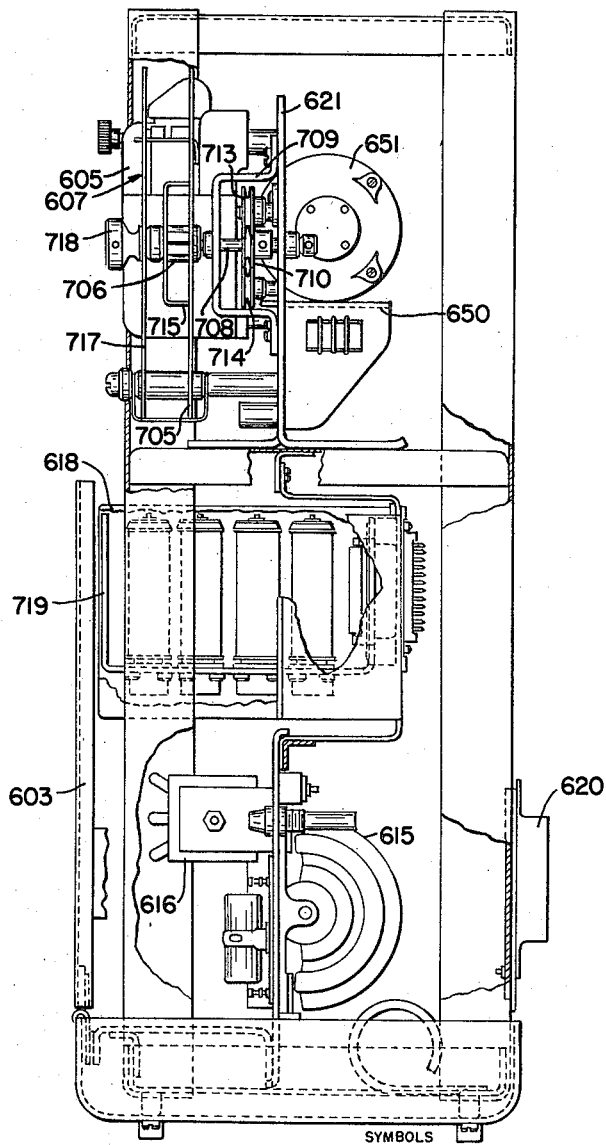

Fig. 29 is an end view of the recorder taken from the right side as viewed in Fig. 1, with parts of the cabinet and certain of the mechanism broken away to show other mechanism more clearly.

Figure 30:
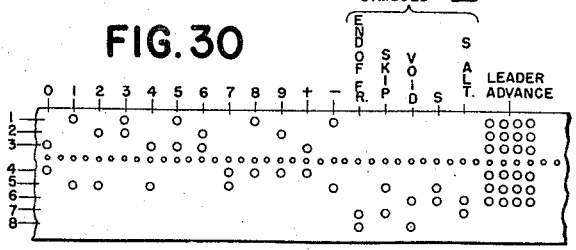

Fig. 30 is a fragment of tape showing the code which will be punched to represent the various symbols and digits in the instant embodiment.

Figure 31:
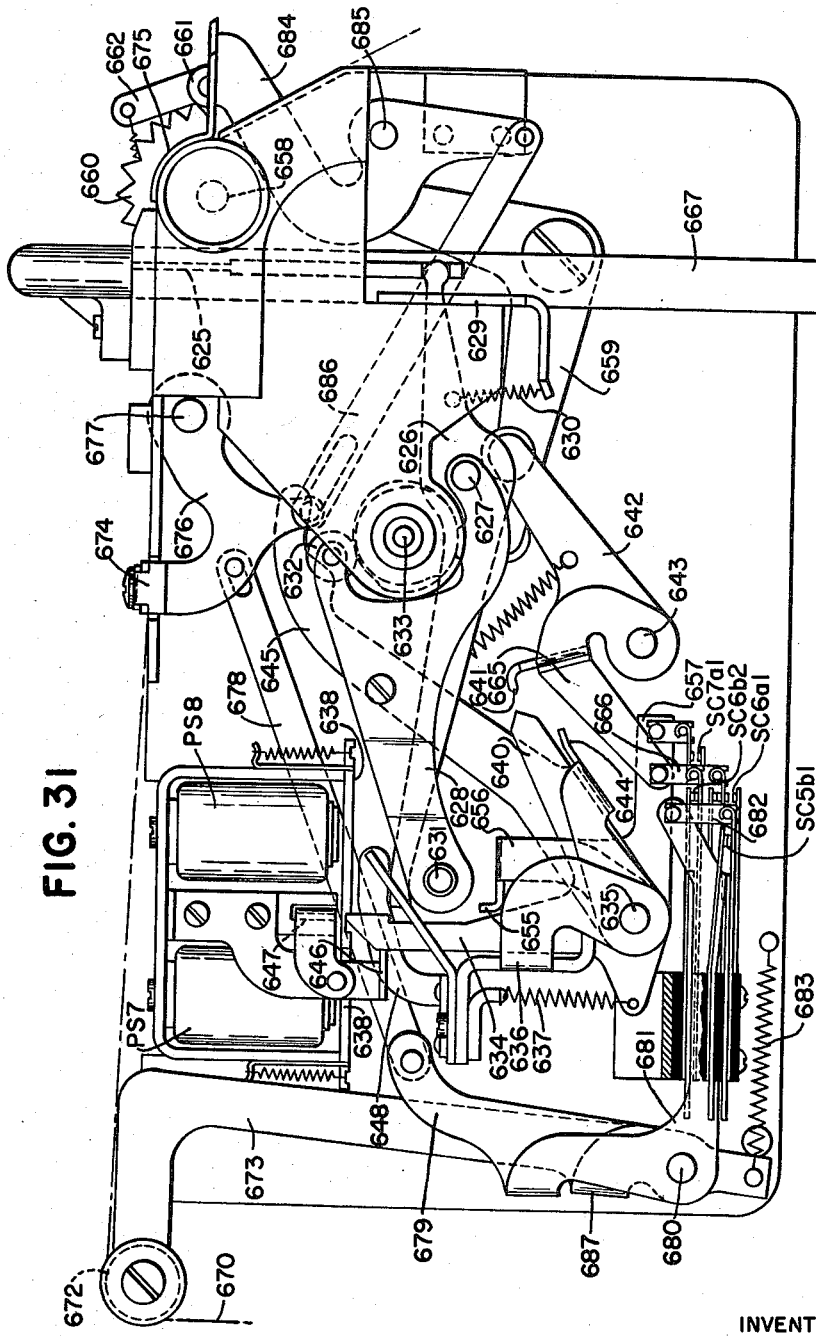

Fig. 31 is a side elevation of the punching mechanism used in the recorder.

Figure 32:
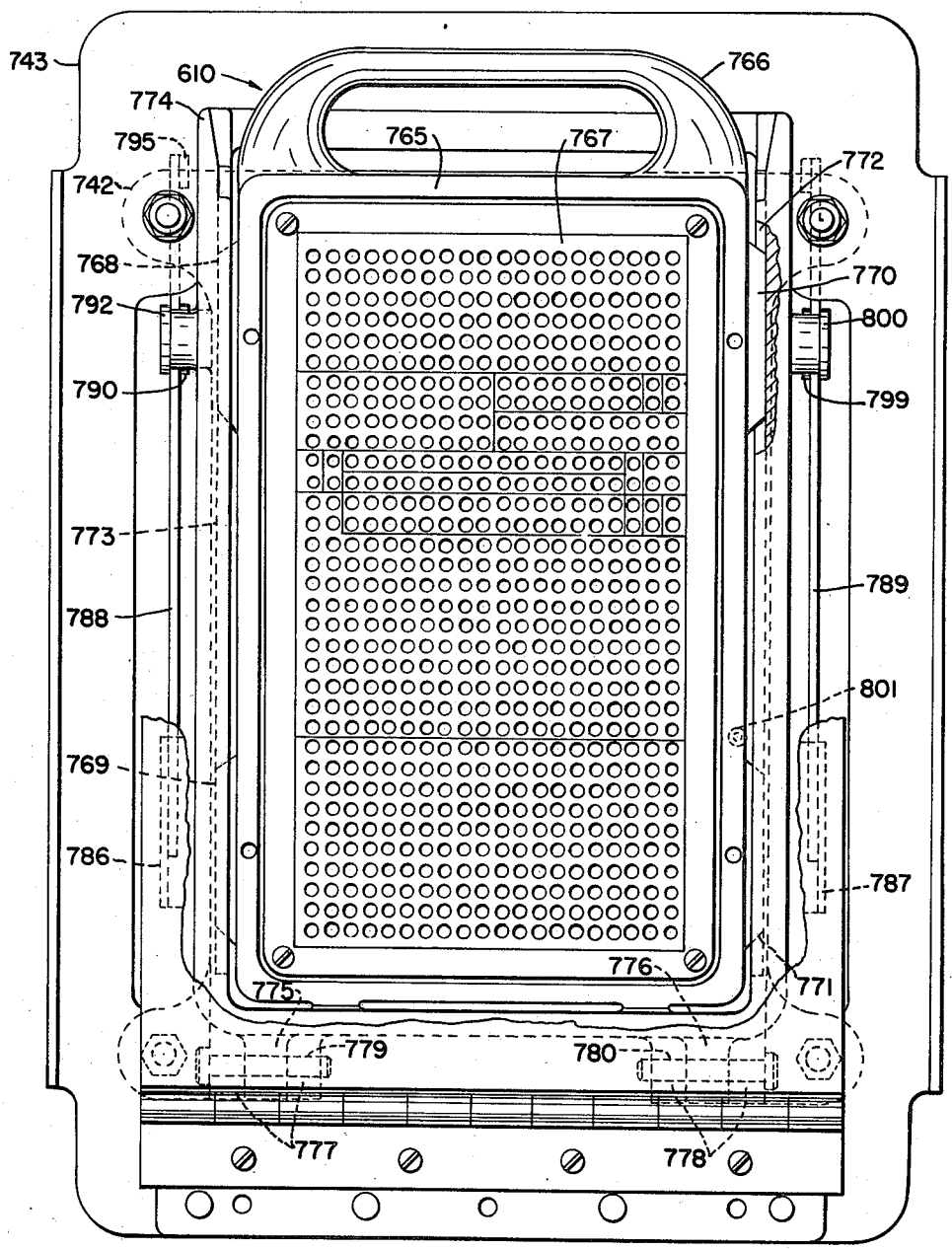

Fig. 32 is a front view of the form board and its mounting means with certain parts broken away to show other parts more clearly.

Figure 33:
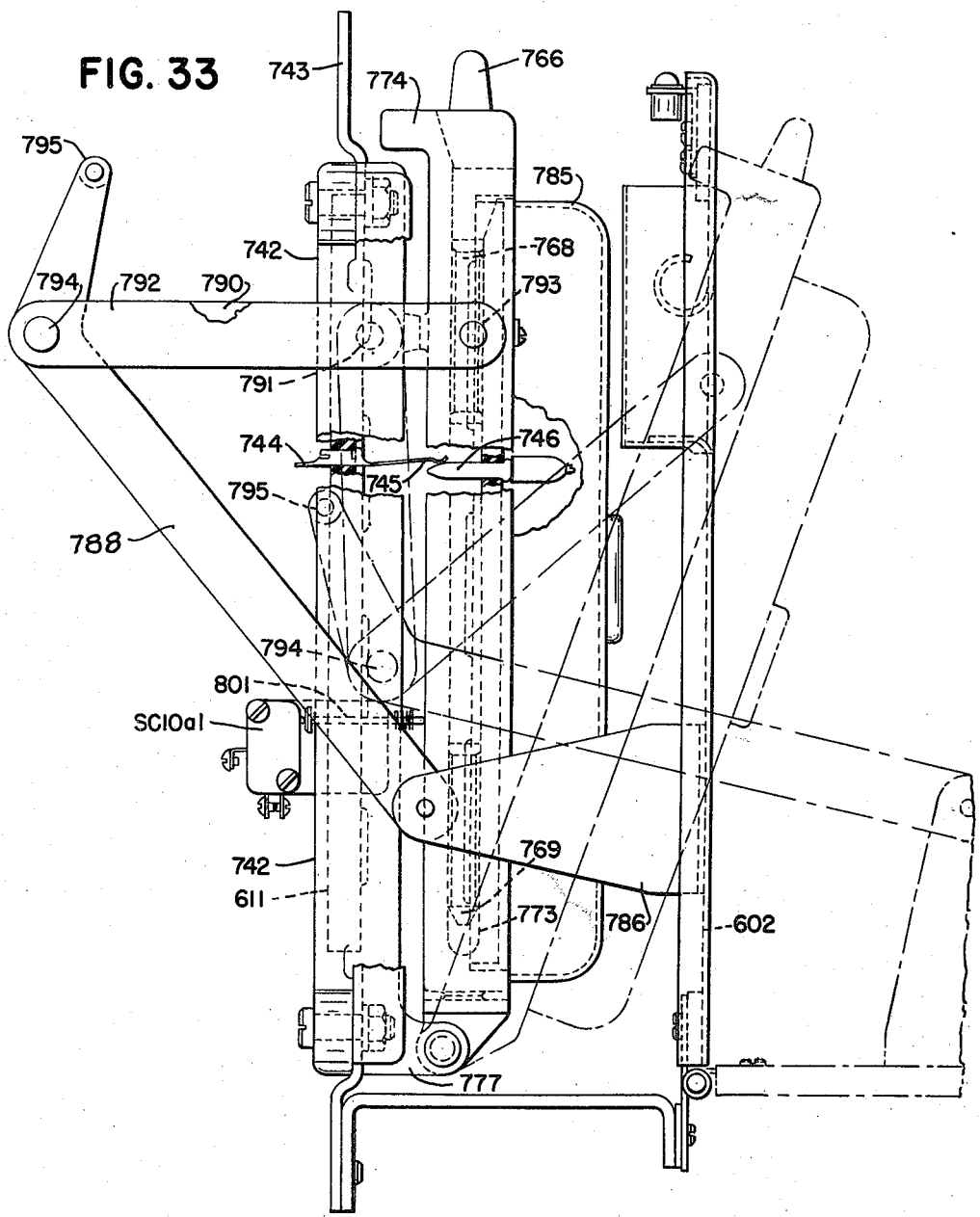

Fig. 33 is a side elevation of the form board and its mounting means.

Figure 34:
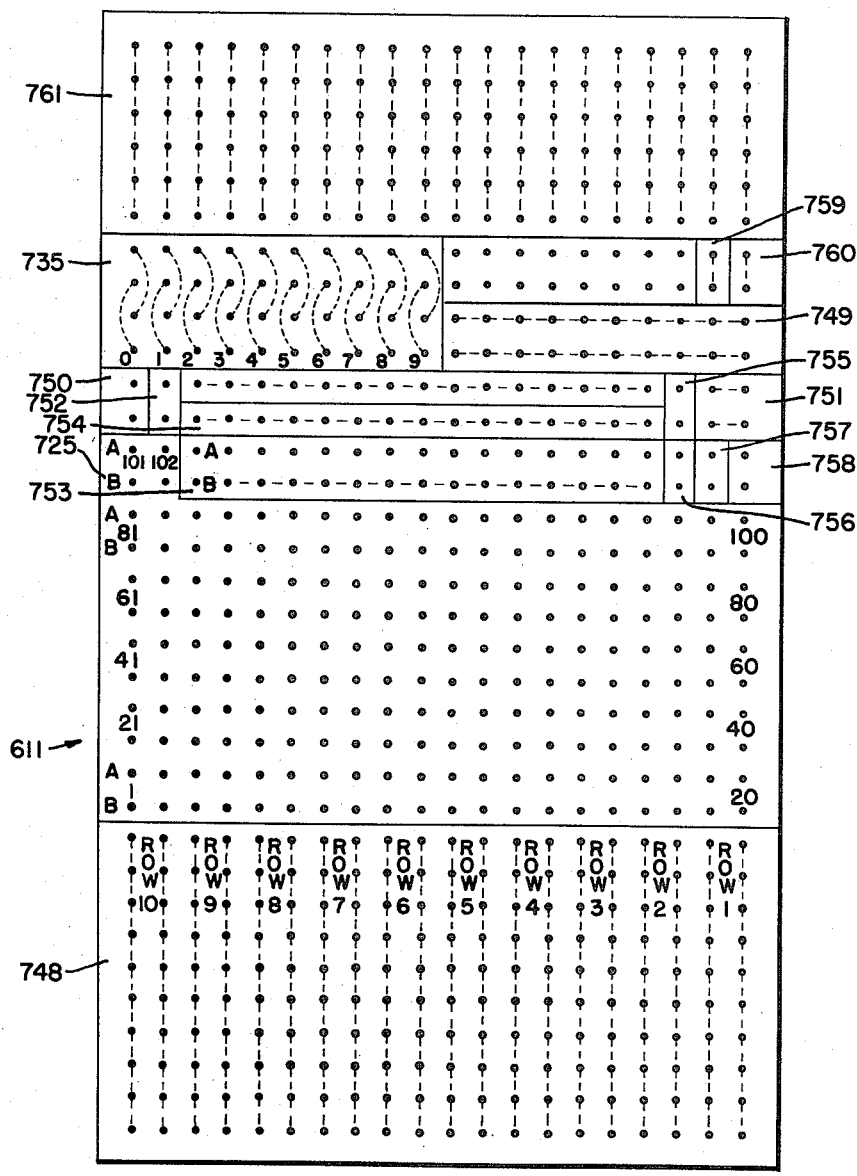

Fig. 34 is a diagram of the form board and related terminal board showing the location of the various control portions thereon.

Figs. 35A and 35B show a statement on which are recorded data of a representative accounting problem which will be used to explain the joint operation of the data-entry machine and the recorder.

Figs. 36A, 36B, 36C, and 36D together are the circuit diagram of the interlocking, control, and operating circuits for coordinating the operation of the data-entry machine and the recorder.

DETAILED DESCRIPTION

Data-entry machine

The data-entry machine chosen as a suitable example to illustrate the various features of the present invention is an accounting machine of the same general type as that fully disclosed in Letters Patent of the United States No. 2,626,749, issued January 27, 1953, to Raymond A. Christian et al., and applications for Letters Patent of the United States, Serial No. 466,292, filed November 2, 1954, by Raymond A. Christian et al., and Serial No. 567,312, filed on February 23, 1956, by Raymond A. Christian et al., to which reference may be had for a complete disclosure of the standard features of the machine not pertinent to the present invention and which for that reason will be described, in this application, only in general terms. However, mechanism pertinent to the present invention will be fully illustrated and described herein.

Like previous machines of this type, the exemplary data-entry machine is provided with a laterally-shiftable traveling carriage, which may be tabulated in either direction from one columnar position to another, or, if required, said carriage may be skip-tabulated through intervening columnar positions from one columnar position to a preselected columnar position. The present data-entry machine is provided with a front feed mechanism, which opens and closes a throat located at the front of the platen for the insertion and removal of record material, such as ledger cards and statement sheets at the front of said platen.

The instant machine is provided with a full complement of amount keys, which control the positioning of corresponding differential actuator mechanisms, which in turn control the setting of corresponding type carriers for recording the values of the effective amount keys upon the record material supported by the traveling carriage platen, and said actuators also control the entering of said values, either positively or negatively into the wheels of the selected totalizers. Likewise, the amount actuators are connected with and position in relation thereto, corresponding encoding drums, which in turn control the operation of the amount storage and read-out switch mechanisms, which transmit the values set up on said actuators and said drums to the tape recording mechanism, as will be explained later. The present machine may also be provided with a full complement of date keys located to the left of the amount keys, for setting up the date, which may be printed, when required, on the record material supported by the platen of the traveling carriage.

The machine is provided with a continuously running motor 49 (Fig. 36A), which drives the usual fluid coupling mechanism for moving the traveling carriage in either tabulating or return directions. The motor also operates, through a main clutch mechanism controlled by depressing release or starting bars located on the right side of the accounting machine keyboard, to drive said machine through one cycle of operation, which is required for all types of functions performed by the machine. In other words, it is to be understood that all functions of the machine, including non-adding, adding, subtracting and positive and negative total-taking, are effected in a single cycle of machine operation. In addition to the manual controlling of the main clutch by the starting bars to initiate machine operation, said clutch may be automatically controlled through the medium of the traveling carriage in preselected columnar positions thereof, in all operations except overdraft total-taking or credit balance operations, in which said clutch must be controlled by use of the manually operable release or starting bars as will be further explained later.

Like the machine disclosed in the Christian et al. patent, referred to above, the present data-entry machine is provided with the well known electric typewriter mechanism for typing data of a descriptive or other nature on the record material supported by the traveling carriage platen. However, this is a matter of choice, and the electric typewriter mechanism may be omitted if it is not necessary in connection with the business system to which the machine is being applied.

The machine, as presently arranged, is provided with two lines of shiftable totalizers located at the rear thereof, one of said lines supporting a crossfooter or balance totalizer for the computation of positive and negative amounts, and the other of said lines supporting a maximum of eight individual sets of interspersed totalizer wheels to provide eight group or storage totalizers. The balance totalizer may be selected and conditioned for engagement with and disengagement from the single set of amount or differential actuators, in proper timing for the type of operation being performed, by means of adjustable stops located on the front of the traveling carriage in predetermined columnar positions thereof, or if necessary or desirable by means of a full complement of corresponding control keys. In a similar manner, the different sets of group or storage totalizers may be selected and conditioned for actuation, by the single set of actuators, by means of the traveling carriage in predetermined columnar positions thereof, with the exception of the total-taking function in said totalizers, which may be controlled either by the traveling carriage or by means of corresponding control keys.

The terms, "overdraft totalizer," "balance totalizer" and "crossfooter," are considered synonymous and will be used interchangeably throughout the description, and this likewise applies to the terms, "storage totalizers" and "group totalizers."

The crossfooter or balance totalizer comprises a single set of add-subtract wheels which coact with the amount actuators in adding and subtracting operations to enter positive and negative amounts in said balance totalizer. Each balance totalizer wheel is geared to a corresponding auxiliary wheel, which is always in complementary relationship thereto, and which in overdraft total-taking operations only is alined with and coacts with the amount actuators to control the positioning of said actuators and their corresponding printing segments to cause the true negative amount of the overdraft to be printed on the record material. In other words, all functions of the balance totalizer, including adding, subtracting, and positive total-taking operations, are effected by engagement of the main wheels of said totalizer with the amount actuators. However, the occurrence of an overdraft in the balance totalizer sets up a condition which causes the auxiliary wheels to be engaged with the amount actuators in total-taking operations only, so that the true negative amount of the overdraft will be recorded. Naturally, after an overdraft occurs in the balance totalizer, add and subtract operations may be continued therein as long as desired, and if during these operations, the balance totalizer changes from an overdrawn or negative condition to a positive condition, the situations referred to above will be reversed so that the main wheels will again be alined with and coact with the amount actuators in total-taking operations.

The above referred to automatic shifting of the balance totalizer line to aline either the main wheels or their corresponding auxiliary wheels with the amount actuators is controlled by a so-called "Fugitive 1" mechanism, which is necessary in a crossfooter or balance totalizer of this type to correct the units or lowest order wheel when the highest order wheel passes through zero while revolving in either a positive or a negative direction.

The basic features of the overdraft and storage totalizers, explained in a general way above, are fully disclosed in United States Patent No. 2,503,865, issued April 11, 1950, to Raymond A. Christian, to which reference may be had for a detailed description of mechanism which is not pertinent to the present invention and which for that reason will be described only in a general way herein.

The machine chosen as the data-entry machine has been arranged to transmit desired data to the recorder as an incident to the usual operation of the accounting machine. The recorder is controlled electrically by an amount storage and read-out switch arrangement located at the rear of the data-entry machine, said switch arrangement in turn being actuated by the usual amount actuators of the data-entry machine.

As mentioned previously, data-entry machines of the type referred to above are provided with a horizontally-shiftable amount or differential actuator for each denominational order. The amount actuators are positioned under control of the corresponding rows of amount keys in adding and subtracting operations, and under control of the corresponding wheels of the selected totalizer in sub-total and total taking operations. Each actuator is geared to an encoding drum, consisting of a cluster of eight control disks, each of which may have a plurality of tooth-like projections thereon, arranged to be sensed by a corresponding one of eight sensing plungers mounted in a shiftable framework displaceable angularly in relation to said control disks. The eight plungers for a single denomination have associated therewith eight corresponding switches or contacts, fixedly mounted directly above the corresponding switch plungers.

In the first part of the machine operation, the amount actuators position the corresponding encoding drums in relation to the sensing plungers, in accordance with the value set up on said amount actuators, either by the amount keys in adding and subtracting operations, or by the wheels of the selected totalizer in sub-total and total taking operations. After the drums have been positioned by the actuator racks, the framework carrying the sensing plungers is shifted downwardly and carries the plungers in unison therewith. The projections on the control disk of the drums, corresponding to the digits set up on the actuators, are engaged by the corresponding plungers, and said plungers are displaced in relation to the other plungers, which remain in ineffective position. The displaced plungers are temporarily held displaced by retaining pawls, and, as the sensing plunger framework is returned upwardly from sensing position to normal position, said displaced plungers engage and close corresponding contacts to prepare electrical circuits corresponding to the digits set up in the various denominational orders. The amount storage switches which are thus set according to data entered into the accounting machine are used to provide the control for the recorder to enable the data of the various "segments" to be recorded on the tape.

The encoding system used in the present machine is known as the "2 of 5" code, and with this system it is necessary that two sensing plungers and their corresponding contacts be operated to represent each of the ten digits, including zero, for each denominational amount bank or order. This encoding system requires that the drums be positioned with two projecting teeth in position to be engaged by corresponding sensing plungers, and said teeth are located on the corresponding drums, according to the code employed, and therefore the digital position of each amount rack brings an appropriate combination of teeth into sensing relationship with the corresponding sensing plungers. In this manner, the digit encoding is effected in the amount storage and read-out switch assembly, thus making it possible for the amount actuator racks to control external electrical circuits in the associated tape recorder device according to data set up in the data-entry machine.

It is necessary in the present system of recording of data on tape to maintain in fixed order of recording of the "segments," so that the relative position of the "segments" within the "frame" will serve as a means of identification of the various "segments." A "frame" in this instance includes certain pre-selected data to be recorded during the printing of the various entries pertaining to an item on the form used in connection with a particular business system, said data being distributed among several columns of said form, thus requiring movement of the traveling carriage through a predetermined program or sequence of columnar positions. As the traveling carriage moves in pre-arranged order from one columnar position to another, the selected numbers or amounts are recorded on the tape by the recorder in sequence.

In some cases, operation of the recorder may or may not be required in a certain columnar position, and this is controlled by means of a series of carriage position switches located at the back of the traveling carriage, which are actuated by means of adjustable stops removably mounted on a rear form bar on the traveling carriage at the rear thereof in relation to columnar positions of said carriage. The carriage position switch mechanism, which is operated under control of the stops on the rear of the traveling carriage, is of the same general type as that used in connection with the amount banks, but in this case the switches operate singly instead of in pairs. Each switch, when operated under control of the stop on the traveling carriage, in predetermined columnar positions, causes a "segment" to be recorded on the tape. If the carriage passes through a position which is programmed for recorder operation but the data-entry machine is not operated with the carriage in this particular position, the carriage position switch for this particular position will not be operated, and the "segment" which normally would be recorded in this position of the carriage will not be recorded. In order to keep the proper sequence of "segments" within the "frame," a Skip symbol will be recorded in place of this "segment," as will be explained fully hereinafter.

There are sixteen sets of contacts in the carriage position switch group, fifteen of which may be used in conjunction with programming means in the recorder to coordinate the recording of "segments" of data in various columnar positions of the traveling carriage, as explained above, while the sixteenth is for controlling the Void relay K7 (Fig. 36A), as will be explained later.

The operation of the recorder must not be started before the actuator racks of the data-entry machine complete their initial movement rearwardly, and this is controlled by a Record switch mechanism which is operated by cams on a recorder control cam line, which line is connectable to the main cam line for operation thereby in tape recording operations, so as to close said Record contacts SC1a1 (Figs. 13 and 36A) approximately 220 degrees from the start of machine operation, to energize Operate relay K1 (Fig. 36A) to start the tape recording process.

Three control keys—namely, the Void key, the "S" key, and the "R" key—located to the left of the amount keyboard, have been provided with contacts for controlling the recorder. The Void key, when depressed, closes a pair of normally open contacts, which in turn control the Void relay, to prevent the recording of "segments" by the tape recording mechanism and control a Void counter operating solenoid to cause a count of the number of "void" operations to be made. The Void key also disables operation of the recorder control cam line mechanism to obtain safe interlocking conditions. The "S" key, when depressed, closes normally open contacts SC2a1 (Fig. 36A) to cause an "S" control relay K8 to be operated during the machine cycle to cause an "S" to be recorded upon the tape. The "R" key, often referred to as the "Reverse" key, when depressed, closes a pair of normally open contacts SC4a1 (Fig. 36A), which control relay K9 to cause the + or − sign symbol which is recorded before amounts to be reversed, to correspond to the reversal of the add and subtract functions during the machine cycle.

The balance totalizer or crossfooter has associated therewith normally open contacts SC3a1; however, when the crossfooter changes from a positive condition to a negative, or withdrawn, condition, the overdraft contacts SC3a1 are closed to cause relay K9 to operate to change the sign symbol from positive to negative.

The main clutch mechanism, which controls the connection of the operating motor to the machine operating mechanism, has associated therewith, in the present arrangement, a Lock-up solenoid L10 (Figs. 7 and 36A), controlled by relays in the recorder to prevent engagement of the main clutch and thus delay the accounting machine operation as long as the recorder is operating.

The machine has been provided with the usual Main Power Switch, or "On-Off" switch, which is located at the left of the typewriter and when in "On" position connects the apparatus to the A.C. supply. A red indicator lamp at the left of the typewriter is lighted whenever the switch is in its "On" position. A manually-operable Master Record switch, located at the right of the typewriter keyboard, controls whether or not the accounting machine will operate alone or in conjunction with the recorder. A red indicator lamp, located at the left of the amount keyboard, is lighted when the Master Record switch is turned on, indicating that the recorder is ready for operation in conjunction with the accounting machine.

The Void key, referred to above, is also used in connection with the correction of errors, and the depression of this key prevents the recording on the tape of any further "segments" in the "frame" and causes Skip symbols to be recorded for the skipped "segments" and a special Void symbol to be recorded at the end of the "frame." This Void symbol is used to prevent the erroneous data which might have been recorded on the tape from being utilized. A clear lamp, the "Non-Rec" lamp, located at the left of the keyboard immediately above the red lamp, referred to above, is lighted as long as the Void controls are effective.

The recorder control cam line, referred to before, functions only when the recorder is to punch data on the tape, and therefore it is unnecessary for said cam line to operate when the accounting machine is being used to record data which is not to be recorded on the tape. The recorder control cam line is connectable to the main cam line through the medium of a clutch mechanism, which is controlled by control stops on the front form bar, or stop bar, on the traveling carriage in preselected columnar positions thereof, thus providing means whereby the recorder may be rendered operative when the traveling carriage is in certain predetermined columnar positions, in accordance with the requirements of a particular business application. The recorder control cam line controls the operation of the amount storage and read-out switch plungers, the carriage position switch plungers, and the operation of the Record switch to control the starting of the operation of the recorder.

Two multiple plug-in receptacles, located at the rear of the machine, are provided for engagement by corresponding multiple plug-in connectors, which, through suitable cables, electrically connect the switch mechanisms of the accounting machine to the recorder. Power input and control circuits to the recorder are carried through one of the plug-in receptacles, and data circuits leading from the amount switches are carried through the other plug-in receptacle.

Mechanism pertinent to the present invention, which was described in general above, will be described in detail in the following pages.

*Framework, traveling carriage and operating mechanism*

The main mechanism of the accounting machine, including the keyboard mechanism, the actuator mechanism, the printing mechanism, and the traveling carriage, are supported by and between right and left main frames, 50 and 51 (Figs. 5 and 8B), said frames in turn being secured to a machine base 52. The base 52, in cooperation with various cross frames, bars and rods, support and maintain the two main frames in proper parallel spaced relationship to each other. The mechanism of the machine is enclosed in a suitable case or cabinet 53 (Fig. 1) which is fabricated in several parts or sections so as to give ready access to different portions or units of the machine, said case being secured to the machine framework and to the base 52. For convenience, the machine is mounted on a stand, and the tape recording unit, which is used in connection with the accounting machine, is contained in a rectangular case 600 (Figs. 1 and 25) which, if desired, may be secured to the stand at the side of the accounting machine, thus combining the electrical and mechanical portions of the apparatus into an integral unit for convenience of operation and service. The case 600 for the recorder is provided with various closures 601, 602 and 603 (Figs. 1 and 25) giving access to the important portions of the recorder, and the top surface of said case forms a desk or table top for use in connection with the accounting and recording units.

The machine is provided with a laterally shiftable traveling carriage 54 (Figs. 1, 8A and 8B) comprising right and left end frames and housings connected at the rear by a Z-shaped bracket 55 and a bottom plate 56, and connected at the front by means of a horizontal bar 57 secured at opposite ends to two angular brackets 58 (only one shown here) said brackets in turn being secured to the corresponding end frames of the carriage. The traveling carriage is shiftably supported at its rear by means of a tubular rail 59, secured to the bottom plate 56, and riding on a plurality of rollers 60, in turn rotatably mounted on a bar 61, secured to the main frames of the machine. The rail 59 is retained in accurate engagement with the rollers 60 by several angular rollers 62, located on either side thereof, some of said rollers being mounted directly on the upper edge of the bar 61, and the remainder of said rollers being mounted on studs, in turn secured in said bar 61. The traveling carriage is further shiftably supported at its front by means of a longitudinal channel in the bar 57, which engages a plurality of rollers 63 mounted on a plate 64, in turn secured to the machine framework.

Secured to the lower portion of the bracket 55 (Fig. 8B) is a longitudinal rack 65, the teeth of which mesh with a gear 66 secured on the upper end of a vertical shaft 67 journaled at its upper end in a plate 68 secured to the bar 61, and journaled at its lower end in the top portion of a fluid drive housing 71 secured to the machine base 52. Secured on the lower end of the shaft 67 is a wide-faced gear 69, which meshes with a shiftable reversing gear 70 journaled in the housing 71. The gear 70 is connectable to either of two reversibly driven gears (not shown) which are in turn non-positively operated by the fluid drive mechanism. When the gear 70 is in its upper position, as shown here, it drives the shaft 67 and the traveling carriage in a lefthand or tabulating direction (Fig. 1) and when said gear 70 is shifted downwardly it drives said shaft 67 and the traveling carriage in a righthand or return tabulating direction.

The fluid drive mechanism for shifting the traveling carriage in tabulating and return directions is operated through the medium of the continuously running electric motor 49 (Fig. 36A), which is secured to the machine base 52, and which also operates the accounting machine mechanism.

The tabulating movements of the traveling carriage 54 in both forward and return directions are controlled by means of an escapement mechanism (not shown), which engages teeth on the lower edge of the bar 57 (Figs. 1 and 8A) said escapement mechanism being controllable either manually, by means of the starting bars and other control keys, or automatically, by means of the traveling carriage in preselected columnar positions thereof, as fully disclosed in the Christian et al. patent and application referred to previously. Removably attached to the bar 57 (Figs. 1 and 8A) is a front form or stop bar 72, having adjustably mounted thereon a plurality of stops 73, located in predetermined columnar positions of the traveling carriage, said stops carrying control plates 74, which coact with sensing fingers 75 connected to corresponding sensing levers, to control the various functions of the machine. The stops 73 likewise may be provided with forward and return tabulating lugs, which control the forward and return tabulating movements of the traveling carriage, to locate said carriage in preselected columnar positions, while traveling in either direction, a lug for unlocking the machine releasing mechanism, and if desired, a lug for automatically initiating machine operation. The bar 72, with its assembly of control stops 73 (Fig. 1) may be readily removed from the machine and replaced with another bar, having other stops located in different columnar positions, and with a different arrangement of the control plates 74, and control lugs, for quickly adapting the machine for use in connection with various programs or various business systems. Likewise the stops 73 may be quickly adjusted to any position on the bar 72 to readily arrange the columnar positions of the traveling carriage to agree with the divisions of different types of record material supported by the traveling carriage.

Rotatably mounted in the traveling carriage framework 54 (Figs. 1, 8A and 8B) is a platen roll 76 for supporting record material such as a journal sheet 77 in printing position, said journal sheet, in this instance, being unwound from a supply roll 78, supported by the traveling carriage, and fed beneath and around said platen roll 76 from the rear. The journal sheet 77 is retained in feeding engagement with the face of the platen roll by means of rear pressure rollers 79 and front pressure rollers 80. In addition to back-fed record material, such as the journal sheet 77, the machine is provided with a front-feed throat for guiding record material, such as ledger cards 81 or statement sheets around the front of the platen roll and into printing position. The front feed throat includes a rockable front feed guide 82 made of suitable transparent plastic material, which, when in closed throat position, as shown in full lines in Fig. 8A, retains the front-fed record material 81 in printing position around the platen roll 76. The front-feed guide 82 is movable from closed position to open position, as indicated in dot and dash lines in Fig. 8A, and during such movement the front pressure rollers 80 are moved out of engagement with the face of the platen roll, and in conjunction with said guide 82, form a front feed throat, which directs the record material 81 around the front of the platen and into a guide chute 83 (Fig. 8B) located at the rear of the traveling carriage. The lower edge of the guide 82 forms a line finder, for use in locating the desired line of the record material in proper printing relationship with the type carriers.

The front pressure rollers 80 and the guide 82 are moved from closed to open-throat position, and vice versa through the medium of mechanism comprising a tube 84 (Fig. 8B) journaled in the carriage framework and connected by a plurality of posts to a rod 85, which slides between parallel faces of two blocks 86, pivotally mounted on a plate 87. The plate 87 is shifted from one position to another, to operate the front feed throat through the medium of a clutch device (not shown) which connects said plate to the continuously running operating motor.

Either front-fed or back-fed record material, supported by the platen roll 76 (Figs. 8A and 8B) may be linespaced by rotation of said platen roll in a clockwise direction, through the medium of mechanism comprising a tube 88, journaled in the carriage framework, and connected by posts 89 to a rod 90, which is maintained in yielding engagement with an operating roller 91 mounted on an arm 92 secured on the upper end of a vertical shaft 93, journaled in the plate 68, and in the base 52. The lower end of the shaft 93 is connected through a linkage to a clutch mechanism (not shown) for clutching said shaft to the continuously operating motor for operation thereby. The clutch mechanisms for the front feed throat and the line-spacing mechanism may be rendered operative by means of the machine release bars, by means of corresponding control keys, or by means of the traveling carriage in preselected columnar positions thereof, to open or close the front-feed throat and to rotate the platen roll to line-space the record material supported thereby.

The above somewhat general description of the traveling carriage mechanism is believed to be adequate for the present purpose. However, if a more detailed description of this mechanism is required, reference may be had to the United States Patent No. 2,626,749, mentioned before, which contains a full disclosure of said mechanism.

*Keyboard*

Figure 3:
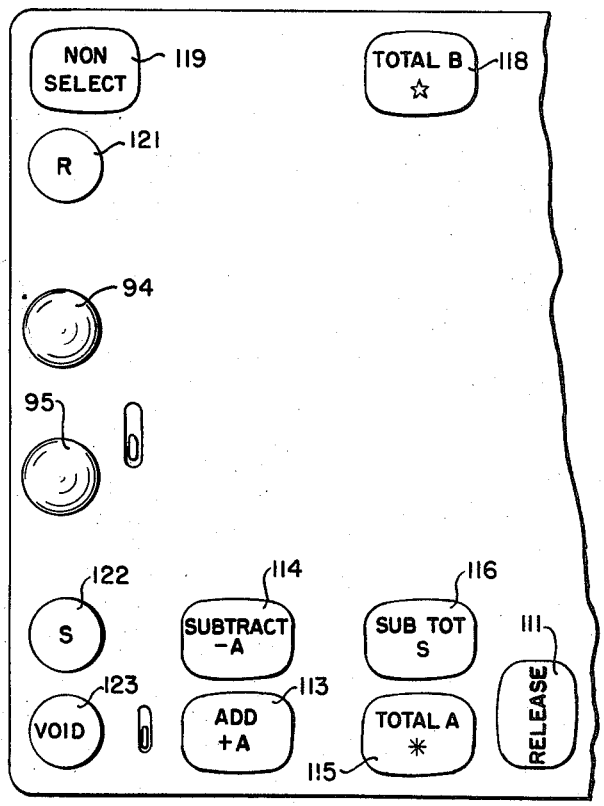
Fig. 3 is a showing of a fragment of the keyboard containing certain control keys and indicator lights.

Directing attention to Figs. 1, 3 and 8A, the accounting machine keyboard comprises an amount key unit assembly 96, containing a plurality of denominational rows of amount keys 97, a complete complement of date keys 98, symbol keys 99, and a tabulating key 103, and said unit 96 may be removed from and replaced in the machine in its entirety in case this is necessary for inspection or repair. The date keys 98 are normally stay-down keys in that they are not normally released near the end of machine operation, as are the amount keys. However, said date keys are provided with a non-repeat key, which upon depression causes said keys to be automatically released near the end of machine operation, in case it is not desired to repeat-print the date in succeeding operations. A release key is provided for releasing all the depressed date keys, except the year keys, when the machine is at rest. The symbol printing keys 99 are located in the same row as the year date keys and may be used to print symbols for identification purposes, upon the record material.

The amount keys 97 are so inter-related that the depression of one key in a particular denomination or row releases any previously depressed key in said row, and so on.

The accounting machine keyboard also includes a Vertical release bar 100, a Main release bar 101, and a Skip release bar 102, located to the right of the amount keys 97, said release bars being manually depressible to initiate operation of the machine. In addition to releasing the machine for operation, the release bars may be arranged to control other functions of the machine, incuding tabulation of the traveling carriage and line-spacing of the record material supported by the platen roll. The functions of the Main release bar 101 may be further controlled through the medium of a selecting lever (not shown) having three positions, for controlling the tabulating function of the traveling carriage, and the rotation of the platen roll for line-spacing the record material.

The release bars 100, 101, and 102 (Fig. 1) have two stages of depression, often referred to as "touch" and "hold," and function in the manner explained above upon normal or "touch" depression. In "touch" depression, pressure is released from the release bars immediately after they are depressed and in "hold" depression pressure is retained on said bars after they have been depressed, and they are thereby rendered operative to control different functions of the machine from those controlled by said bars when they are "touch" depressed, said functions including tabulation of the traveling carriage in both forward and return directions, and rotation of the platen roll to line-space the record material supported thereby.

The traveling carriage 54 (Figs. 1 and 8A) may be manually released for forward tabulating movement by depression of the tabulating key 103, which causes said carriage to tabulate from one columnar position to the next. Likewise the reverse or return tabulating movement of the traveling carriage may be controlled by a reverse tabulating key 104, depression of which causes the traveling carriage to be tabulated in a reverse direction from one columnar position to the next. A carriage release key 105 is provided for releasing the traveling carriage escapement mechanism so that said carriage may be moved in either direction as long as said key 105 is retained depressed. The accounting machine keyboard also includes a carriage throat key 106, depression of which causes the front feed throat to be opened or closed, depending upon which position it is in when said key is depressed.

As previously explained, the machine may be automatically released for operation by the traveling carriage in preselected columnar positions thereof, and this feature may be rendered inoperative by depression of a Non-Auto key 107. The Non-Auto key 107 is a stay-down key, that is, not released automatically at the end of machine operation, and functions to render the automatic releasing mechanism inoperative, so long as said key is in depressed position. A release key 112, located immediately below the Non-Auto key 107 (Fig. 1), is provided for releasing said Non-Auto key, when desirable. The functions of the machine may be further controlled by control surfaces on four positionable slides (not shown) which are positioned under control of the release bars 100, 101 and 102, or under control of the traveling carriage 54 in preselected columnar positions thereof. The positionable slides may be fashioned so as to provide the required control surfaces to obtain the necessary results in connection with the business system to which the machine is being applied. A main Release key 111 is provided for manually releasing the depressed amount keys 97 and the symbol keys 99 at any time when the machine is at rest, and said Release key also functions to release the depressed date keys 98, when the date non-repeat key is depressed and the machine is at rest.

The accounting machine keyboard also includes a full complement of control keys for controlling the functions of the balance totalizer which, as previously explained, is often referred to as a crossfooter, and these control keys include an Add key 113 (Figs. 1 and 3), a Subtract key 114, and a Total key 115. When used alone, the Total key 115 causes the balance totalizer to be reset or totalized, and when used in conjunction with a Sub-Total key 116 causes said totalizer to be read or sub-totalized. A Total key 118 is provided for conditioning any selected totalizer on the group totalizer line for a resetting or total-taking operation, and like the Total key 115 for the balance totalizer, may be used in conjunction with the Sub-Total key 116 to condition any selected group totalizer for a reading or sub-total-taking operation. The accounting machine keyboard also includes a Non-Select key 119, depression of which renders the traveling carriage control mechanism ineffective for selecting and conditioning the various totalizers for different functions. A Reverse key 121 is provided for reversing the adding and subtracting functions in both the balance totalizer and the group totalizers for the purpose of making corrections, and for other uses. This key is effective only when the selection and functions of the various totalizers are being controlled by the traveling carriage, and therefore is not effective when said functions are being controlled by the control keys 113 to 116 inclusive, and by the control key 118.

Figure 2:
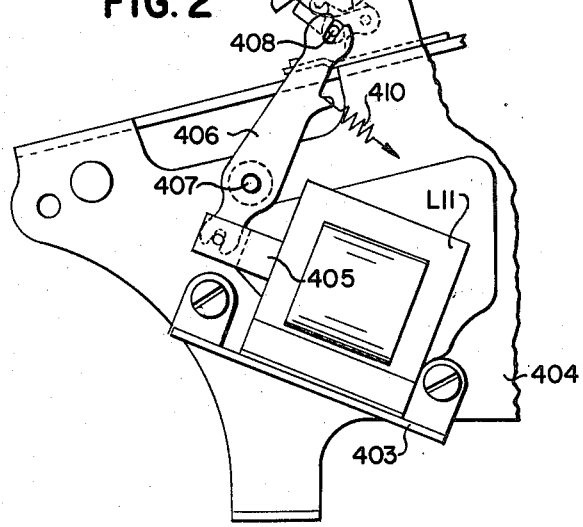
Fig. 2 is a detail right side elevation of a solenoid-actuated increment or step-by-step counter for automatically counting "void" operations.

In the present machine, contacts SC4a1 (Fig. 36A) have been added to the Reverse key 121 for the control of the recording of the + or − sign symbol as it is recorded along with certain amount entries on the tape. The closing of said contacts by depression of the Reverse key causes the normal + or normal − symbol to be reversed to correspond with the reversal of the add and subtract functions of the totalizers, as explained above. Located in the lower left-hand corner of the keyboard is a special function symbol or "S" key 122, operation of which closes normally open contacts SC2a1 (Fig. 36A) to cause a special "S" symbol to be recorded upon the tape during a machine cycle. Located just beneath the Special symbol key 122 is a Void key 123, operation of which closes normally open contacts SC9a1 and SC9a2 (Fig. 36A), which respectively control the operation of a Void relay K7 (Fig. 36A) and a Void counter operating solenoid L11 (Figs. 2 and 36A). The Void key 123 is used in connection with the correction of certain errors, and operation of said key prevents the recording mechanism from recording any further "segments" of the "frame," as will be explained more fully hereinafter.

Located on the left side of the accounting machine keyboard, just above the "S" key 122 (Figs. 1 and 3) are a clear "Non. Rec." signal light 94 and a red signal light 95, said non-record signal light 94 being lighted when the Void key 123 is effective, and being used to indicate that the recorder is temporarily inoperative. The red signal light 95 (Figs. 1 and 3) is controlled by the Master Record switch 156, located on the right-hand side of the machine case, said signal light being lighted when said Master Record switch 156 is in "On" position, thereby closing contacts SC10a1 to supply operating and control potentials to the recorder, said light indicating that the recorder is operable. When the Master Record switch 156 is in "Off" position, operating and control potentials are removed from the tape recorder portion of the machine, and the accounting machine may be used as an ordinary mechanical accounting machine. The usual signal light 120, located immediately above the Master Record switch 156 (Fig. 1), is lighted when the Main power switch MPS is in "On" position, and serves as a reminder that A.C. power is being supplied to the apparatus.

The present machine is provided with an electric typewriter attachment comprising a full complement of typewriter keys 117, located in front of and below the accounting machine keyboard, for typing data of a descriptive, instructive, or other nature upon the record material supported by the platen roll. The typewriter keyboard comprises the usual control keys for controlling the various functions of the traveling carriage, and also includes the "On" and "Off" toggle Main Power switch MPS for controlling the application of power to the apparatus.

*Amount key bank construction*

The amount key bank, and its associated differential mechanism, shown in Figs. 8A and 8B, will be described as representative of all the amount banks, inasmuch as these banks are similar in construction and operation.

The amount keys 97 for the amount bank shown in Fig. 8A are supported for vertical sliding movement on a corresponding partition plate 124, which forms a part of the removable amount keyboard framework. Compressible springs (not shown) urge the amount keys 97 upwardly to normally maintain them in undepressed position, as shown here. Each of the amount keys 97 has a pin 125 in its stem, which cooperates with a corresponding camming surface formed in an opening in a control plate 126. The pins 125 coact with angular noses formed on corresponding extensions on a detent 127, said angular noses terminating in latching shoulders which, in cooperation with flattened upper surfaces on the pins 125, retain said keys in depressed position. The pins 125 likewise have flattened lower surfaces, which coact with corresponding locking teeth formed in openings in a locking detent 128, said detent 128, the control plate 126, and the detent 127 being mounted for horizontal sliding movement on the partition plate 124, in the usual manner. A spring 129 tensioned between the control plate 126 and the flexible detent 127, urges said parts rearwardly and forwardly, respectively, to normally maintain the angular camming surfaces in the openings in said control plate 126 in yielding engagement with the corresponding pins 125, and to normally maintain the corresponding angular camming noses of the detent 127 in yielding contact with said pins 125.

Depression of one of the amount keys 97 causes the pin 125 therein, in cooperation with the corresponding angular nose, to shift the detent 127 rearwardly against the action of the spring 129 (Fig. 8A) and after the flat upper surface of said pin passes beyond the shoulder on said extension, the spring 129 returns said detent a slight distance forwardly to latch the shoulder over the flat surface to retain said key 97 depressed. Depression of an amount key 97, after a key in the same row has formerly been depressed, causes the pin 125 in said latter depressed key to shift the detent 127 rearwardly to release the formerly depressed key, to provide what is termed in this art as "flexible key action."

The locking detent 128 has an upward extension 130, with a rounded nose, which is maintained in yielding contact with an operating projection 131, fast to a key lock shaft 132 journaled in the keyboard framework, by a spring 133 tensioned between said extension and said projection. At the beginning of machine operation, counter clockwise movement of the key lock shaft 132 (Fig. 8A), through the spring 133, yieldingly carries the locking detent 128 rearwardly in unison therewith to move the teeth in the openings in said detent beneath the corresponding flat lower surfaces on the pins 125 to lock all undepressed amount keys in undepressed position, during machine operation. Near the end of machine operation, the shaft 132 is restored counter clockwise to move the locking detent 128 forwardly to ineffective position, and simultaneously a key release shaft 134, journaled in the keyboard framework, receives counter clockwise key-releasing movement. This movement of the shaft 134, through an arm, in cooperation with a corresponding upward extension of the detent 127, shifts said detent rearwardly, against the action of the spring 129, to disengage the shoulder from the upper flat surface on the pin 125 of the depressed amount key 97, to free said key to the action of its spring, which immediately restores said key upwardly to undepressed position. The key release shaft 134 functions in the manner explained above, in adding and subtracting operations, to release the depressed amount keys 97 at the end of machine operation. However, in total and sub-total operations said shaft 134 will receive its counter clockwise releasing movement near the beginning of machine operations to release any inadvertently depressed amount keys prior to such operation and thus prevent the possibility of an erroneous total being printed.

*Amount differential mechanism*

Each of the amount keys 97 (Fig. 8A) has secured in the lower end of its stem a square stud 135, which co-acts with a corresponding stop shoulder 136, formed on graduated steps on a key stop slide 137 shiftably connected to a corresponding pitman 138, the forward end of which pitman engages a corresponding side-spacing slot in a bar 139 mounted in the keyboard framework. The slide 137 is disengageably connected to the pitman 138 by a latch 140 pivoted on a stud 141 in said slide, said latch being urged clockwise by a spring 142 to normally maintain a shoulder 143 on its rear end in the path of a tooth 144 integral with the pitman 138. In adding and subtracting operations the slide 137 and the pitman 138 operate back and forth in unison as a single unit, and under such conditions the latch 140 remains latched over the tooth 144, as shown here.

As explained previously, the key release shaft 134 (Fig. 8A) receives counter clockwise movement at the beginning of total and sub-total operations to release any inadvertently depressed amount key 97. Secured to the shaft 134 is an arm 145 pivotally connected at 146 to the upper end of a bar 147. The bar 147 has a slot in its lower end which freely engages a guide stud 148 in the partition plate 124. Counter clockwise movement of shaft 134 and arm 145 shifts the bar 147 downward to cause a lower surface 149 thereon to engage a bent-over ear 150 on the latch 140, and rock said latch counter clockwise against the action of the spring 142. This moves the shoulder 143 out of the path of the tooth 144 to disconnect the slide 137 from the pitman 138, so that said slide may remain stationary while the pitman moves rearwardly to be positioned under control of the selected totalizer wheel, in a manner to be explained later. The above latch mechanism provides an extra safety measure to prevent the printing of an erroneous total, by insuring that the inadvertent or unintentional retention of an amount key 97 in depressed condition will not influence the positioning of the pitman 138 in total and sub-total operations.

After the latch 140 has been disengaged, as explained above, and the pitman 138 has moved rearwardly. independently of the slide 137, clockwise restoring movement of the shaft 134 and the bar 147 frees said latch 140 to the action of the spring 142, which restores said latch clockwise until an extension 151 thereof comes into contact with a stud in said slide 137, to which one end of the spring 142 is connected. This retains the latch 140 in proper engaging relationship to the tooth 144, so that said parts will coact properly upon restoring movement of said pitman 138, in a forward direction. Restoration or forward return movement of the pitman 138 causes the tooth 144 to by-pass the shoulder 143 on the latch 140 just prior to contact of abutting shoulders on the slide 137, and said pitman 138, to again couple said parts for concert movement.

The pitman 138 (Fig. 8A) has secured near its forward end a zero stop block 152, the upper edge of which coacts with teeth on a zero latch 153 free on a rod 154 supported in the keyboard framework. A bent-over upward extension of the latch 153 is maintained in yielding contact with the forward end of the control plate 126 by a spring 155 tensioned between said extension and a stud in said control plate. Depression of one of the amount keys 97 causes the pin 125 therein, in cooperation with the corresponding camming surface in the opening in the plate 126, to shift said plate forwardly against the action of the spring 125, causing said control plate to rock the zero latch 153 counter clockwise to move the teeth thereon out of the range of the stop block 152, to free the pitman 138 for positioning movement rearwardly, as will be explained later. If no amount key 97 is depressed in the denominational order being described, the zero latch 153 will remain effective, and in cooperation with the block 152 will retain the pitman 138 in its forward or zero position, as shown here.

In total and sub-total-taking operations it is necessary to release the zero latch 153, to free the pitman 138 for rearward movement so that said pitman may be positioned under control of the corresponding wheel of the selected totalizer, and this is accomplished by counter clockwise movement of the key release shaft 134 near the beginning of total and sub-total operations. Counter clockwise movement of the shaft 134, through an arm secured on said shaft, in cooperation with an upward camming extension on the control plate 126, shifts said control plate forwardly against the action of the spring 129, to rock the zero latch 153 counter clockwise to ineffective position to free the pitman 138 for positioning movement rearwardly under control of the corresponding totalizer wheel.

A hole in the rear end of the pitman 138 (Fig. 8A) freely engages a stud 157 in a reducer segment 158 free on a shaft 159 supported by the machine framework. The segment 158 is pivotally connected by a link 160 to a printing sector 161 freely connected to the upper end of an arm 162, in turn rotatably supported on a shaft 163 journaled in the machine framework. The arm 162 is connected to an operating arm 164 by a pin and slot connection, and an anti-rebound pawl 165 in cooperation with a comparatively strong printing sector operating spring 166, forms a yieldable connection between said arms 162 and 164 to prevent excessive rebounding of the printing sector 161 after its printing stroke, and thereby overcomes the danger of smudging the printing on the record material. The operating arm 164 has a tooth normally engaged by a printer operating trigger 167 mounted in the machine framework. Another tooth on the operating arm 164 cooperates with a tooth formed on the upper end of a zero elimination pawl 168 free on a rod supported by the machine framework and having a downwardly extending tail, which coacts with a stud 170 carried by the segment 158. A spring 169 urges the pawl 168 clockwise to normally maintain said pawl in effective position, as shown here.

A comparatively strong spring 171 (Fig. 8A) is tensioned between the segment 158 and a spring plate connected to a cross-bail 172, extending between similar arms 173 (only one shown here) of a carrying frame, said arms being free on the shaft 159. The spring 171 normally maintains an inward surface of the segment 158 in yielding engagement with a forward surface of the cross-bail 172. The leading frame bail 172 operates first rearwardly or counter clockwise, and through the spring 171 carries the segment 158, the pitman 138, and the slide 137 rearwardly in unison therewith until such movement is terminated in adding and subtracting operations, by the stud 135 in the depressed amount key 97 coming into contact with the corresponding step 136 on said slide 137. This obstructs further movement of the pitman 138, and, through the segment 158, positions the printing sector 161 in accordance with the value of the depressed amount key. The leading frame bail 172 continues its rearward movement without interruption, stretching the spring 171. Initial movement of the segment 158 in a counter clockwise direction causes the stud 170 to rock the zero elimination pawl 168 counter clockwise, against the action of the spring 169, to move the tooth of said pawl out of the path of the tooth of the operating arm 164.

After the leading frame bail 172 has completed its initial movement in a counter clockwise or rearward direction, and after the printing sector 161 has been positioned, as explained above, the trigger 167 is rocked counter clockwise out of engagement with the tooth on the arm 164, to free said arm and its companion arm 162 to the action of the spring 166, which carries said arms and the printing sector 161 rearwardly, causing said sector to engage first an inking ribbon (not shown) and then the record material supported by the platen 76, to print the value of the depressed amount key 97 on said record material. Clockwise printing movement of the arm 164 (Fig. 8A) is terminated by a surface 174 on said arm coming into contact with a stop bar 175 supported in the printer framework. However, the flexible connection formed by the antirebound pawl 165 and the spring 166 permits the arm 162 and the printing sector 161 to travel independently of the arm 164 the slight distance necessary to complete the printing stroke. Immediately after the printing stroke has been completed, the spring 166, through the pawl 165, returns the arm 162 and the printing sector 161 a slight distance away from the platen roll, so that any rebounding action of said printing sector will be absorbed by said pawl 165 and said spring 166.

The segment 158 has on its outer periphery alining teeth 176, which cooperate with an alining bar 177, extending between companion arms 178 (only one shown here) secured on an aliner shaft 179 journaled in the machine framework. Also secured on the aliner shaft 179 is a cam arm 180 yieldably connected to a companion arm 181, free on said shaft 179, by a comparatively strong spring 182 to form a connection which can yield in case the aliner 177 momentarily stumbles on one of the alining teeth 176. The arms 180 and 181 carry rollers which cooperate, respectively, with the peripheries of companion plate cams 183 and 184, secured on a main cam shaft 185, journaled in brackets depending from the lower surface of the base 52, said cam shaft making one clockwise revolution (Fig. 8A) each machine operation to operate the mechanism of the machine. After the segment 158 has been positioned under control of the depressed amount key 97, as explained above, and prior to operation of the printing sector 161, the aliner 177 receives initial clockwise movement, under control of the cams 183 and 184, to engage the teeth 176 to secure the segment 158, the printing sector 161, and connected parts in set positions during printing movement of said sector 161.

When no amount keyt 97 is depressed, in the bank illustrated in Fig. 8A, the segment 158 remains in home or zero position, as shown here, and consequently the zero elimination pawl 168 remains effective to block operation of the arm 164, when the printing trigger 167 is released, as explained above, to prevent the printing of zeros in orders in which no amount key is depressed. In all types of operations, it is desirable that the zeros in the lower orders print, when an amount key is depressed in a higher order, and to effect this, the pawl 168 is operatively connected to its adjacent lower order pawl and when said pawl 168 is moved counter clockwise by movemen of the segment 158 out of home position, it rocks the adjacent lower order pawl out of engagement with the corresponding tooth of its operating arm 164, to free said arm so that printing movement will be imparted to the lower order printing sector to record a zero in said adjacent lower order, and this action will continue throughout all the lower orders.

The operation of the printing arm 162 (Fig. 8A) and the corresponding printing sector 161 may be controlled by the traveling carriage 54 in preselected columnar positions thereof, through the medium of proper ones of the control plates 74, in cooperation with the corresponding sensing fingers 75, which in turn control the positioning of a non-print bail 187 in relation to an upper projection on the arms 164, the inner surface of said bail being machined in the required manner to form steps which control the operation of said arms 164 and their corresponding printer sectors 161. In this case the length of the control plate 74 controls the inward movement of the bail 187 to determine whether one or more of the control steps thereon will coact with the corresponding projections on the arms 164.

Printing movement of the printing sectors 161 may be further controlled by the traveling carriage 54 in preselected columnar positions thereof, through the medium of adjustable cam fingers 189 (Fig. 8A) mounted on the control stops 73. The fingers 189 are adjustable inwardly from ineffective position to two effective positions to control the movement of a coacting cam lever 190. The lever 190 is connected to and operates a printing control bail 188, which in turn coacts with projections on the printing arms 162 to obstruct the clockwise printing movement of said arms when said bail is positioned over the corresponding projections. As in the case of the bail 187, the bail 188 may be machined in any required manner so that when the finger 189 is adjusted to impart partial movement to the lever 190, certain machined surfaces of said bail 188 will become effective to coact with the corresponding projections on the arms 162 to obstruct printing movement of said arms and the sectors 161. When the cam finger 189 is adjusted to impart full movement to the lever 190, the entire machined surface of the bail 188 will become effective to coact with the projections on the printing arms 162 to obstruct printing movement of said arms and the corresponding printing sectors 161.

The pitman 138 (Figs. 8A and 8B) for the amount bank being described, is pivotally connected by a link 192 to a corresponding lever 193 free on a shaft 194, supported in the machine framework. A downward extension of the lever 193 carries a stud 195, which engages a vertical slot 196 in the forward end of a differential actuator rack 197, supported for horizontal sliding movement by means of slots in upward extensions of a sub-base 198 secured to the main base 52. The rack 197 is retained in the slots in the sub-base 198 by horizontal bars 199 and 200, which are secured to finished surfaces or pads formed on the sub-base 198. From the foregoing description it should be understood that any differential positioning imparted to the segment 158 by the amount keys 97, will, through the link 192 and lever 193, be also imparted to the differential actuator rack 197 to position said rack in accordance with the value of the depressed amount key.

*Totalizers in general and their actuation*

Gear teeth 201 (Fig. 8B) formed on the upper edge of the actuator rack 197 are arranged to be engaged with similar teeth formed on a balance totalizer main wheel 202 for the same order, said wheel being rotatably mounted on a tubular shaft 204 supported for horizontal shifting movement in a balance totalizer framework 205. The framework 205 is mounted for vertical shifting movement to engage and disengage the wheel 202 and the rack 197 in proper timing for the type of operation being performed. The main wheel 202 for the order being described is in constant mesh with and drives in a reverse direction a companion auxiliary wheel 203 which is rotatably supported on a tubular shaft 207 mounted in the balance totalizer framework 205 for horizontal selecting movement and for up and down engaging and disengaging movement in unison with its companion shaft 204. The wheel 203 has teeth which are arranged to be engaged with the teeth 201 in the rack 197 during overdraft total-taking operations in the balance totalizer, to control positioning of said actuator and the connected printing sector 161 in such operations to cause a true negative amount of the overdraft to be printed upon the record material, as is fully explained in the previously mentioned Christian application, Serial Number 446,292.

The teeth 201 in the actuator rack 197 likewise coact with teeth in corresponding order wheels 208 of a series of group or storage totalizers, rotatably mounted on a tubular shaft 209 (Fig. 8B) in turn supported for horizontal shifting movement, to select the different sets of group totalizers, in a group totalizer framework 210, said framework being mounted for vertical shifting movement in the machine to engage and disengage the selected group totalizer wheel 208 and the actuator 197 of the denominational order being described. The group totalizer assembly 210, in the present adaptation, has eight sets of group totalizer wheels 208. However, this is a matter of choice, as the group totalizer assembly may be provided with any lesser number of sets of group totalizer wheels 208 on the line 209, if desirable.

In adding and subtracting operations, the group totalizer line 209 (Figs. 8A and 8B) is first shifted horizontally to aline the selected set of group totalizer wheels 208 with the corresponding amount actuators 197, which are later positioned in the manner explained before, in accordance with the value of the depressed amount keys 97. In adding operations, after the actuator rack 197 has been positioned in accordance with the value of the depressed amount key, and after the leading frame bail 172 has completed its initial movement, rearwardly downward engaging movement is imparted to the framework 210 to engage the corresponding selected wheel 208 with the actuator 197 prior to its forward or return movement, which return movement advances said wheel in an additive direction to enter therein the value of the depressed amount key. After the actuator 197 has completed its return movement, upward disengaging movement is imparted to the group totalizer assembly 210 to disengage the corresponding wheel 208 from said actuator.

In subtracting operations, the selected group totalizer wheel 208 is engaged with the actuator rack 197 prior to its initial movement rearwardly. Initial movement of the actuator 197 rotates the selected totalizer wheel 208 in a reverse or subtractive direction until rearward movement of said actuator is terminated by the depressed amount key 97, to subtract from said wheel the value of said depressed amount key. After the actuator 197 and the leading frame bail 172 have completed their initial rearward movements in subtracting operations, upward disengaging movement is imparted to the group totalizer assembly 210 to disengage the wheel 208 from said actuator 197 prior to its return movement, after which said actuator is restored forwardly to its normal or zero position, as shown here. What has been said above concerning engaging and disengaging movement of the group totalizer assembly 210 in adding and subtracting operations applies equally as well to the balance totalizer assembly 205, which is actuated in adding and subtracting operations exactly in the same manner as explained for said group totalizer assembly 210.

In sub-total and total-taking operations, often referred to as "Reading" and "Resetting" operations, the group totalizer line 209 (Fig. 8B) is shifted first in a horizontal direction to aline the selected set of group totalizer wheels 208 with the actuators 197, and as in subtracting operations, the group totalizer frame or assembly 210 receives downward engaging movement to engage the corresponding wheel 208 of the selected group totalizer with the actuator 197 prior to its initial movement. As explained previously, in the beginning of total-taking operations, the key release shaft 134 (Fig. 8A) receives counter clockwise movement to shift the bar 147 downwardly to disengage the latch 140 from the tooth 144 to disconnect the key stop slide 137 from the amount actuator pitman 138 so that said pitman is free to be positioned under control of the selected totalizer wheel, without the danger of being maladjusted through inadvertent depression of or retention in depressed condition of one of the corresponding amount keys 97. Likewise, initial counter clockwise movement of the key release shaft 134 shifts the control plate 126 forwardly, in the manner explained before, to rock the zero latch 153 counter clockwise to ineffective position, to free the actuator pitman 138 for rearward positioning movement.

Initial rearward movement of the pitman 138 and the actuator rack 197 rotates the corresponding selected totalizer wheel 208 in a reverse direction until such movement is stopped by the long tooth on said wheel coming into contact with the corresponding tens transfer pawl to zeroize said wheel and to position the actuator rack 197 and the pitman 138 in accordance therewith, which positioning is transmitted by the segment 158 to the printing sector 161. Operation of the printing sector 161 records the value of the amount taken from the totalizer wheel upon the record material supported by the platen roll. In total operations, the group totalizer framework or assembly 210 receives upward or disengaging movement prior to return movement of the actuator rack 197, and consequently the wheel 208 remains in a zeroized condition. In sub-total operations, the corresponding wheel 208 remains in engagement with the rack 197 during its return movement, and is restored to its original condition, after which disengaging movement is imparted to the assembly 210 to disengage said wheel 208 from said rack 197.

Normal sub-total and total operations are performed in the balance totalizer 205 in exactly the same manner as explained in connection with the group totalizer 210. In overdraft sub-total and total operations, lateral shifting movement is imparted to the main and auxiliary shafts 204 and 207 (Fig. 8B) to move the main wheel 202 out of alinement with the actuator 197 and to simultaneously move its companion auxiliary wheel 203 into alinement with said actuator. The auxiliary wheel 203 is then engaged with the actuator 197, prior to its initial movement in a rearward direction, which movement rotates said wheel in a subtractive direction and simultaneously rotates the companion wheel 202 in an additive direction until said wheels are stopped in a position corresponding to zero by a fixed stop, which is brought into alinement with said wheel 202 when it is shifted out of alinement with the actuator 197. This causes the actuator 197 and the corresponding printing sector 161 to be positioned in accordance with the true negative balance on the corresponding wheel 202 of the balance totalizer. However, when this type of balance totalizer changes from a positive to an overdrawn condition or vice versa, the units wheel 202 is incorrect by one digit, and this must be corrected by the entering of a digit, often referred to as a "Fugitive 1." The "Fugitive 1" is entered subtractively in the units wheel 202 of the balance totalizer, when the highest order wheel 202 passes through zero, while traveling in a subtractive direction, that is, changes from a positive to an overdrawn condition. When the highest order balance totalizer wheel 202 passes through zero while traveling in an additive direction, that is, changes from an overdrawn condition back to a positive condition, the "Fugitive 1" is entered additively in the units wheel 202 to correct the error of one digit in said wheel. In overdraft sub-total operations, the auxiliary wheel 203 remains in engagement with the actuator 197 during its forward or return movement to restore the companion main wheel 202 to its original condition, and in overdraft total operations, sometimes referred to as "Credit Balance Operations," the auxiliary wheel 203 is disengaged from the actuator 197 after said actuator has completed its rearward movement and prior to its return movement, and consequently said wheel and its companion main wheel 202 remain in a zeroized condition.

The balance and group totalizers disclosed herein have many general features which are similar to those of the totalizers disclosed in the United States Patent No. 2,503,865, issued April 11, 1950, to R.A. Christian, to which reference may be had for a more detailed description of mechanism described only in a general way herein.

Mechanism is provided for selectively shifting the group totalizer line 209 horizontally with respect to the amount actuators 197 to selectively aline any desired set of totalizer wheels 208 thereon with said amount actuators. A similar mechanism is provided for shifting the main and auxiliary balance totalizer lines 204 and 207 horizontally with respect to the amount actuators 197, to aline either the main wheels 202 or the auxiliary wheels 203 with said actuators, depending upon the algebraic condition of said balance totalizer. The totalizer selecting mechanism is not pertinent to the present invention and for that reason is not disclosed herein. However, a full disclosure of the selecting mechanism is provided in the Christian et al. application, Serial Number 466,292, which may be referred to if a more complete explanation of said selecting mechanism is desired.

*Amount storage and read-out switch*

The present accounting machine is used as the data-entry machine for controlling the electrically operated and controlled tape recorder (Fig. 1) for recording data set up on the amount actuators 197 (Fig. 8B) upon a tape as an incident to the operation of the accounting machine. In this case the amount actuators 197, which are positioned under control of the amount keys 97 (Fig. 8A) in adding and subtracting operations, and under control of the selected set of totalizer wheels in sub-total and total-taking operations, control the setting of the amount storage and read-out switches which serve as a memory or storage device for momentarily retaining the data to be transmitted to the recorder to be used in recording the data for the various segments making up the "frame."

The machine chosen to illustrate the data-entry machine in the present invention, as at present constructed, is provided with ten amount rows or banks 97 of keys, similar to that disclosed in Figs. 8A and 8B, each of which is provided with one of the amount differential actuators 197, having teeth 201 on the upper edge thereof, which in addition to coacting with the selected totalizer wheels, also coacts with a corresponding switch controlling gear 215 (Figs. 15, 19 and 23) integral with a sleeve 216 free on a rod 217, extending between and supported by a right and left plate 218 and 219, and a center plate 220, said plates being secured to the sub-base 198 (Fig. 8B). Extending between the plates 218, 219 and 220, and supported thereby, are rods 221 and 222, similar to the rod 217, said rods being secured longitudinally by means of nuts 225, which engage the threaded ends thereof. The plates 218, 219 and 220 further support rectangular bars 223 and 224, properly spaced apart by three cross members which are in turn secured to the corresponding plates 218, 219 and 220. Also secured to the sleeve 216 (Figs. 8B, 15, 19 and 23) in fixed relationship to the corresponding gear 215, and to each other, are eight control disks 226 which make up the encoding drum, said disks, said sleeve and said gear, forming a cluster, which is rotatably supported on the rod 217, and secured against longitudinal displacement by means of spring clips 227 on each side thereof, which engage corresponding annular grooves in the rod 217.

By referring to Fig. 23, which is a chart giving in diagrammatic form the arrangement of the control disks 226 making up the encoding drum for one order, it will be seen that each denominational group of eight disks 226 are identified by the letters A to H, beginning with the righthand disk. Every other disk 226, beginning with A disk, and continuing C, E and G, has a series of sensing lugs or teeth 228, which coact with a downwardly extending sensing finger on a corresponding sensing plunger 229 (Figs. 15, 16, 17 and 19), and every other disk beginning with B, and continuing with D, F, and H, has similar sensing lugs or teeth 230, which coact with a downwardly extending sensing finger on a corresponding sensing plunger 231.

The plungers 229 and 231 are slidably supported in a shiftable framework by means of parallel finished surfaces on the upper ends thereof, which fit snugly between rods 233, and by means of slots in the lower ends thereof, which snugly engage a rod 234. The rods 233 and 234 extend between a series of similar plates 235, each of which has a slot 236 which engages a corresponding annular groove in the rod 221, and each of which has a finished surface 237 near the upper edge thereof, which engages a corresponding annular groove in the rod 222 to form a framework, which is shiftable angularly between the rods 221 and 222, and which slidably supports the sensing plungers 229 and 231. As stated above, there are four of the sensing plungers 229 and four sensing plungers 231 for each denominational order, and these eight plungers are arranged in short and long pairs, as shown in Fig. 16, so as to coact properly with the contacts which they operate, as will be explained later. Tensioned between each plunger 229 and 231 and a corresponding stud carried by the corresponding plate 235, is a spring 239, arranged to normally urge said plungers downwardly to maintain the ends of the slots in the lower ends thereof in yielding engagement with the stud 234, as shown here. Each plunger 229 and 231 is provided with similar opposed latching projections 240 (Figs. 15 and 16) which cooperate with two retaining pawls 241 rotatably mounted on studs extending between the plates 235, said pawls being urged inwardly by their respective torsion springs 243, to yieldingly engage the latching projections 240, as shown here.

*Switch framework shifting mechanism*

The switch framework comprising the plates 235 and rods 233 is shiftable first downwardly and then upwardly by mechanism now to be described to set the sensing plungers 229 and 231 according to the lugs on the control disks 226 which have been set in operative position by the corresponding amount actuators 197.

It will be observed by referring to Figs. 15 and 19 that the control disks 226 and their corresponding sensing plungers 229 and 231 are arranged in two general groups, including a righthand group of seven denominational orders and a lefthand group of three denominational orders, and that the plates 235 for each group have extending therethrough a rod 244 engaged by a series of cranks 245 secured on a shaft 246 journaled in the plates 218, 219 and 220. Secured on the lefthand end of the shaft 246 (Figs. 19 and 24) is an arm 247 pivotally connected by a link 248 to an arm 249 secured on a short shaft 250 supported between the parallel arms of a bracket 251, in turn secured to the bottom surface of the base 52. Also fast on the shaft 250 is an arm 252 pivotally connected by a link 253 to the lower end of a cam lever 254 pivoted on a shaft 255 (Figs. 14 and 24) supported between the parallel arms of a bracket 256 secured to the lower surface of the base 52. The lever 254 carries rollers 257 and 258, which coact respectively with companion plate cams 259 and 260 secured on a recorder control cam shaft 261 journaled between the parallel side members of the bracket 256.

Secured on the shaft 261 (Figs. 8A, 9 and 14) is a disk 263 carrying a stud 264, which pivotally supports a clutch pawl 265 urged clockwise by a spring 267 (Fig. 9) to urge a tooth 268 of said pawl toward a clutch cut 269 in a flanged portion of a hub 270 free on the shaft 261. Secured to the hub 270 is a gear 271, which meshes with a companion gear 272 secured on the main cam shaft 185, which, as previously explained, makes one clockwise revolution, as viewed in Fig. 8A, and one such counterclockwise revolution as viewed in Fig. 9, to operate the mechanism of the accounting machine. When the tooth 268 of the clutch pawl 265 is allowed to engage the clutch cut 260, counterclockwise rotation of the main cam shaft 185 and the gear 272 rotates the gear 271, hub 270, pawl 265, disk 263, and the recorder control cam shaft 261, in unison therewith, one revolution in a clockwise direction to operate certain contacts and other mechanisms as required in recording a "segment" of data on the tape.

The pawl 265 (Fig. 9) has an upwardly extending finger 273, which coacts with a stud 274 in the rearward arm of a lever 275 free on the shaft 255. A link 276 pivotally connects the lever 275 to a control slide 277, mounted for horizontal shifting movement upon fixed studs 278 (Figs. 9 and 10). An upward hook-shaped extension on the rearward end of the slide 277 has a slot which engages a stud 279 in a downward extension of a lever 280 free on a rod 1281 supported in the machine framework. An upward extension of the lever 280 has pivotally connected thereto the forward end of a pitman 281, having a slot 282 which slidably engages a stud 283 secured in the machine framework, to shiftably support said pitman 281. The rearward end of the pitman 281 has a control surface 284, which coacts with an extension 285 of a sensing finger 286 free on a rod 287 supported by the machine framework. Also free on the rod 287 is an arm 288, which is flexibly connected to the finger 286 by a spring 289 tensioned between said finger and said arm, which spring urges said parts in opposite directions to normally maintain a stud 290, carried by said finger 286, in yielding contact with a shoulder formed on the arm 288. A slot in the arm 288 engages a stud 291 in one arm of a lever 292 free on a rod 293 supported by the machine framework. A spring 297 urges the arm 288 counterclockwise (Fig. 9) and the lever 292 clockwise to normally maintain a forward extension of said lever in yielding contact with the lefthand end of a lever 294 free on a stud 296 (Fig. 11) carried by the machine framework. A righthand extension of the lever 294 is pivotally connected to the lower end of a corresponding one of the sensing finger 75, mounted for vertical shifting movement in the machine framework, the upper end of said finger arranged to coact with a corresponding one of the control plates 74, mounted in the stops 73. A spring 298 urges the lever 294 counterclockwise (Fig. 11) to normally maintain a prominent surface on the lower edge thereof in yielding engagement with the upper end of an operating slide 299, mounted in the machine framework and arranged to be operated first downwardly and then back to normal position by mechanism not shown but fully disclosed in the Christian Patent No. 2,626,749.

Initial movement downwardly of the slide 299, and consequent counterclockwise movement of the lever 294, under influence of the spring 298, causes the finger 75 to sense the control surface of the plate 74, to position said finger, said lever 294, the lever 292 (Fig. 9), and the arm 288, in accordance therewith. The arm 288 in turn positions the finger 286 and the extension 285 in relation to the control suface 284 on the pitman 281, in accordance with the length of the downwardly extending portion of the control surface on the plate 74. During positioning of the finger 286, the pitman 281, lever 280 and slide 277 are positioned in their normal or home position, as shown in dot and dash lines in Fig. 9, in which position the control surface 284 is out of the path of the extension 285, and therefore does not interfere with positioning of said finger 286. A spring 303 (Fig. 9) urges the slide 277 forwardly and the lever 280 counterclockwise to normally maintain said lever in yielding contact with an operating rod 300, mounted between the side arms of a yoke 301 connected by a link 302 to a lever (not shown) which coacts with a cam (not shown) on the main cam line 185, which cam, during rotation of said main cam line shifts the link and the yoke 301 first downwardly, or counterclockwise, and then upwardly to normal position. The spring 303 causes the lever 280 and the slide 277 to move in unison with the rod 300, in a counterclockwise and forward direction, respectively, which movement of said lever 280 shifts the pitman 281 rearwardly to cause the control surface 284 to sense for the extension 285, to position said pitman, the lever 280 and the slide 277 in accordance with the positioning of the finger 286, under control of the plate 74 (Fig. 11).

When the longest or "T" length control plate 74 is in position to be sensed by the finger 75, as shown in Fig. 11, the lever 294 and the extension 285 of the finger 286 are positioned, as shown in Fig. 9 so that said extension is opposite a notched portion 304 of the control surface 284. This permits full movement rearwardly of the pitman 281 from home position, as shown in dot and dash lines, to the position shown in full lines, said lever 280 in turn positioning the slide 277 in its extreme forward position, as shown here in full lines, under influence of the spring 303, as explained above. This forward positioning of the slide 277, through the link 276 (Fig. 9) rocks the lever 275 clockwise to move the stud 274 above and out of the path of the finger 273, and consequently the tooth 268 of the pawl 265 is free to engage the clutch cut 269 in the flange of the hub 270, to operatively connect the disk 263 and the recorder control cam shaft 261 to the gear 271, so that said shaft will be driven one clockwise revolution in unison with said gear 271 by the gear 272 and the main cam shaft, as explained before.

Near the end of machine operation, return movement upwardly of the link 302, the yoke 301, and the rod 300 (Fig. 9) causes said rod, to restore the lever 280 upwardly or clockwise in unison therewith, to shift the slide 277 rearwardly to home position against the action of the spring 303. This restoring of the slide 277 rearwardly, through the link 276, rocks the lever 275 counter clockwise to move the stud 274 into the path of the finger 273, which is the normal position of said parts. Any carriage stop 73 (Fig. 11) having a control plate 74, which is shorter than the "T" length plate (here shown) will position the extension 285 (Fig. 9) of the finger 286 in the path of the arcuate control surface 284 to obstruct movement of the pitman 281, arm 280, slide 277, and lever 275, to retain said lever 275 in its normal position, in which the stud 274 is in the path of the finger 273. Consequently in this instance the tooth 268 of the pawl 265 will be held out of engagement with the clutch cut 269, and therefore no movement will be imparted to the disk 263 and the shaft 261, and as a result the switch mechanism for the tape recorder device will be rendered inoperative.

From the above description it should be understood that operation of the recorder can be initiated under control of the traveling carriage in pre-selected columnar positions thereof, and that a "T" length control plate 73 (Fig. 11) must be in position to coact with the sensing finger 75 if the tape recording mechanism is to be rendered operative.

The position in which the tooth of the pawl 265 is engaged with and disengaged from the clutch cut in the hub of the gear 271 is approximately 70 degrees beyond the home position of said clutch cut and said gear. Consequently, the pawl 265 remains in engagement with the clutch cut when the gear 271 arrives at home position, as shown in dot and dash lines (Fig. 9) and is not restored to its normal 70 degree position until in the early part of the succeeding operation. If, in the succeeding operation, the arm 275 and stud 274 are positioned by other than a full or "T" length control plate 74 (Fig. 11) the finger 273 will engage said stud to disengage the tooth of the pawl 265 from the clutch cut 269 to render the tape recorder switch mechanism inoperative. After the tooth of the pawl 265 is disengaged, in the manner explained above, the disk 263 and shaft 261 are retained in normal 70 degree position by means of a homing notch 305 in the periphery of said disk, in cooperation with a roller 306, carried by an arm 307 free on the shaft 255, said arm being urged counter clockwise by a spring 308 to cause said roller to yieldingly engage said notch.

In addition to the control of the operation of recorder control cam shaft by control stops on the traveling carriage, in columnar positions thereof, as explained above, said control cam shaft may also be controlled by the Void key 123, (Figs. 1, 3, 5 and 10) depression of which moves a square stud 309 in a forward extension of the lower end thereof into the path of an upward projection 310 on the forward end of the slide 277, to obstruct initial movement forwardly of said slide, and thus to retain it in normal position, as shown here, in which the stud 274 (Fig. 9) is retained in the path of the finger 273, to disengage the pawl 265 and thereby render the recorder control cam shaft inoperative in the manner explained above.

Referring now to Figs. 14 and 24, the cams 259 and 260 for imparting shifting movement to the amount storage and read-out switch framework operate in unison with the recorder control cam shaft 261, and consequently are effective only when said shaft is rotated through the medium of the clutch mechanism described in connection with Fig. 9. Initial movement clockwise of the shaft 261 and cams 259 and 260, rocks the lever 254 first counter clockwise, which through the link 253 imparts similar movement to the arm 252, shaft 250 and arm 249, to in turn shift the link 428 downwardly. Downward movement of the link 248 rocks the arm 247, shaft 246, and cranks 245 counter clockwise as viewed in Fig. 24, and clockwise as viewed in Figs. 15 and 16, to shift the switch framework comprising the plates 235 and rods 233 and 234 downwardly, and said framework in turn carries the sensing plungers 229 and 231 downwardly in unison therewith, to cause said plungers to sense respectively for the lugs 228 and 230 (Fig. 23) on the control disks 226 of the encoding drums. Since lugs 228 and 230 are located in the path of the lower ends of the respective plungers 229 and 231, downward movement of said plungers, in unison with the switch framework 235, will be obstructed, and said plungers will be displaced upwardly in relation to said framework, against the action of the springs 239. The framework continues its downward movement, independently of the obstructed plungers 229 and 231, causing the teeth of the pawls 241 to ride over the rounded humps of the projections 240, and engage shoulders 311 (Figs. 15 and 16) formed by said projections, to retain said plungers in their displaced positions against the action of the springs 239.

After the plungers 229 and 231 have been displaced, according to the digits to which the encoding drums have been set by the actuators 197, continued rotation of the cams 259 and 260 (Fig. 24) restores the switch framework 235 upwardly to normal position. The plungers 229 and 231 (Figs. 15, 16 and 17) have fast to the upper ends thereof contact operating blocks 312 and 313, respectively, made of suitable insulating material, and upward movement of the displaced plungers 229 and 231, in unison with the framework 235, causes the corresponding blocks 312 and 313 to engage corresponding contact blades 314 and 315, and carry them upwardly, into contact with companion contact blades 316 and 317, to prepare circuits to the recorder to cause the digit entered in the particular denominational order being described to be transmitted to said tape recording device. It will be noted, that the contact operating plungers 229 and 231 are arranged in alternate long and short pairs, the long pair being shown in Fig. 16 and the short pair in Fig. 15, and that the contact blades 314 to 317 inclusive are located in proper coacting relationship with their corresponding plungers and operating blocks 312 and 313, as shown here. The contact blades 314–317 (Figs. 15, 16, 17 and 19) are connected by suitable wiring (not shown) to a multiple plug-in receptacle (not shown) mounted on a bar (not shown) of U shape in turn secured to the machine base at the back thereof, said receptacle in turn arranged to be connected to the tape recording device by means of a multiple plug connector (not shown) which is engageable with said receptacle.

Figure 36B:
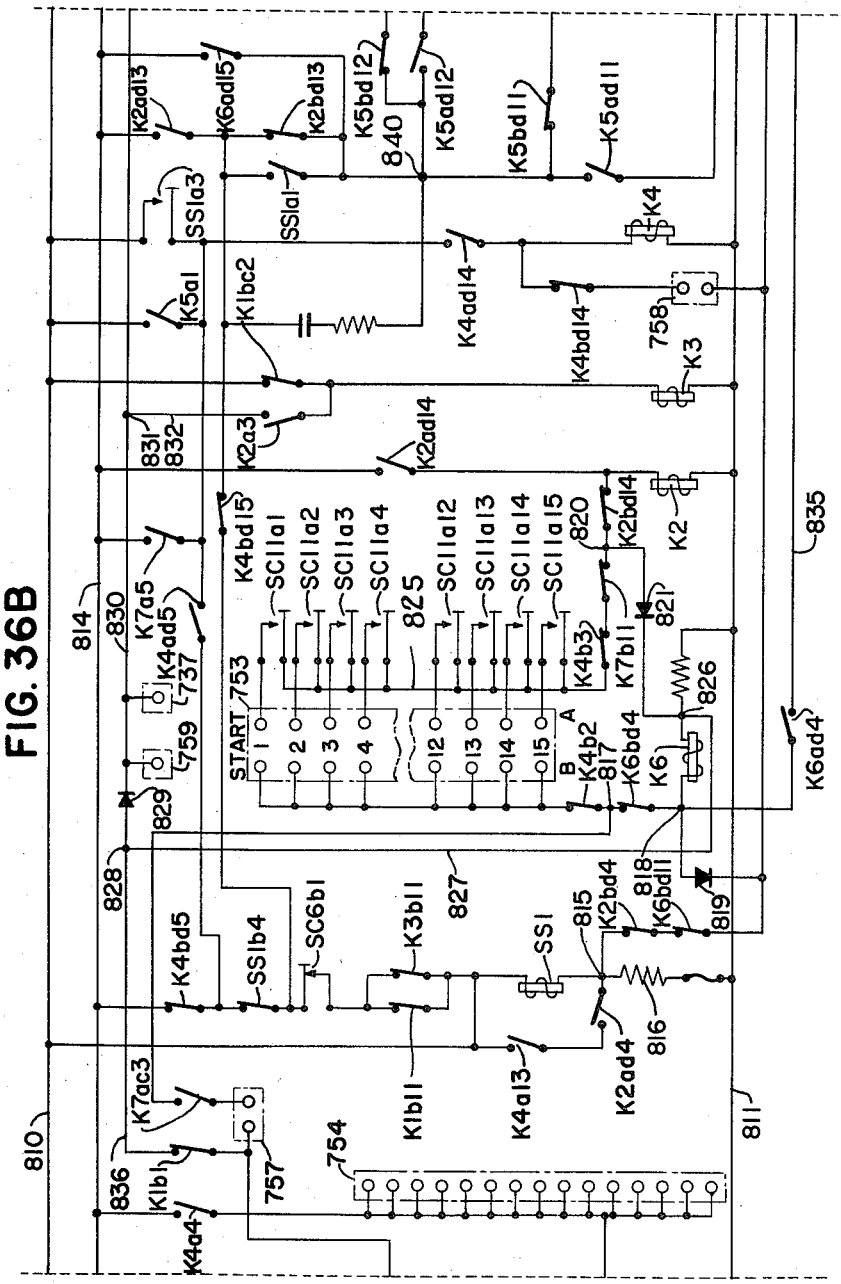
Figure 36C:
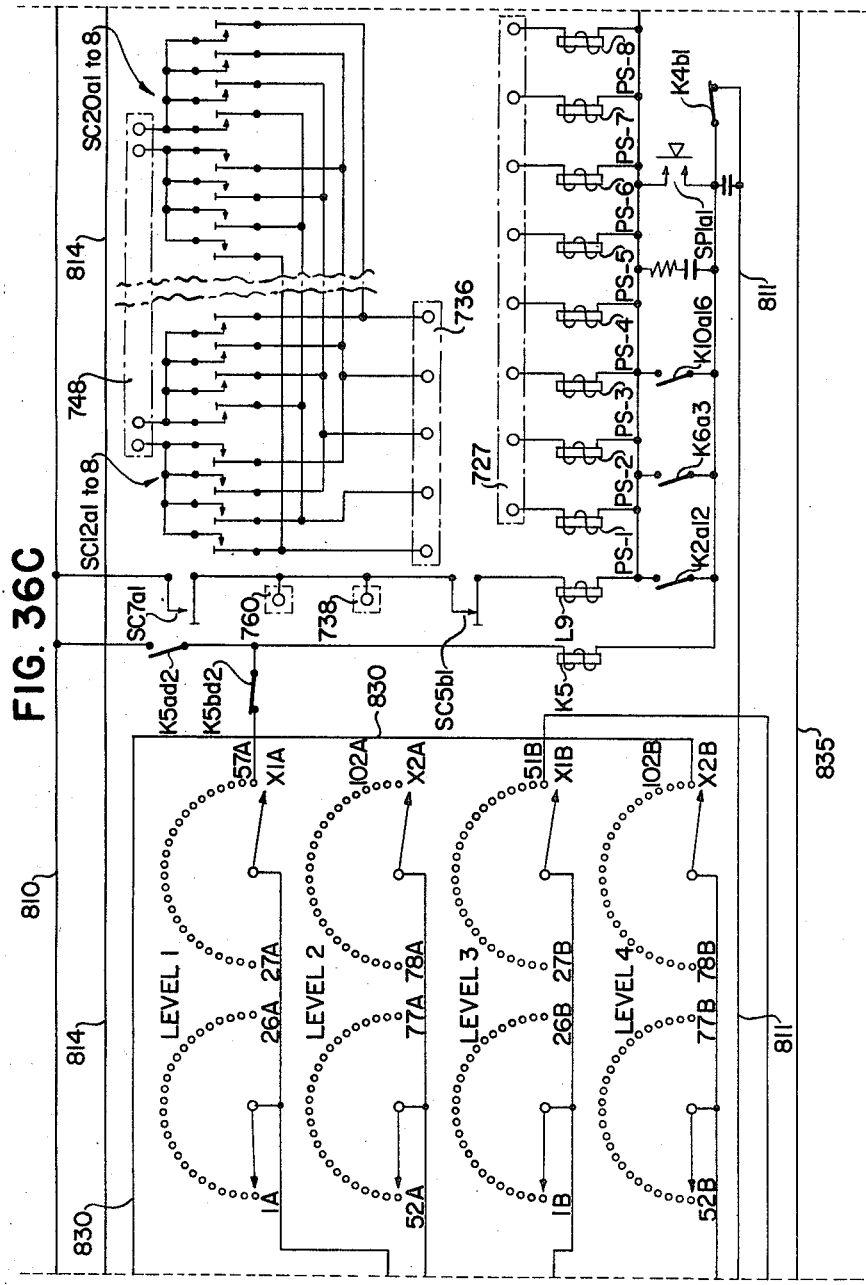

The various contacts of the amount storage and readout switches for the first and eighth rows are shown in the circuit diagram Fig. 36C and are given the reference numbers SC12a1 to 8 and SC20a1 to 8, respectively, the switches for rows two through seven being omitted from the circuit diagram inasmuch as they are similar to the ones which are shown.

The pawls 241 (Figs. 15 and 16) retain the operated switch plungers 229 and 231 in operated position at the end of machine operation, and if in the succeeding machine operation different plungers are displaced, the displacing of said different plungers causes the projections 240 thereon to rock the retaining pawls 241 out of engagement with the shoulders 311 of the previously displaced plungers to free said plungers for return movement downwardly to normal position, under influence of their respective springs 239.

The chart (Fig. 23) shows the arrangement of the lugs 228 and 230 on the control disks 226 of the encoding drum for the different digits, zero to nine inclusive, of one denominational order. As previously explained, there are eight control disks 226 in the encoding drum for each denominational order, and these are identified in the chart by letters A to H inclusive, beginning with the righthand disk, and that every second disk, beginning with the A disk 226, has the control lugs 228 thereof located to the right of the angular center line, and that the remaining four disks, beginning with the B disk 226, have the lugs 230 thereof located on the left side of said angular center line. In the chart (Fig. 23) the Roman numeral I is used to indicate the high spot or lug 228 on the right side of the center line, and the Roman numeral II is used to indicate the high spot or lug 230 on the left side of the center line. Therefore, consulting the chart it will be apparent for the particular code being used that zero is obtained by a lug 228 on the E disk 226, and a lug 230 on the F disk 226. Likewise the digit 1 is obtained by a lug 230 on the B disk 226 and a lug 228 on the G disk 226, and so on. From the above description, it should also be clear that for the instant code the plungers 229 and 231 and their corresponding contacts for each denominational order are always operated in pairs in order to send the proper encoded data representing signals to the recorder.

It is to be understood that the arrangement of lugs 228 and 229 on the discs of the encoding drum as shown in Fig. 23 is merely illustrative of one code which may be used and that other codes could be used merely by supplying encoding drums with the proper arrangement of lugs thereon.

*Carriage position switch mechanism*

As explained at the beginning of this specification, operation of the recorder is controlled by the traveling carriage in pre-selected columnar positions thereof, so as to permit the arranging of various programs adaptable to different business systems. A carriage position switch mechanism, similar in many respects to the amount storage and read-out switches explained above, is arranged at the back of the traveling carriage, and said switch mechanism is operated or controlled by adjustable stops located on the rear form or stop bar at the rear of the carriage to be effective in preselected columnar positions of the traveling carriage, for completing circuits which are coordinated with the programming means in the recorder to insure that the "segments" related to the various carriage positions will be recorded in proper sequence within the "frame" of data. The manner in which these switches exert their control will be explained fully when the circuit diagram is explained. The carriage position switch mechanism works in conjunction with the carriage controlled mechanism shown in Figs. 9 and 11, and explained above, and must be arranged to agree therewith, as will be explained more in detail presently.

Directing attention to Figs. 8A, 8B, 18 and 20, a rear form or stop bar 319 is removably mounted on brackets (not shown) secured to the framework of the traveling carriage 54 at the rear thereof, in a manner similar to that in which the form or stop bar 72 is attached to the front of the traveling carriage. The bar 319 extends substantially the full length of the traveling carriage and has in the rearward face thereof a T-shaped slot arranged to receive T-shaped nuts 320, which in cooperation with corresponding screws 322, serve to adjustably mount a series of switch operating stops or plates 321, along said bar in predetermined columnar positions, to agree with the business system to which the machine is being applied.

The stops or plates 321 are divided into upper and lower sections, each having eight holes (Figs. 8B and 18) arranged to accommodate a switch operating stud 323, said stud arranged to coact with corresponding switch plungers 324 (Fig. 20), which are similar in outline and function exactly like the amount storage switch plungers 229 and 231 (Fig. 15). Fifteen of the 16 holes in each of the plates 321 may be used for controlling the closure of contacts SC11a1 to SC11a15 which are coordinated with the programming means in the recorder, in accordance with the columnar position of the traveling carriage, while the 16th position is used for opening contacts SC11b16 which are in the circuit of the void relay K7 (Fig. 36A). As shown in Figs. 8B and 18, one stud position of positions 1 through 15 is used for each columnar position of the traveling carriage. In addition to a stud in one of the positions 1 to 15, the plate which controls the recording of the first "segment" of a "frame" will have a stud in the sixteenth position. The rear stops or plates 321 may be arranged along the length of the bar 318 to correspond with the various columnar positions of the traveling carriage and, as mentioned previously, said plates 321 must be arranged in agreement with the location of the carriage control stops 73 on the bar 72 (Fig. 8A) and it is therefore evident that if it is desired to change the program of the machine, it is necessary to replace both the front bar 72 and the rear bar 319 with other related bars, which have stops arranged thereon for the desired program or system.

The plungers 324 are slidably mounted in a shiftable framework in exactly the same manner as the amount storage switch plungers 229 and 231. Each of the plungers 324 (Fig. 20) has an enlarged rearward end with parallel surfaces which fit snugly between rods 324, while the forward ends of said plungers are slotted to snugly embrace a rod 326, said rods 325 and 326 extending between upper and lower switch frame plates 327 and 328 (Figs. 20 and 21) to form a shiftable framework for supporting said plungers 324. It will be noticed that the enlarged rearward ends of the plungers 324 fit snugly in corresponding annular grooves in the rods 325 and that the slotted forward ends of said plungers fit snugly in corresponding annular grooves in the rod 326 to properly side-space said plungers. The switch plunger supporting framework is shiftably mounted, by means of the lefthand edges (Figs. 20 and 21) of the plates 327 and 328, in cooperation with corresponding annular grooves in a stud 329, and by means of slots 330 in the righthand forward edges of said plates, in cooperation with corresponding annular grooves in a stud 331. The studs 329 and 331 are secured in a switch assembly support plate 332, the forward edge of which is secured to the plate 68 (Fig. 8B) and a rearward extension 333 of which is secured by screws to a bent-over portion of a bracket 324 secured to the center plate 220 (Fig. 15).

As previously explained, the carriage position switch operating plungers 324 are similar to the amount storage switch plungers 229 and 231 in appearance and in operation, and each of said plungers 324 is urged inwardly by a corresponding spring 336 to normally maintain the bottom of the slot in the inner end thereof in yielding engagement with the stud 326, as shown in Fig. 20. The plungers 324 are retained in displaced position by two retaining pawls 337, mounted opposite each other on studs 339, extending between the plates 327 and 328 (Fig. 21) and said pawls are urged inwardly by corresponding torsion springs 340 to normally maintain the teeth thereof in yielding engagement with two similar retaining projections 338, formed opposite each other on each of said plungers 324. Each of the plungers 324 (Fig. 20) has a block 341 of suitable insulating material, integral with the outer or rearward ends thereof, for engaging the corresponding contact blades 342 and 343, and moving said contact blades into engagement with companion blades 344 and 345 to complete a circuit for controlling the operation of the recorder, in accordance with the columnar position of the traveling carriage. The contact blades 342–345 are properly mounted in an upwardly extending portion of a bracket 346 secured to the upper surface of the plate 332. The carriage position switch mechanism shown in Fig. 20 is enclosed in a cover 347, which is removably attached to the top surface of the plate 332 by means of screws 348.

The plate 328 (Figs. 20 and 21) carries a stud 349 freely engaged by a hole in the inner end of an arm 350 secured on a short vertical shaft 351 rotatably supported in a bushing secured in the plate 332. Also secured on the shaft 351 is a crank 352 connected by a wire link 353 to a crank 354 (Figs. 15 and 24) in turn secured on the shaft 246 which, as previously explained, imparts inward and outward shifting movement to the framework 235 for the amount storage switch plungers 229 and 231. It will be recalled that, the shaft 246 receives its movement from the recorder control cam shaft 261 which functions only when the recorder is to operate in conjunction with the accounting machine. Initial movement of the shaft 246 shifts the link 353 rearwardly, which in turn rocks the crank 352, shaft 351, and arm 350 clockwise (Fig. 20) to shift the framework carrying the plungers 324 inwardly. Initial movement inwardly of the plunger framework causes the stud 323 located in effective positon, to be engaged by the corresponding plunger 324 to displace said plunger outwardly with respect to its framework. Displacing of the plunger 324 causes the projections 338 thereon to ride past the tooth of the retaining pawls 337, whereupon said pawls are spring-returned inwardly into engaging relationship with shoulders formed by said projections, to retain said plunger in its displaced condition. Return movement of the shaft 246 restores the framework for the plungers 324 outwardly causing the block 341 on the displaced plunger to engage the blade 342 of the corresponding contacts and move said blade into contact with its companion blade 344 to complete a circuit to control the programming means of the recorder in accordance with the columnar position of the traveling carriage. It should be remembered that only one of the plungers 324 corresponding to positions 1 to 15 functions for each columnar position of the traveling carriage. However, like the amount storage switch plungers 229 and 231 (Figs. 15 and 16) these plungers are arranged in long and short pairs, which coact with their corresponding contact blades 342–345 in exactly the same manner as explained in connection with said amount plungers.

The contacts which are selectively closed by the carriage position switch are shown in Fig. 36B and are designated SC11a1 to SC11a15. The manner in which they control the recorder will be explained in detail when the circuit diagram is described.

Referring to Figs. 8B and 20, the bar 319 is slidably supported between vertically alined rollers 430 and 431 free on studs in an upright portion of an angle-bracket 432 secured to the upper surface of the plate 332. Opposed flanges on the rollers 430 and 431 engage corresponding linear grooves in the upper and lower surfaces of the bar 319 to prevent flexing of said bar when the effective plunger 324 is being displaced by the corresponding stud 323. It will be noted that the rollers 430 and 431 (Fig. 20) are located directly opposite the carriage position switch plungers 324 and serve to reinforce the comparatively long bar 319 against flexing and strain at the point where said plungers engage and are displaced by the studs 323.

Like the amount switch blades 314–317 (Fig. 15) the carriage controlled switch blades 342–345 (Fig. 20) are connected by suitable wiring to a multiple plug-in receptacle (not shown) mounted on the U bar located at the rear of the machine. The receptacle is engageable by a multiple plug connector (not shown) connected by suitable wiring to the tape recording device.

Instead of relying upon the projections 338 (Figs. 20, 21 and 22) of the plunger 324 being displaced to rock the retaining pawls 337 outwardly to release any previously displaced plunger, a pawl disengaging plate 354 is provided for assisting in the disengaging of said pawls. The plate 354 is shiftably supported in the plunger framework in exactly the same manner as the plungers 324, by means of parallel surfaces formed on the rearward ends thereof, in cooperation with corresponding annular grooves in the studs 325, and by means of a slot in the forward end thereof, which engages a corresponding annular groove in the stud 326. A spring 355 urges the plate 354 inwardly to normally maintain the bottom of the slot in the inner end thereof in yielding engagement with the stud 326, as shown in Fig. 22.

Initial movement inwardly of the framework for the plungers 324, including the plate 328, carries the plate 354 inwardly in unison therewith until an arcuate shoulder 356 formed on said plate, engages the tooth of a plate control pawl 357 rotatably supported on a stud 358 secured in the plate 332 (Figs. 20 and 22). This terminates inward movement of the plate 354, causing two similar opposed angular camming surfaces 360 thereon, in cooperation with the teeth of the pawls 337, to urge said pawls outwardly, out of engagement with the projections 338 on the previously displaced plunger 324. Disengaging of the pawls 337 frees the previously displaced plunger 324 and permits it to be restored inwardly by its spring 336. Continued inward movement of the framework, including the plate 328, causes a stud 361, secured in an extension of said plate, to engage the pawl 357 and rock said pawl clockwise (Fig. 22) against the action of a spring 359. Clockwise movement of the pawl 357 disengages the tooth thereon from the arcuate shoulder 356 to free the plate 354 for restoration inwardly by the spring 355 to normal position. Restoring of the plate 354 frees the pawls 337 to the action of their springs 340 (Figs. 20 and 22), which restores said pawls to normal position where they yieldingly engage the projections 338 of the plungers 324. The pawls 337 become effective in ample time to engage the shoulders formed by the projections 338 of the plunger 324 being displaced in the present operation to retain said plunger in displaced position for operation of the corresponding contact blades, upon return movement outwardly of the plunger framework. As was mentioned before, the plate 354 is provided for assisting the plunger 324 being displaced in moving the pawls 337 outwardly against the action of their springs 340, to insure that any previously displaced plunger 324 is released and restored inwardly prior to the displacing of another plunger, and, as said plungers 324 are used singly, to relieve them of possible excessive strain in connection with disengaging said pawls 337.

Record contacts

The mechanism shown best in Figs. 13 and 14, is provided for insuring that operation of the tape recorder starts at the proper time during the machine cycle, which proper time is, immediately after the amount actuators have received their full extent of initial movement in a rearward direction, to be positioned, either by the depressed amount keys in adding and subtracting operations, or by the wheels of the selected totalizer in sub-total and total-taking operations.

Secured on the recorder control cam shaft 261 which, as previously explained, operates only when the recorder is to function with the accounting machine, is a plate cam 363, which coacts with a roller 364 carried by a lever 365 pivoted on the shaft 255 and urged clockwise by a spring 370, to normally maintain said roller in yielding contact with the periphery of said cam. When the clutch mechanism for the shaft 261 is effective it causes said shaft and the cam 363 to be rotated by the mechanism shown in Fig. 9, in the manner explained earlier. After the cam 363 has moved about 220 degrees beyond home position, to provide ample time for the amount actuators 197 to complete their initial movements rearwardly, said cam cooperating with the roller 363, rocks the lever 365 counter clockwise against the action of its spring 370. Counter clockwise movement of the lever 365 causes a block 366 fast on a downward extension thereof and formed of suitable insulating material, to engage a flexible spring blade 367, and carry a contact on the lower end of said blade into engagement with a similar contact on a companion blade 368 to close contacts SC1a1 (Fig. 36A) which complete a circuit to the recorder to cause the recording process to be started therein at the right stage of operation of the mechanical portion of the accounting machine. Near the end of machine operation the cam 363 permits the spring 370 to restore the lever 365 clockwise to open the contacts SC1a1 to interrupt the circuit to the recorder. The contact blades 367 and 368 are mounted on a bar 369, bent-over portions of which are connected to the side plates of the bracket 256, as shown in Figs. 12 and 13.

Lock-up solenoid

A lock-up solenoid L10 (Figs. 7 and 36A) is provided for locking the machine against release while the recorder is operating. The solenoid L10 is secured to a bracket 372, in turn secured to a hanger 373 fastened to the bottom surface of the machine base 52. The solenoid L10 has a shiftable armature 374 carrying a pin which engages a slot in an upward extension of a lever 375 free on a stud 376 secured in the bracket 372. A spring 377, connected between the lever 375 and the bracket 372, urges said lever clockwise (Fig. 7) to the position here shown, to normally maintain the upward extension of said lever in yielding contact with a stop stud 381 fast in the bracket 372. A rearwardly extending finger 378 of the lever 375 is arranged to cooperate with the toe of a foot-shaped extension of an arm 379 secured on a release shaft 380 journaled in the machine framework. Secured on the shaft 380 is a release lever 382, having a slot which engages a stud in the downward end of a lever 383 secured on a shaft 384 journaled in the machine framework. Also secured on the shaft 384 is an arm (not shown) connected to a release slide (not shown), which is normally retained in unreleased position, as shown in Fig. 6, against the action of a spring 385, by a normally effective latch mechanism (not shown). The latch mechanism may be unlatched by depression of any one of the starting bars 100, 101, or 102 (Fig. 1) or other so-called "motorized keys," or by means of the traveling carriage in preselected columnar positions thereof, to free the lever 383. Freeing of the lever 383 (Fig. 6) to the action of the spring 385, permits said spring to rock said lever counter clockwise, to in turn rock the lever 382, shaft 380, arm 379, and a clutch release arm 386, also fast on said shaft 380, clockwise. Clockwise movement of the arm 386 moves the lower end thereof out of the path of the foot-shaped extension of a clutch operating arm 387 free on the hub of a disk 388 secured to the main cam shaft 185. Freeing of the arm 387 permits a spring 389 to rock said arm clockwise (Fig. 6) to engage a clutch dog 390 mounted for rotation in the disk 388, with one of a series of notches in the periphery of a machine operating drum 391 free on the shaft 185. Integral with the drum 391 is a gear 392, which meshes with a pinion 393 secured on a shaft 394 journaled in the machine framework, said shaft being operatively connected to the operating motor and driven continuously thereby in a counter clockwise direction (Fig. 6). The gear 392 drives the disk 388 and main cam shaft 185 clockwise to operate the mechanism of the accounting machine in the usual and well known manner, and after said disk and said shaft have completed approximately one revolution, the arm 386 and connected mechanism are restored counter clockwise to move said arm into the path of the foot-shaped extension of the arm 387. Engagement of the arm 387 with the arm 386 disengages the dog 390 from the drum 391 to terminate operation of the machine, after the main cam shaft has completed one clockwise revolution, which is required for each accounting machine operation. Restoring of the arm 386, and connected mechanism, counter clockwise, causes the latch mechanism to again become effective to retain said parts in their restored condition until the machine is again released for operation. The usual non-repeat device is provided for preventing repeat operations of the machine in case one of the starting bars is retained depressed at the end of a machine cycle.

The accounting machine releasing mechanism described in a general way above, is fully disclosed in connection with Figs. 123 and 129, and the description associated therewith in the Christian et al. Patent No. 2,626,749, to which reference may be had if a more detailed description is desired of this mechanism.

The controls for the Lock-up solenoid L10 will be explained fully when the circuit diagram of Figs. 36A to 36D is described.

Void operation controls

As previously explained, the Void key 123 (Figs. 1, 3 and 5) is used in connection with the correction of errors during the recording of a "frame" of data. When an error has been detected, the Void key is depressed in connection with an operation of the accounting machine and will control the recorder to prevent the punching of any further "segments" of the "frame," and will cause the punching of a Skip symbol for each "segment" which has been by-passed and the punching of a Void symbol at the end of the "frame." The operation of the Void key will also cause the Void counter to be operated.

The Void key 123 (Fig. 5) has an insulating roller 411 secured thereto which, upon depression of the key, is operable to engage a pair of laterally disposed switch blades 412 of contacts SC9a1 and SC9a2 and carry these blades into engagement with a pair of companion switch blades 413.

Contacts SC9a1 Figs. 5 and 36A which are thus closed upon the depression of the Void key 123 prepare an energizing circuit for the Void relay K7; and contacts SC9a2 (Figs. 5 and 36A) prepare an energizing circuit for the Void counter operating solenoid L11.

As explained earlier, the Void key 123, through the stud 309 (Fig. 10) prevents the clutch from connecting the recorder control cam shaft 261 to the accounting machine drive even though the stop at the front of the carriage calls for a recorder operation.

The recorder is enabled for operation to punch Skip symbols and the Void symbol even though the recorder control cam shaft 261 does not operate. As explained earlier, the gear 272 on the main drive shaft 185 of the accounting machine meshes with a gear 271 on the hub 270 loose on the shaft 261 and drives the hub in each accounting machine operation. A cam 395 (Fig. 12) is secured to the hub 270 and is driven in each accounting machine operation. The periphery of the cam 395 coacts with a roller 396 carried by a lever 397 free on the shaft 255, and urged clockwise by a spring 398, to normally maintain said roller in yielding contact with the periphery of said cam 395. Rotation of the cam 395, in cooperation with the roller 396, rocks the lever 397 counter clockwise, against the action of the spring 398, causing a block 399, made of suitable insulating material and fast to the lower end of said lever 397, to engage a pair of laterally disposed switch blades 400 of contacts SC8a1 and SC8a2 (Figs. 12 and 36A) and move the contacts of said blades into engagement with similar contacts on companion switch blades 401, to complete the circuits which were prepared by contacts SC9a1 and SC9a2 which were closed by the depression of the key.

The circuit over contacts SC9a1 and SC8a1 energizes the Void relay K7 (Fig. 36A) which provides the necessary controls for the recorder as will be explained fully when the circuit diagram is described.

The circuit over contacts SC9a2 and SC8a2 energize the Void counter operating solenoid L11.

A step-by-step or increment counter 409 (Figs. 1 and 2) is provided for counting the number of void operations performed in connection with the tape recording mechanism, and this void counter is actuated to count one each time the Void key 123 is depressed. The Void counter operating solenoid L11 is mounted on a bracket 403 secured to a plate 404, in turn secured to the machine base 52. The solenoid L11 has a shiftable armature 405 carrying a pin which engages a slot in a downward extension of a lever 406 free on a stud 407 fast in the plate 404. A slot in the upper end of the lever 406 engages a stud 408 in the feed pawl supporting yoke for the void counter 409. A spring 410 urges the lever 406 clockwise to normally retain the feed pawl for the counter 409 in retracted or take-up position. When the solenoid L11 is energized in a Void operation, over contacts SC9a2 and SC8a2, operation of its armature 405 rocks the lever 406 counter clockwise, against the action of the spring 410, to operate the feed pawl for the Void counter 409, to cause the units wheel of said counter to be advanced one step or one digit to keep an accurate count of the number of void operations performed. The wheels of the void counter 409 are visible through a corresponding opening in the keyboard plate 96, and said counter 409 is provided with a resetting wheel for manually resetting the counter wheels to zero whenever required.

*"S" symbol and reverse keys and overdraft controls*

Under certain circumstances it may be desirable to identify certain "frames" of data so that they may be segregated in the processing of the tape. For this purpose the "S" key 122 (Figs. 1, 3 and 5) has been provided, and when depressed, causes an insulated roller 415, carried thereby, to engage an extension of a spring switch blade 416 of contacts SC2a1 (Fig. 36A) and carry a contact on said blade into engagement with a similar contact on a companion spring blade 417, to prepare an energizing circuit for relay K8 which, through proper electrical controls, causes a distinguishing symbol to be recorded on the tape, at the end of a "frame" so that said data from a particular item may be readily identified. The manner in which the relay K8 is controlled from the "S" key and exerts its control in recording the special "S" symbol will be explained more fully when the circuit diagram (Figs. 36A to 36D) is described.

The "R" or reverse key 121 (Figs. 1, 3 and 5) is provided for reversing the add and subtract operation of the totalizers and is used for correcting errors. This key not only controls the accounting machine but also controls the recorder to cause the "+" or "—" signs which are normally recorded before amounts to be reversed. Depressing the "R" key 121 (Figs. 1, 3 and 5) causes an insulated roller 418 carried thereby to engage a spring switch blade 419 of contacts SC4a1 and carry a contact on said blade into engagement with a similar contact on a companion blade 420 to prepare a circuit to the Sign Control relay K9. This circuit will be completed when Record contacts SC1a1 operate to initiate the recording of the "segment" of data. Relay K9 causes the + or — sign, which normally is punched on the tape before an amount, to be reversed. The manner in which relay K9 effects the sign reversal will be explained fully when the circuit diagram Figs. 36A to 36D is described.

Relay K9 will also be operated under control of the balance totalizer to cause the signs to be reversed when a normally plus balance becomes negative.

The shiftable balance totalizer shaft 204 (Figs. 4 and 8B) has secured near the left end thereof a shifting disk 421, the outer face of which is normally engaged by the rounded end of a stud 422 made of suitable insulating material, and secured to the lower end of a spring switch blade 423 of contacts SC3a1 having a contact point arranged to be engaged with a similar contact point on a companion blade 424, said blades being properly mounted on a bracket 425, in turn secured to a plate 426, secured to the machine base near the lefthand side thereof.

Figure 4:
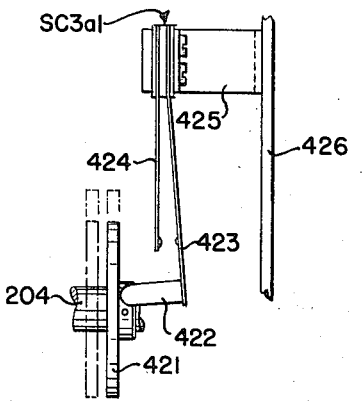
Fig. 4 is a detail showing the overdraft control contacts controlled by the accumulator to provide a control for the recorder when the balance is negative.

When the balance totalizer is in a positive condition, the shaft 204 and disk 421 are positioned, as shown in full lines in Fig. 4, whereupon said disk, in cooperation with the stud 422, retains the blade 423 of contacts SC3a1 in open position, as here shown, and in this case the normally + symbol will be recorded upon the tape to indicate that the recorded amount is normally a plus amount. In sub-total and total operations, if the balance totalizer is in an overdrawn or negative condition, the overdraft sensing mechanism will cause the balance totalizer shaft 204 and the disk 421 to be shifted laterally from the full line position (Fig. 4) to the dot and dash position, to cause the true negative amount of the overdraft to be recorded, as is the usual practice. Shifting of the disk 421 from full line to dot and dash line position, causes the contact point on the blade 423 of contacts SC3a1 to engage the contact point on the blade 424 to prepare a circuit to relay K9 which relay causes the normally + symbol to be reversed so that a — symbol will be recorded before the amount upon the tape, when said balance totalizer is in an overdrawn condition.

*Recorder*

The recorder portion of the apparatus, which is shown in Figs. 1 and 25 to 34, is contained in a cabinet 600 mounted at the side of the accounting machine and connected thereto by suitable cables so that the accounting machine can exert the necessary controls on the recorder and the recorder can exert the necessary controls on the accounting machine to enable their joint operation to be obtained.

The cabinet 600 is provided with doors 601, 602 and 603 to provide access to the various parts of the recorder.

As shown in Figs. 1 and 25, door 601 provides access to a punching mechanism 605; a tape handling mechanism, including a tape supply reel 606 and a tape take-up reel 607, and, immediately below the punching mechanism, a Leader Advance push button 608 and a drawer 609 for catching the bits of tape which result from punching the tape.

Door 602 provides access to a form board receiving mechanism in which a form board 610 (Figs. 25, 32 and 33) may be readily inserted. This form board provides connections between terminals on a terminal board 611 with which it cooperates and enables the punching program to be readily changed when a different type of problem is being performed on the accounting machine.

Door 603 allows access to a stepping switch 615 which forms a part of the program control means; a rectifier 616 which supplies potential to certain operating and control circuits; a plugboard 617; a relay compartment 618 for housing various control relays; and a component board 619 on which are mounted certain circuit elements as diodes, capacitors and resistors.

The recorder is provided with two receptacles, as 620, Fig. 29, for receiving the cables from the accounting machine.

Punching mechanism

The punching mechanism 605, which is shown in Figs. 25, 27, 28, 29 and 31, is a tape-punching mechanism of the type shown in the patent to Francis E. Hamilton et al., No. 2,540,029 and is mounted on a supporting plate 621.

The punching mechanism includes nine punches 625 (Fig. 31) for punching the rows of perforations across the tape, one for each of the eight channels on the tape, which are used in combinations to encode data, and one for punching the feed holes.

Fig. 30 shows a fragment of the tape in which certain symbols and the digits "0" to "9" have been perforated and in which a Leader Advance portion has been punched, the symbols and numbers above the tape in Fig. 30, corresponding to the data punched on the tape, and the numbers at the side of the tape identifying the channels across the tape.

Each operation of the punching apparatus, whether punching data or a Leader Advance pattern on the tape, causes a feed hole to be perforated in the tape. These feed holes assist in feeding the tape through the punching apparatus and also through the sensing means which analyzes the tape.

The manner in which the punches are selected and operated will now be explained with reference to Fig. 31. Each punch 625 is pivotally connected to the right end of an actuating lever 626, which is pivoted intermediate its ends on a rod 627 in an actuating frame 628. The right ends of the levers 626 are guided in a comb plate 629 and are urged downwardly by springs 630.

The actuating frame 628 is pivoted at 631 and has rollers 632, which engage cams on a cam shaft 633 to rock the actuating frame 628 counter-clockwise from home position and then back to home position to raise and lower the rod 627, upon which the actuating levers 626 are pivoted.

The effectiveness of the actuating levers to operate the punches is controlled by a plurality of magnetically-controlled punch-selecting levers 634, which are pivoted on a rod 635, carried by a bracket 636, and which are urged clockwise by springs 637. The selecting levers 634 are normally retained in their retracted, or non-effective position, as shown in Fig. 31, by notches in the armatures 638 of punch-selecting magnets PS1 to PS8. When the lever is in its retracted position, it is out of engagement with the left end of the actuating lever 626, and this end is free to rise when the frame 628 raises the rod 627, causing the actuating lever 626 to pivot about its right end, the right end of the actuating lever being loaded by the spring 630. In this operation, the punch 625 will not be operated to punch the tape.

When a punch-selecting magnet PS1 to PS8 is energized, it moves its armature 638 away from its related punch-selecting lever 634, freeing the lever 634 for clockwise movement by the spring 637 until the end of the selecting lever engages over the left end of the actuating lever 626 to prevent the left end from rising when the actuating frame 628 raises the rod 627. Since the left end of the actuating lever is positively held by the punch-selecting lever against upward movement, the spring 630 will yield when the frame 628 is rocked, and the right end of the actuating lever 626 and the punch 625 will be forced upwardly to perforate the tape. One or more punch-selecting magnets may be energized in each punching operation according to the encoding of data being punched.

Each of the selecting levers 634 has a forwardly-extending portion 640, with which a locking plate 641 can engage. The plate 641 is carried by a lever 642, which is pivoted on a rod 643 and is operated by a cam on the shaft 633 to lock the levers from 90 degrees to 230 degrees of the operation of the cam shaft 633, the actual punching portion of the operation of the punching mechanism. When operated, the plate 641 engages the forwardly-extending portions 640 of the selecting levers to lock those levers in normal position which have not been released by the punch selector magnets and lock those levers in moved position which have been released to select their related punches for operation.

The forwardly-extending portions 640 of those levers which have been released and have rocked downwardly will engage a restoring plate 644. The plate 644 is pivoted on the rod 635 and is rocked counter-clockwise by a cam-actuated arm 645 near the end of the punch operation. In order to insure that the selecting levers will be properly restored to the control of the punch-selecting magnets PS1 to PS8, the restoring plate 644 provides a slight overthrow movement to the levers, and one of the levers engages a flange 646 on one arm of a bail 647 to rock the bail clockwise, which bail forces all the armatures away from the magnets and into engaging relation with the selecting levers.

Since a feed hole is punched in each operation of the machine, regardless of the selection of punches by the magnets, the punch-actuating lever for the feed hole punch has its left end blocked against upward movement at all times. An arm 648, which is secured to the bracket 636, extends over the end of the actuating lever to cause the lever to force the punch upwardly in each operation of the punching apparatus.

The driving means for the punching mechanism is shown in Figs. 27, 28 and 29. The motor 651, which is constantly rotating whenever the recorder is operable, is mounted on a bracket 650 on the plate 621 and is connected by a gear train 652 to gear 653, the input gear of clutch 654, which clutch, when tripped, will connect the drive to the cam shaft 633 of the punching mechanism to cause the cam shaft to make one revolution. A punch clutch trip magnet L9 is provided and, when energized, will trip the clutch to allow the clutch to operate to drive the punching mechanism.

The punch clutch trip magnet L9 is energized each time one or more of the punch-selecting levers 634 is released. A bail 655 (Fig. 31) extends across the selecting levers 634 and is carried by a pair of arms 656 pivoted on the rod 635. One of the arms is formed with an extension 657, which is connected by a link to operate contacts SC7a1. When any one of the punch-selecting levers 634 is rocked, upon its release by its related armature 638, it will rock the bail clockwise to close the contacts SC7a1. This will energize the clutch trip magnet L9 to render the clutch effective to connect the motor to the cam shaft 633 to drive it through one revolution.

A tape-feeding pin-wheel is mounted on a shaft 658 (Fig. 31) and has, in its periphery, pins which engage the feed holes in the tape to advance the tape after it is punched, the pin-wheel being driven by a pawl-and-ratchet drive from a lever 659, which is rocked by a cam on the cam shaft 633. A detent wheel 660, also mounted on the shaft 658, cooperates with a roller 661 on a lever 662 to accurately position the pin-wheel, as is well known.

An extension 665 on the locking-plate-actuating lever 642 is connected by a link 666 to the contacts SC6b2 and SC6a1. At 90 degrees in the operation of the punching mechanism, when the locking plate 641 is rocked to lock the selecting levers 634 in position, contacts SC6b2 will be opened, and contacts SC6a1 will be closed. These contacts will remain in this condition until 230 degrees of the operation of the punching mechanism, when the lever 642 is rocked to unlock the punch-selecting levers, at which time contacts SC6b2 will be closed, and contacts SC6a1 will be opened. The controls exerted by contacts SC6a1 and SC6b2 will be explained fully when the circuit diagram of Figs. 36A to 36D is explained.

The particles of tape, which are removed from the tape as perforations are made, are guided by a chute 667 to the drawer 609 (Fig. 25), which can readily be removed from the recorder.

Tape-handling means

The various means for handling the tape in the recorder are seen in Figs. 25, 27, 28 and 29.

The tape supply reel 606 and the tape take-up reel 607 are mounted on the supporting plate 621 (Fig. 29) in alinement with the punching mechanism so that the tape 670 can pass from the supply reel, downward under a guide roller 671 then upward over a roller 672 (Fig. 31) on a tension control lever 673, under a tape feeler 674, through the punching section of the punching mechanism, over the pin-wheel, and under a cooperating pressure plate 675, around a guide roller 676 (Fig. 25) to the take-up reel 607.

The tension control lever 673, the tape feeler 674, and the pressure plate 675 cooperate to open contacts SC5b1 in the circuit to the punch clutch trip magnet L9 to prevent an operation of the punching mechanism under the following conditions, which would contribute to an improper punching of the tape.

The tape feeler 674 (Fig. 31) is carried by an arm 676, which is pivoted on a stud 677. With a supply of tape in the punching mechanism, the feeler 674 will be supported by the tape; but as soon as the tape breaks or the end of the tape passes the feeler 674, the feeler will drop downwardly and rock the arm 676 counter-clockwise (Fig. 31) about the stud 677. A link 678 connects the arm 676 to an arm 679 of a yoke pivoted on a stud 680, the other arm, 681, of which yoke is connected by a link 682 to the contacts SC5b1. A spring 683 normally urges the yoke counter-clockwise to maintain the contacts SC5b1 closed. When the arm 676 rocks counter-clockwise, it will pull the link to the right (Fig. 31) and will rock the yoke clockwise to open the contacts SC5b1.

The contacts SC5b1 are also opened when the pressure plate 675 is moved away from the pin-wheel. The pressure plate 675 is mounted on a lever 684, pivoted on a stud 685. A link 686 is connected to the lever 684 and has a pin-and-slot connection with the arm 676, so that, whenever the lever 684 is rocked to move the pressure plate away from the pin-wheel, the link 686 will rock the arm 676 clockwise to raise the feeler 674 above the tape. The clockwise rocking of the arm 676 will pull the link 678 to the right and rock the yoke to open the contacts SC5b1.

A further control of the contacts SC5b1 prevents punching if there is too much tension on the tape and improper punching would result. The roller 672 is supported at the upper end of the lever 673, which is pivoted on the stud 680 and is formed at its lower end with a yoke 687, which straddles the arm 679. If the feeding of the tape from the supply reel becomes blocked and the feeding of the tape by the pin-wheel continues, the tension on the tape will be increased and will shift the roller 672 to the right (Fig. 31), rocking the lever 673 clockwise. The yoke 687 will rock the arm 679 and its connecting arm 681 clockwise to open the contacts SC5b1. As soon as the tension has been relieved, the spring 683 will return the arms 681, 679, and 673 to their normal position and will allow contacts SC5b1 to reclose.

A rear plate 690 (Figs. 25, 27 and 28) of the supply reel 606 is mounted on a shaft 691 journalled in bearings in the supporting plate 621 and a bracket 692 secured to the supporting plate. A friction plate 693 is secured to the bracket 692 and cooperates with a friction plate 694 secured to the rear plate 690 of the reel. A pair of nuts 695 and 696 inside and outside a core portion 697 on the plate 690 can be adjusted along a threaded portion of the shaft 691 to enable the position of plate 690 to be adjusted along the shaft to control the pressure between the friction plates 693 and 694 and, thereby, the drag which will be applied to the reel.

A front plate 698 of the supply reel 606 has a central knob 699 which carries a detent which cooperates with a groove near the end of the shaft 691 to hold the plate in place on the shaft.

In order to place a supply of tape in the recorder, it is only required that the front plate 698 be removed and a reel of tape slipped over the core 697 on the rear plate 690 of the reel and the front plate 698 replaced on the shaft until the detent in the knob 699 engages the groove in the shaft to retain the plate in place on the shaft.

The construction and mounting of the take-up reel 607 is slightly different from that of the supply reel 606 because the take-up reel 607 is impositively driven to wind up the tape as it is punched and to allow for variations in the drive as the diameter of the paper on the reel increases.

A rear plate 705 of the take-up reel has a hub 706 secured thereto, which hub is provided with a set screw 707 by which the plate can be secured to a shaft 708. The shaft 708, which is journalled in bearings in the supporting plate 621 and a bracket 709 secured to the supporting plate, has a pulley 710 secured thereto. A belt 711, which engages the pulley 710 and a pulley 712 on the punching mechanism cam shaft 633 and two idler pulleys 713 and 714 provides a yieldable drive for the take-up reel.

The plate 705 is provided with a core section 715 which has its webs slotted, as at 716, into which the tape may be inserted to fasten the tape on the reel.

A front plate 717 having a knob 718 and detent means similar to the front plate 698 of the supply reel 606 is provided for the take-up reel 607 to hold the tape in place in the reel.

Relay compartment

The relay compartment 618 (Fig. 25) to which access may be had through door 603, contains several relay racks 719 (Fig. 29) on which various control relays are mounted. The racks have plug and socket connections so that they can readily be removed to facilitate inspection and repair. The control relays and their functions will be explained when the circuit diagram is described.

Stepping switch

The stepping switch 615 (Fig. 25), which is an integral part of the programming means, is a fifty-two position switch of the type which is conditioned to advance its wipers when the operating magnet SS1, is energized and is operated to advance the wipers when the magnet is deenergized. The fifty-two positions are obtained from two semi-circular banks of contacts, each containing twenty-six contacts, and two wipers, one engaging the contacts of one bank of contacts during the first 180° of operation of the switch from home position to provide the first twenty-six positions and the other wiper engaging the contacts of the second bank in the second 180° of operation of the switch to provide the other twenty-six positions. The two related banks of contacts form one level of the switch, the switch in the instant embodiment containing eight banks of contacts forming four levels.

In the instant embodiment, provision is made for punching programs having up to one hundred and two separate steps, and, since many steps in the program require two independent controls, two levels of the stepping switch are used at the same time, that is, levels I and III are used to provide the necessary controls for the first fifty-one steps of the program and levels II and IV are used to provide the last fifty-one steps. Suitable controls are provided to switch the program from levels I and III to levels II and IV when required.

Each of the contacts of the various banks of contacts is connected to a terminal in section 725 of the terminal board 611 (Fig. 34) which terminals may be connected by connections in the form board 610 to other terminals in terminal board 611 according to the desired program, as will be explained more fully hereinafter.

The stepping switch is provided with the usual "off-normal" contacts SS1a3 which are closed in all but "home" position of the switch; with contacts SS1a1 and SS1a2 which are closed by the magnet SS1, when energized; and with self-interrupting contacts SS1b4 which are opened by the magnet SS1, when energized. These contacts are shown in Fig. 25, and the manner in which they exert their control will be explained fully when the circuit diagram is described.

Plugboard

The plugboard 617 (Figs. 25 and 26) is provided with rows and columns of terminal sockets which are connected to various circuits in the apparatus and can be inter-connected by plugboard connections. This plugboard is used principally to set up the desired encoding for the data to be punched by connecting the various control terminals to terminals which are connected to the punch selecting magnets PS1 to PS8.

Section 727 is provided with eight horizontal rows of terminals, the terminals of each horizontal row being connected together as indicated by the dotted line and the rows being connected to various ones of the punch selecting magnets PS1 to PS8.

Section 728 is provided with two terminals which are connected to the controls for punching the "S" symbol, which terminals can be connected by plugboard connectors to the terminals of the proper rows in section 727 to punch the desired combination of holes which represent the "S" symbol.

Section 729 similarly is provided with two terminals which are connected to the controls for punching an "S-alt" symbol and which can be connected by plugboard connectors to the proper punch selecting magnets to punch an "S-alt" symbol instead of an "S" symbol in certain operations.

Section 730 is provided with two terminals which are connected to control circuits for punching the End of Frame symbol, which terminals can be connected by plugboard connectors to the terminals in proper rows of section 727 according to the code for the End of Frame symbol.

Section 731 contains three terminals which are connected to control circuits for causing a Skip symbol to be punched, two of which terminals will be used in the instant embodiment. These terminals will be connected by plugboard connectors to terminals in section 727 according to the code for the Skip symbol.

Section 732 contains three terminals which are connected to control circuits for causing a Void symbol to be punched, two of which terminals will be used in the instant embodiment. These terminals will be connected by plugboard connectors to terminals in section 727 according to the code for the Void symbol.

Section 733 contains eight terminals which are connected to control circuits for causing a Leader Advance code to be punched. Plugboard connectors can connect the desired number of these terminals to the terminals in the rows in Section 727 according to the required code for the Leader Advance section of the tape.

Section 734 contains ten pairs of terminals which are connected to similar pairs of terminals in section 735 of the terminal board 611 to enable digits to be punched directly under control of the program control means. This is effected by connecting terminals in section 734 to terminals in section 727 according to the coding for the several digits and by connecting the proper digit terminals in section 735 of the terminal board 611 to the terminals in section 725 of the terminal board for the steps in the program in which the digit punching is desired.

Section 736 contains five terminals which are connected to the output circuits from the amount storage switches in the accounting machine. In the instant embodiment these terminals are connected by plugboard connectors to terminals in section 727 which are connected to punch selecting magnets PS1 to PS5.

Sections 737 and 738 each contain five terminals, those in section 737 being connected to circuits to step the stepping switch and those in section 738 being connected to circuits for causing the punching mechanism to operate to punch a feed hole in the tape without punching any data.

Terminal board and form board

The construction of the terminal board 611 and form board 610 and their cooperation are most clearly shown in Figs. 25, 32, 33 and 34.

The terminal board 611 (Fig. 33) is mounted in a supporting frame 742 which, in turn, is secured to a vertical supporting plate 743. The board is provided with a plurality of terminals arranged in rows and columns thereon as shown in Fig. 34, each terminal having a portion 744 (Fig. 33) to which electrical connections can be made and a resilient extension 745 which can be engaged by the end 746 of a plugboard connector in the form board 610 when the form board is in operative position.

As explained earlier, the terminal board 611 has a section 725, Fig. 34, in which the terminals are connected to the various contacts in the different levels of the stepping switch, and has a digit section 735 in which the terminals are paired and are connected to the digit section 734 of the plugboard 617.

In addition to these sections, the terminal board has a readout section 748 containing twenty vertical columns of terminals, the terminals in each column being connected together, and adjacent pairs of columns being connected to related ones of the pairs of inputs to the data storage switches of the accounting machines, provision being made to read-out from ten data storage switches in the instant embodiment. Plugboard connectors in the form board connect various terminals in section 725 to terminals in section 748 to cause data set in the storage switches to be punched, as required, to make up the various "segments" of the "frame" of information.

Section 749 is provided to enable a "Normally +" control to be obtained. This section includes two rows of terminals, the terminals in each row being connected together and over certain relay contacts to terminals in the "+ sign" section 750 of the terminal board. This control is used to program a "+" sign before amounts that normally will be positive amounts. Plugboard connectors in the form board will connect terminals in section 725, which are connected to the positions of the stepping switch which precede the positions for reading out a number from the accounting machine, to terminals in section 749.

In the instant embodiment the "+" sign will be represented by the digit "0"; hence plugboard connectors in the form board will connect the terminals in the "+" sign section 750 to the "0" terminals in digit section 735.

Similarly a "Normally —" control is obtained from section 751. This section has two groups of interconnected terminals which are connected over certain relay contacts to terminals in the "—" sign section 752 of the terminal board. If a "—" sign is to normally precede an amount, plugboard connectors in the form board will connect the required terminals in section 725 to the terminals in section 751 and will connect the terminals in the "—" section 752 to the digit "1" terminals in section 735, the "—" sign being represented by the digit "1" in the instant embodiment.

Section 753 is provided to enable Start controls to be obtained for indicating the starting position for the various "segments" making up a "frame" of data. This section contains two rows of terminals, the terminals of one row, the "B" row, being connected together and to a control circuit and the terminals of the other row, the "A" row being individually connected to the carriage position control switches. Plugboard connectors in the form board connect terminals in this section to terminals in section 725 to supply the Start controls at the proper time in the punching of a "frame" of data. The manner in which the Start controls effect their controls will be explained fully when the circuit diagram is described.

Section 754 is provided with a row of interconnected terminals which are connected to a Halt control circuit for terminating recording operations at the end of each "segment." Plugboard connectors in the form board connect the Halt terminals to the terminals in section 725 according to the number and length of the "segments" making up a "frame" of data. The manner in which the Halt controls are effected will be explained more fully when the circuit diagram is described.

Section 755 is provided to enable the "S" symbol to be included in any punching sequence. This section includes two terminals which are connected over relay contacts selectively to sections 728 or 729 to cause the "S" symbol or "S-alt" symbol to be punched. Plugboard connectors in the form board can connect the terminals in this section to those terminals in section 725 which will cause the "S" symbol or "S-alt" symbol to be punched at the proper point in a punching program, if the symbols are desired.

Section 756 is provided to enable an End of Frame symbol to be directly included in the program if desired. This section contains two terminals which are connected to the terminals in section 730 of the plugboard 617. When this symbol is to be punched under the direct control of the programming means, the terminals in section 755 can be connected by plugboard connectors in the form board to the proper terminals in section 725 of the terminal board 611.

Section 757 contains two terminals which are connected to the controls which become effective in a Void operation. In those programs in which the Void operation may be used, plugboard connectors in the form board will connect the necessary terminals in section 725 to the terminals in section 757.

Section 758 contains two terminals which are connected to the reset controls in the recorder for resetting the stepping switch to home position. Plugboard connectors in the form board connect these terminals to the proper terminals in section 725 to cause resetting at the end of the recording of a "frame" of information.

Section 759 contains two interconnected terminals which are connected to the controls for the stepping switch and enable the stepping switch to be advanced if desired. A plugboard connector in the form board can connect one of these terminals to one of the terminals in section 725 if desired so that the stepping switch can be advanced at any point in the program without operating the punching mechanism.

Section 760 contains two interconnected terminals which are connected to the circuit to the punch clutch trip magnet L9 and enable the punching mechanism to be operated to punch only a sprocket hole in the tape, if desired. A plugboard connector in the form board can connect one of these terminals to a terminal in section 725.

Section 761 contains a plurality of columns of interconnected terminals which may be used as busses or, if required by the increased capacity of the accounting machine to be used with the recorder, may be used in the same manner as the columns of section 748 to control the readout from additional data storage switches in the accounting machine.

The form board 610 which cooperate with the terminal board consists of a frame 765 having a handle 766 and supporting a board 767 of insulating material having rows and columns of apertures corresponding in position to the terminals in the terminal board 611.

The apertures in the portion 767 of the form board are arranged to receive the ends of plugboard connectors, each connector having two end pieces, as 746, Fig. 33, which when inserted in the apertures extend from the rear thereof and can engage the resilient extensions 745 of related terminals in the terminal board when the form board is in operative position. By plugging the ends of each of the connectors in the proper holes in the form board, the entire program can be set up, and the proper connections between the terminals in the terminal board can be made when the form board is in the closed or operative position as shown in full lines in Fig. 33. It is to be noted that the tapered end 746 of the connector cooperates with the flexible end 745 of the terminal and flexes the end of the terminal when the form board is in operative position, to insure that a good contact will be made.

The form board has four lateral extensions 768, 769, 770 and 771 which extend from the frame 765 and slide in ways 772 and 773 in a form board supporting frame 774 to enable the form board to be readily inserted into and removed from the frame 774 when it is desired to change the punching program. The upper ends of the ways are flared to facilitate the insertion of the lateral extensions of the form board in the ways in the supporting frame 774.

The form board is mounted for pivotal movement into and out of operative relation with the terminal board, the form board supporting frame 774 being provided with a pair of downward extensions 775 and 776 and the terminal board supporting frame 742 being provided with paired forward extensions 777 and 778 through which pivot pins 779 and 780 pass to form hinges which allow the form board supporting frame 774 to swing between its open position as shown in Fig. 25 and in dot-and-dash lines in Fig. 33 to its closed or operative position as shown in full lines in Fig. 33.

The form board supporting frame 774 will be moved to its open position whenever it is desired to remove or change the form board, because in this position the plugboard connectors will not be in engagement with the terminals extensions 745 and the form board itself will be in position where it can readily be withdrawn upwardly out of the frame.

A suitable cover 785 covers the area in which the plugboard connectors may be inserted in the board to prevent accidental displacement of the connections after the program has been set up.

An operating linkage is provided at each side of the form board to move the form board supporting frame 774 to open position each time the door 602 is opened. The door 602 is provided with a bracket having extensions 786 and 787 (Figs. 25, 32 and 33) to which are pivoted links 788 and 789.

A link 790 has one end pivoted to the terminal board frame 742 on a pivot 791 and a companion link 792 has one end pivoted on the form board frame 774 on pivot 793. The other ends of these links are pivotally connected to the link 788 at pivot 794.

Links 790 and 792 are so located and are of such a length that they form a toggle which, in the horizontal, full-line position, Fig. 33 will lock the form board in closed or contact making position. As the door 602 is opened, the pivot 794 swings down and forward about the pivot 791 to the dot-and-dash position and this movement will, through the link 792, force the upper end of the form board supporting frame 774 outwardly to cause the frame to pivot about the pins 779 and 780. A stud 795 in the end of the link 788 will engage the link 790 to limit the extent of pivotal movement of the frame 774.

A similar pair of links 799 and 800 cooperate with the link 789 at the other side of the form board to provide the same locking and moving forces as are produced by the operation of links 788, 790 and 792.

A plunger 801 slidable in the frame 742 is urged to the right in Fig. 33 in which position the form board position switch SC10a1 will be open. As the form board supporting frame 774 moves to closed position it will engage the plunger 801 and move it to the left as seen in Fig. 33 to close the switch. The switch will accordingly be open unless the form board is in its closed or operative position and will prevent the recorder from operating.

The manner in which the interconnections effected by the cooperation of the form board and terminal board control and coordinate the operations of the recorder and accounting machine will be clear from the following description of the circuit diagram.

*Circuit diagram*

The circuits involved in coordinating the operations of the accounting machine and the recorder portions of the apparatus are shown in Figs. 36A to 36D. In these figures the plugboard connectors have been omitted to simplify the diagram and certain switches, which are mere duplicates of others, as the carriage position switches SC11a5 to SC11a11 and the differentially-controlled amount storage switches SC13a1 to 8 to SC20a1 to 8, and certain sections of the plugboards have been omitted since their operation is substantially the same as that of the ones shown and will be clear from the explanation of the operation of the ones which are shown.

In order that the explanation of the circuits will be more clear, they will be described as they function in preparing the apparatus for operation and in carrying out typical operations of the apparatus. In this explanation it will be assumed that the accounting machine and the recorder have their stop bars and form board, respectively, set up to perform the accounting problem necessary to produce the various printed records as shown in Figs. 35A and 35B and to cause related perforated tapes to be made.

Power is turned on by closing the Main Power switch MPS (Figs. 1 and 36A) which makes the usual 110 volts 60-cycle A.C. available to the accounting machine motor 49. A red lamp 120 (Figs. 1 and 36A) on the accounting machine is lighted to indicate that power is applied thereto. The accounting machine can operate in its usual manner at this time but the recorder will not record any of the data on the tape until the Master Record switch 156 (Fig. 1) at the front of the accounting machine is operated to close its contacts ST2a1.

Whenever it is desired to produce a punched tape in conjunction with the operation of the accounting machine, the Master Record switch is operated to close the contacts ST2a1, which closure of the contacts ST2a1 continues the circuit, which was closed by the switch MPS, to supply operating potential for the lock-up solenoid L10 and the Void counter operating solenoid L11, the lock up solenoid L10 being energized over contacts K3b12 until relay K3 is energized. The energization of the lock-up solenoid L10 prevents the operation of the accounting machine at this time.

Since the form board 610 is properly in position, the circuit over switch MPS and contacts ST2a1 will be continued over the form board locating switch SC10a1 to provide operating potential to the punch motor 651 and to the rectifier 616 which supplies D.C. operating potential over conductors 810 and 811 to the control and operating circuits for coordinating the operation of the accounting machine and recorder portions of the apparatus.

It is to be noted that even when the Master Record switch has been operated to close contacts ST2a1, power will not be supplied to the punch motor or to the control circuits if the form board 610 is not in proper position and the form board locating switch SC10a1 has not been closed.

The application of D.C. potential to the conductors 810 and 811 immediately causes the red light 95 at the left of the accounting machine keyboard to be lighted to indicate that power is properly supplied to the recorder and it is in condition to be operated.

The application of operating potential to conductors 810 and 811 also causes relay K3 (Fig. 36B) to be energized over relay contacts K1bc2. Energization of relay K3 opens contacts K3b12 to deenergize the lock-up solenoid L10 which, in turn, removes the block 375 (Fig. 7) so that the accounting machine can be operated.

Prior to the recording of data on a tape it is necessary to provide a leader which can be used to introduce the tape into the particular data processing apparatus which it is to control. The leader section of the tape is provided by the operation of the tape recorder alone when the Leader Advance push button 608 (Fig. 25) is depressed. The leader section of the tape will be perforated with the usual row of feed holes and in addition with an End of Frame symbol followed by special Leader Advance code. In the embodiment being described, the End of Frame symbol consists of perforations in channels 7 and 8 on the tape and the Leader Advance code consists of perforations in channels 1 through 6 across the tape.

Figure 36D:
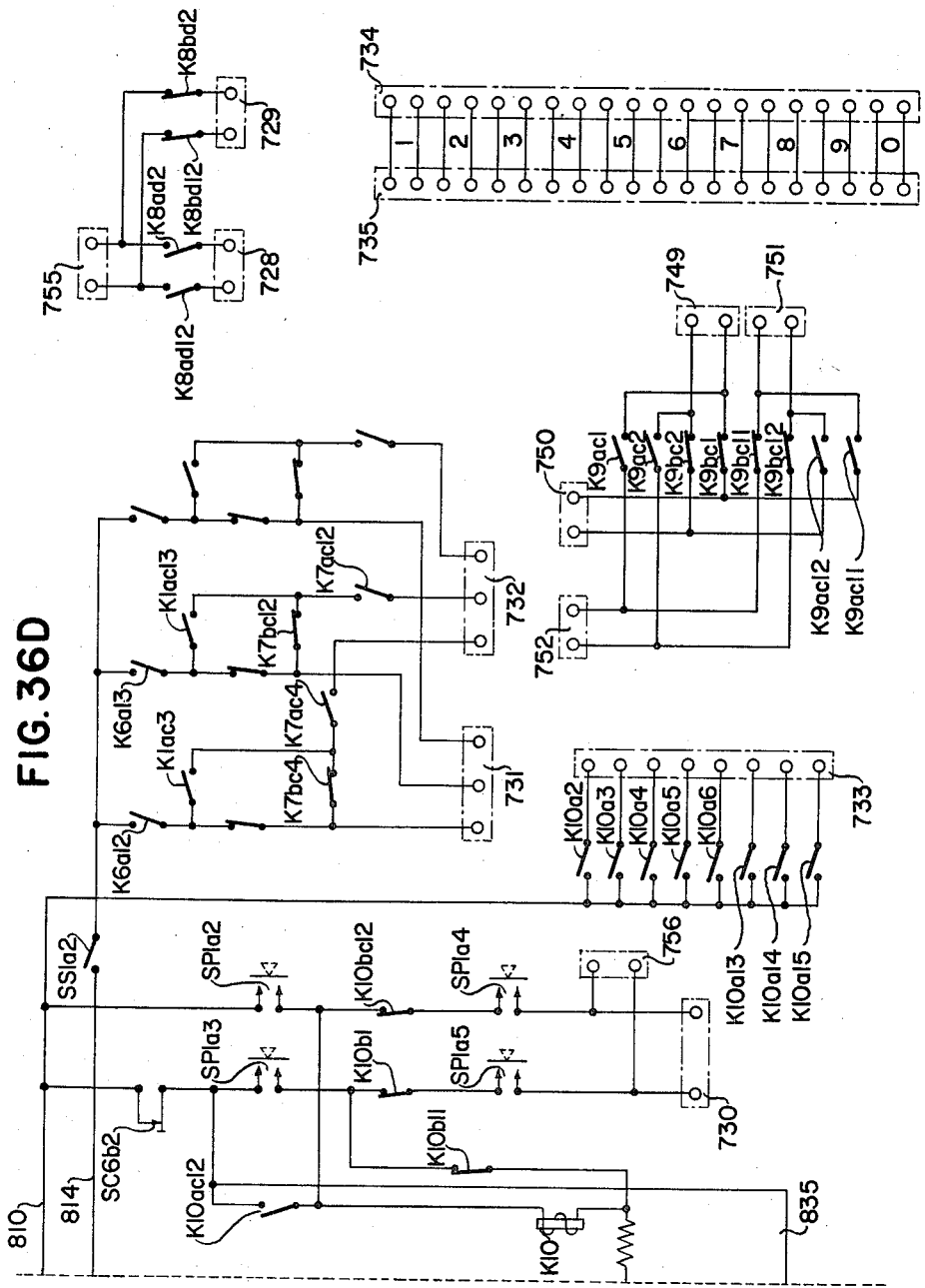

The Leader Advance push button 608 shown as five push buttons in the circuit diagram, closes five contacts, contacts SP1a1 (Fig. 36C) and contacts SP1a2, SP1a3, SP1a4 and SP1a5 (Fig. 36D).

Contacts SP1a1 connect one side of the punch selector magnets PS1 to PS8 and relay K10 to conductor 811.

Contacts SP1a2 and SP1a4 close a circuit over contacts K10bc12 to one terminal in the End of Frame section 730 of the plugboard 617 and contacts SP1a3 and SP1a5 close a circuit over the normally closed punch controlled contacts SC6b2 and over contacts K10b1 to the other terminal in the End of Frame section 730 of the plugboard.

The two terminals in section 730 are connected by plugboard connectors to terminals in section 727 which are connected to punch selector magnets PS7 and PS8 to cause the End of Frame symbol to be punched. The punch selector magnets are energized immediately upon the operation of the Leader Advance Push button 608 and in turn cause the cycling of the punch.

The circuit over contacts SP1a2 also extends to one side of the relay K10, and the circuit over the punch-controlled contacts SC6b2 and contacts SP1a3 extends over contacts K10b11 to the other side of relay K10. These two circuits apply the same potential to both ends of the coil for relay K10 and prevent the relay from being operated immediately upon the operation of the Leader Advance push button 608. This control of relay K10 is provided to delay the energization of relay K10 until after the End of Frame symbol has been punched.

At 90° in the cycle of operation of the punch to perforate the End of Frame symbol, contacts SC6b2 open to interrupt the circuit to said other side of relay K10, allowing the relay to be energized over the circuit over contacts SP1a2.

Energization of relay K10 opens contacts K10bc12 and K10b1 to interrupt the circuits to terminals in the End of Frame section 730 and closes contacts K10a2, K10a3, K10a4, K10a5, K10a6, K10a13, K10a14 and K10a15 (Fig. 36D) which connect terminals in section 733 of the plugboard 617 to the conductor 810. Six of the terminals in section 733 are connected by plugboard connectors to terminals in section 727 of the plugboard which are connected to punch selector magnets PS1 to PS6 for punching the Leader Advance code in channels 1 through 6 on the tape.

The energization of relay K10 also opens contacts K10b11 in the circuit over contacts SC6b2 and SP1a3 to prevent further shorting of relay K10.

Contacts K10a16 (Fig. 36C) and K10ac12 (Fig. 36D) are also closed by the energization of relay K10. These contacts are provided to insure that at least one set of Leader Advance code perforations will be made in the tape even though the Leader Advance push button is released early in the punching operation.

Contacts K10a16 parallel contacts SP1a1 to provide a further connection between the punch selector magnets and conductor 811 to insure that the magnets will properly be operated, and contacts K10ac12 close an energizing circuit for relay K10 over contacts SC6b2 to maintain relay K10 energized until 90° of a Leader Advance code perforating operation even though contacts SP1a2 may have been opened.

The recorder will operate repeatedly to punch Leader Advance code across the successive portions of the tape until the desired length of leader has been produced and the Leader Advance push button has been released.

The apparatus is now in condition to record data on the tape under control of the accounting machine.

As explained earlier, the recorder portion of the apparatus will be rendered operable under control of control stops located in proper positions along form or stop bars secured to the front and back of the paper carriage of the accounting machine portion of the apparatus, the stops becoming effective when the carriage is in certain predetermined columnar positions.

In the particular job being done on the apparatus which is being described—that of making out the necessary forms for accounts receivable—the tape recorder will be rendered operable in six of the carriage positions to record data making up a "frame" of information and the recorder will be programmed so that the data recorded in each carriage position will constitute a program "segment" in the "frame" of related data.

In the stepping switch which controls the formation of the "frame" of information from the various "segments" which correspond to the various carriage positions, the "segments" which may make up the "frames" of information are programmed serially, and, to make up a given "frame," it may be necessary to pass over one or more "segments" before finding the one corresponding to a particular carriage position.

In order to select a particular "segment" for a punching operation it is necessary that the stepping switch be programmed with a Start signal which is obtained by connecting the stepping switch contacts immediately ahead of the contacts related to the "segment," to a pair of Start terminals in section 753 of the terminal board. It is also necessary, in passing over unselected "segments," to cause the punching of a Skip symbol in the tape as each "segment" is by-passed and also to render ineffective those stepping switch positions which have been programmed to make up these "segmentts" which are by-passed.

Since the embodiment being described is capable of recording a "frame" which may be made up from one to fifteen segments, as required, fifteen pairs of Start terminals are provided in section 753 of the terminal board though in the circuit diagram only eight pairs are shown.

The program which is set up by selective connection of positions in the terminal board by plugboard connectors, connecting corresponding positions in the form board, enables the proper sequences of operation to be obtained as the stepping switch moves through its various steps of operation. In the circuit diagrams, the connections between positions of the form board and between positions of the plugboard, which are made by plugboard connectors, have been omitted to avoid confusion in the diagram.

The first data to be punched in the tape is the customer number. This is obtained with the carriage in its extreme right posititon where the control stop 321 (Fig. 18) on the rear form bar 319 will be in position to cause the setting of one of the carriage position switches and the stop (1) on the front form bar 72 (Fig. 8A) is in controlling position to cause the accounting machine to operate in a subtotal and non-print operation to read the customer number from the #3 totalizer where it has been stored. In this operation the stop (1) will also initiate an operation of the recorder control shaft 261 in the accounting machine to bring about a tape punching operation under control of the accounting machine.

After the number has been read from the #3 totalizer and has set the discs 226 of the encoding drums (Figs. 15 and 19) the readout plungers 229 and 231 are operated from home position to feed the drums and be set according to the customer number and are restored to home position to operate the amount storage and read-out switches SC12a1 to 8 to SC20a1 to 8 according to the setting of the plungers.

At the same time, the carriage position readout plungers 324 (Figs. 20 to 22) are operated from home position to feel for the studs 323 on the carriage position control stop 321 on the form bar 319 (Fig. 8B) rear of the carriage. The displaced plungers will open contacts SC11b16 and will close a related one of the carriage position switches SC11a1 to SC11a15, say SC11a4, depending upon the position of the stud 323 on the carriage position control stop.

At about 220° in the operation of the accounting machine, the cam 363 (Fig. 13) on the recorder control shaft 261 will close "Record" contacts SC1a1 (Fig. 36A). These contacts close a circuit from conductor 810 over contacts K7b1 to one side of Operate relay K1. The other side of relay K1 is connected over point 812 and resistor 813 to conductor 811 and when contacts SC1a1 close, relay K1 will be energized to start a recording sequence. Upon energization, relay K1 closes a holding circuit for itself over contacts K1a4 and K7b1.

Energization of relay K1 also closes contacts K1a5 which connect conductor 810 to conductor 814 to supply operating potential to certain control circuits only during a recording operation.

Contacts K1a15 (Fig. 36A) close to energize Lock-up solenoid L10 which will prevent the accounting machine from making a further operation until the tape recorder has finished its operation.

Contacts K1bc2 (Fig. 36B) open to cause relay K3 to be deenergized. Deenergization of relay K3 allows contacts K3b12 to close to complete another energizing circuit to the Lock-up solenoid L10 and also allows contacts K3b11 (Fig. 36B) to close in the energizing circuit for the stepping switch magnet SS1.

It will be recalled that the stepping switch is of the type which is conditioned for stepping by energization of the stepping magnet and actually is advanced upon deenergization of the stepping magnet. The stepping magnet SS1 when energized also closes its related "a" contacts and opens its related "b" contacts. Accordingly when both contacts K1a5 and K3b11 are closed, an energizing circuit, for the stepping switch magnet SS1 is completed from conductor 810 over contacts K1a5, conductor 814, contacts K4bd5, self interrupting contacts SS1b4 of the stepping switch, punch operated contacts SC6b1, K3b11 to one side of the magnet SS1, the other side of the magnet being connected over point 815 and resistor 816 to the other conductor 811. This circuit will cause the stepping switch to hunt or step at its self-interrupted rate under control of contacts SS1b4 until its wipers engage contacts which have been connected to terminals in section 725 of the terminal board 611 and have been connected by plugboard connectors in the form board 610 to Start terminals in section 753 of terminal board 611.

While the stepping switch is "hunting" for contacts which have been connected to Start terminals, a circuit will be completed over contacts K1a5, conductor 814, contacts K4bd5, SS1b4, K4bd15, K2bd13 and the particular contacts of relay K5 which are closed at this time, to the wipers of the stepping switch. It should be noted that relay K5 causes potential to be applied first over contacts K5bd12 and K5bd11 to the wipers of levels #1 and #3 and after having transversed the first fifty-one positions, a transfer control is rendered effective to cause relay K5 to operate to open these contacts and close contacts K5ad12 and K5ad11 to transfer potential to the wipers for levels #2 and #4.

In the instant embodiment, the program controls for recording this first "segment" are set up so that positions 1A and 1B in section 725 of the terminal board 611 are connected to Start 4A and 4B terminals in section 753 of terminal board 611; positions 2A and 2B of the stepping switch are connected to End of Frame terminals in section 756 of terminal board 611; positions 3A to 7A and 3B to 7B are connected to terminals in section 748 of the terminal board 611 to cause the recorder to be controlled from amount storage switches for rows 7 to 3 of the accounting machine to record the customer's number; and either position 8A or 8B is connected to one of the Halt terminals in section 754 of the terminal board 611.

The circuit over the wiper and contact in position 1B of the stepping switch extends over the Start 4B terminal (Fig. 36B), contacts K4b2, point 817, contacts K6bd4, point 818, rectifier 819, contacts K6b11 and K2bd4 to point 815 to apply a short across the stepping switch magnet SS1 prevent further energization of the magnet. Point 818 in this circuit is also connected to one side of Skip Encode relay K6 to enable a Skip symbol to be punched if the segment is not to be recorded.

Simultaneously the circuit over the wiper and contact in position 1A of the stepping switch extends over Start 4A terminal, carriage position contacts SC11a4, which have been closed, thence over contacts K4b3, K7b11, point 820 and rectifier 821 to the other side of the Skip Encode relay K6 to short out the relay and prevent it from operating, thereby preventing the punching of the Skip symbol. Point 820 in this circuit is also connected over contacts K2bd14 to energize Record relay K2 (Fig. 36B).

Energization of relay K2 closes contacts K2ad14 to provide a holding circuit for itself over contacts K1a5, conductor 814, and opens contacts K2bd14 to interrupt its original energizing circuit. Relay K2 will remain energized until relay K1 is deenergized.

Energization of relay K2 closes contacts K2a2 (Fig. 36A) to prepare a shunt circuit for relay K1 over the stepping switch and Halt terminals in section 754 of the terminal board 611, which circuit will become effective to signal the end of recording of a "segment" of information.

Contacts K2bd4 in the circuit over Start 4B terminal will open when relay K2 is energized and will remove the short from the stepping switch magnet SS1.

When the stepping switch magnet SS1 was shorted out it became deenergized and allowed the wipers to move to positions 2A and 2B. Since relay K2 is energized at this time contacts K2ad13 will be closed and K2bd13 (Fig. 36B) will be opened. As soon as the shunt is removed from the stepping switch magnet SS1 it will be energized and will close contacts SS1a1 (Fig. 36B) in the circuit from conductor 814 to the wipers and contacts in positions 2A and 2B of the stepping switch which were connected to terminals 2A and 2B in section 725 of terminal board 611 which in turn are connected by plugboard connectors in the form board to terminals in the End of Frame section 756 of terminal board 611. Terminals in section 756 of the terminal board 611 are in turn connected to terminals in section 730 of plugboard 617 which, as previously explained, are connected over plugboard connectors to terminals in section 727 of plugboard 617 which are connected to punch selector magnets PS7 and PS8 corresponding to the code for the End of Frame symbol to cause the energization of these magnets and the release of the punch selecting levers 634 (Fig. 31) which levers operate contacts Sc7a1 to close the circuit to the trip magnet L9. Magnet L9 will cause the punch clutch to be tripped to initiate an operation of the punching mechanism to punch the End of Frame symbol.

During the operation of punching the End of Frame symbol, the cam on the cam shaft 633 (Fig. 31) of the punch will open contacts SC6b1 (Fig. 36B) at about 90° of the punching operation, which will deenergize the stepping switch magnet SS1 and cause the wipers to move to positions 3A and 3B, which positions are connected to terminals in section 725 of terminal board 611 and then by connection in the form board to terminals in section 748 of the terminal board to read-out the amount in the amount storage and read-out switches for row 7 of the accumulator.

As explained earlier the amount storage and readout switches close circuits to terminals in section 736 of plugboard 617, which terminals are connected to terminals in section 727 of the same plugboard which are connected to punch selector magnets PS1 to PS5, the connections being by plugboard connectors made according to the desired code.

At 230° in the punching operation contacts SC6b1 (Fig. 36B) reclose to energize the stepping switch magnet SS1 to close contacts SS1a1 and apply potential over the stepping switches to cause the punch selector magnets to be energized according to the data in row 7 of the accounting machine. The punch selecting levers 634 which are released by the energized punch selector magnets close contacts SC7a1 (Fig. 36C) to cause trip magnet L9 to be energized to trip the punch clutch for a further punching operation to punch the data which was set on row 7 amount storage switches.

During the punching of the data for row 7, contacts SC6b1 will open and the stepping switch magnet will be deenergized to advance the wipers to the contacts in position 4A and 4B which will cause the data for row 6 to be read from the amount storage and read-out switches for this row and the punching mechanism to operate to punch this data.

In a similar manner, the stepping switch will be advanced through positions 5A, 5B, 6A, 6B, and 7A and 7B to cause the data for rows 5, 4, and 3 to be punched in the tape.

During the punching of the data for row 3, the stepping switch wiper will be advanced to position #8 to engage contact in position 8A, which contact is connected to the appropriate terminal in section 725 of the terminal board and the terminal is connected by a plugboard connector in the form board to a Halt terminal in section 754 of the terminal board 611. Since contacts K2a2 are closed at this time a short circuit will be applied to relay K1, causing it to become deenergized and open its holding circuit at K1a4.

Deenergization of relay K1 also opens contacts K1a5 to remove potential from conductor 814 and the stepping switch magnet SS1, the stepping switch wipers, Record relay K2, and Skip Encode relay K6 which are connected thereto. The deenergization of the stepping switch magnet SS1 moves the wipers from position 8 to position 9 to remove the Halt control.

This completes the recording of the first "segment" of data, or the customer number.

During the punching of the first "segment" in the tape, the carriage of the accounting machine tabulates to the left to bring stop (2) in controlling position to condition the accounting machine to automatically subtotal and non-print from totalizer #4, and to render the recorder operable, in which operation of the accounting machine the amount storage and read-out switches are set according to the branch and salesman numbers to cause these numbers to be punched in the tape. In this position of the carriage, the carriage position control stop 321 at the rear of the carriage will move into position where a stud 323 in position 1 on the stop will be in position to cooperate with the feelers 324 to cause contacts SC11a1 to be closed when the accounting machine operates. While the accounting machine is conditioned for operation at this time, it cannot operate while the punching of the first "segment" is taking place because Lock-up solenoid L10 is energized as long as Operate relay K1 is energized and maintains contacts K1a15 closed.

As soon as relay K1 is shorted out by the circuit over the Halt terminal at the conclusion of the punching of the first "segment," contacts K1a15 open and the accounting machine can operate to set up the branch and salesman numbers in the amount storage and read-out switches and also close the carriage position contacts SC11a1.

The program controls for recording the second "segment" of the "frame" of data are set up so that positions 9A and 9B of the stepping switch are connected over suitable terminals in section 725 of the terminal board thence over connectors in the form board to Start 1A and 1B terminals in section 753 of the terminal board. Positions 10A—10B, 11A—11B, and 12A—12B are similarly connected to terminals in section 748 of terminal board 611 to cause the branch number to be read from rows 10, 9, and 8 of the accounting machine; positions 13A—13B, 14A—14B and 15A—15B are similarly connected to terminals in section 748 of terminal board 611 to cause the salesman's number to be read from rows 5, 4, and 3 of the accounting machine, and position 16A or B is connected to one of the Halt terminals in section 754 of the terminal board 611.

At 220° of operation of the accounting machine, Record contacts SC1a1 close to energize relay K1, as before described, and relay K1 closes contacts K1a5 to supply potential to the stepping switch magnet SS1 and to the wipers of the stepping switch.

Since positions 9A and 9B of the stepping switch are programmed to the Start 1A and 1B terminals, the stepping switch magnet is prevented from being energized immediately when contacts K1a5 close. This control of the stepping switch is effected as follows.

When contacts K1a5 close to connect conductor 814 to conductor 810, potential is applied to both sides of the stepping switch magnet, one circuit extending over contacts K4bd5 (Fig. 36B), SS1b4, SC6b1, and K3b11 and the other circuit extending over contacts K4bd5, SS1b4, K4bd15, K2bd13, K5bd11, wiper and contact in position 9B of the stepping switch, Start 1B terminal, contacts K4b2, K6bd4, rectifier 819 and contacts K6bd11 and K2bd4. The shorting circuit over the wiper and Start 1B terminal is effective to block energization of the stepping switch magnet SS1 before the normal energizing circuit can be effective to energize the magnet.

This circuit over Start 1B terminal also applies potential to one side of the Skip Encode relay K6 but this relay will be shorted out by the circuit over Start 1A terminal since the carriage position control stop has caused contacts SC11a1 to close.

The circuit over contacts K4bd5, SS1b4, K4bd15, K2bd13, also extends over K5bd12 and wiper and contact in position 9A of the stepping switch, Start 1A terminal, carriage position contacts SC11a1 which are closed, conductor 825, contacts K4b3 and K7b11, point 820 and rectifier 821 to the other side of Skip Encode relay K6 to provide the shorting circuit which prevents the Skip Encode relay K6 from being energized.

The circuit over the Start 1A terminal branches at point 820 and extends over contacts K2bd14 to Record relay K2.

As explained earlier, the energization of relay K2 opens contacts K2bd4 to remove the short from the stepping switch magnet SS1 allowing it to be energized.

Relay K2 also closes contacts K2a3 to allow the shorting circuit for the Skip Encode relay K6 to continue from point 826 over conductor 827, point 828, rectifier 829, conductor 830, point 831, conductor 832, and contacts K2a3 to energize relay K3. It should be noted that the circuit to the wiper and Start 1A terminal, which extends from point 840 over contacts K5bd12, is completed to point 840 over contacts K4bd5, SS1b4, K4bd15, and K2bd13 before the short is removed from the stepping switch, and is connected to point 840 over contacts K2ad13 and SS1a1 after the stepping switch magnet has been energized. Hence the circuit over these paths will cause relay K3 to be energized.

Energization of relay K3 will open contacts K3b11 in the energizing circuit for the stepping switch magnet to deenergize the magnet and move the wipers to the 10A and 10B positions of the switch.

As the wipers move from the 9A and 9B positions, the circuits over the Start 1A and 1B terminals are interrupted, causing relay K3 to be deenergized. The deenergization of relay K3 allows the contacts K3b11 to reclose to complete the energizing circuit for the stepping switch magnet SS1.

Energization of the stepping switch magnet closes contacts SS1a1 to supply potential over the wipers in positions 10A and 10B which are connected to terminals in section 748 of the terminal board, which terminals are connected over plugboard connectors in the form board to apply potential to the amount storage and read out switches of row 10 to cause data set in this row to be punched.

As the data for row 10 is punched, contacts SC6b1 open to deenergize the stepping switch magnet to advance the wipers to positions 11A and 11B of the stepping switch.

Closure of contacts SC6b1 will energize the stepping switch magnet SS1 to close contacts SS1a1 in the wiper circuit to cause punch selector magnets to be energized according to the data in row 9. Similarly the stepping switch will be advanced to positions 12A and 12B and the data in row 8 will be punched to complete the recording of the branch number.

Continued operation of the stepping switch through positions 13A and 13B, 14A and 14B and 15A and 15B will cause the data in rows 5, 4, and 3 to be punched to record the salesman's number. During the recording of the data from row 3, the stepping switch will be advanced to positions 16A and 16B where the contact in position 16A or 16B is connected via a terminal in section 725 of the terminal board 611 and a connection in the form board to a Halt terminal in section 754 of the terminal board 611. At 220 degrees in this operation of the punch, when contacts SC6b1 reclose, the stepping switch magnet will be energized to close contacts SS1a1 and complete the circuit over the wipers, which in this position of the stepping switch will be extended over the Halt terminal and contacts K2a2 to short out Operate relay K1, which, as explained earlier, terminates the recording of the second "segment" on the tape.

Near the end of the operation of the accounting machine which was controlled by stop (2) (Fig. 35A) to set up the branch and salesman numbers in the amount storage contacts, the carriage will be tabulated to the left to bring the "Quantity" column on the invoice in printing position and stop (3) on controlling position. In this position of the carriage the accounting machine is to be operated to set up the "quantity" of the item on the Keyboard. This amount is to be printed on the invoice and punched in the tape. The quantity amount can be set up on rows 6, 5, 4, and 3 of the accounting machine keyboard and the motor bar depressed either during or subsequent to the punching of the second "segment" but the Lock up solenoid L10 will prevent the operation of the accounting machine until the punching of the second "segment" has been completed. It is to be noted that four positions on the tape have been set aside for "quantity" data and that "zeros" will be punched in those positions in which no significant digit is set up in rows 6, 5, 4 and 3 of the keyboard.

In the invoice being used as an example, (Figs. 35A and 35B) the quantity "10" is set up by operating the "1" key in row 4 and by operating the motor bar.

The program for the third "segment" is obtained by connecting proper terminals in the terminal board by connections in the form board to connect positions 17A and 17B to Start 2A and 2B terminals; to connect positions 18A and 18B respectively to "normally +" terminals of section 749 of the terminal board 611, to connect positions 19A and 19B, 20A and 20B, 21A and 21B and 22A and 22B to proper portions of section 748 of terminal board to cause the "quantity" data to be read from rows 6, 5, 4 and 3, and by connecting position 23A or 23B to a Halt terminal in section 754 of the terminal board.

Provision is made for punching a "+" sign before the quantity data in this program because this data is not merely identifying data but is data which may be accumulated in the data processing machine which is controlled by the tape. By thus providing a "sign" symbol before the amount, the machine can be controlled to add the quantity amounts or subtract quantity amounts as desired. Since quantity amounts will usually be added, the "normal +" sign control will be used.

The operation of punching the data for this segment is substantially the same as that for the first two segments, the only difference being that position 18A and 18B of the switch are connected to proper terminals in section 725 of the terminal board 611 and thence by plugboard connectors in the form board 610 to terminals in the "normally +" section 749 of the terminal board 611. These terminals are normally connected over contacts K9bc1 and K9bc2 to terminals in the "+ sign" section 750 of the terminal board 611 which terminals in section 750 are connected by suitable connectors in the form board to the "0" digit terminals of section 735 of the terminal board which digit terminals are connected to the corresponding digit terminals in section 734 of plugboard 617. The terminals in section 734 are connected by plugboard connectors to terminals in section 727 of plugboard which are connected to punch selector magnets PS3 and PS4 to punch a "0" in the tape, which value will be interrupted as a "+" sign.

Terminals in section 749 of the terminal board are also connected over circuits which include the normally open contacts K9ac1 and K9ac2 to the terminals in the "—" sign section 752 of terminal board 611, which terminals in section 752 are connected by connectors in the form board to the "—" digit terminals of section 735 of terminal board 611 which are in turn connected to the corresponding digit terminals in section 734 of plugboard 617. Terminals in section 734 are connected by plugboard connectors to terminals in section 727 of the plugboard which are connected to punch selector magnets PS1 and PS5 to punch a "1" in the tape, which value will be interpreted as a "—" sign.

The changing of the "normally +" sign to a "—" sign is brought about by the operation of relay K9 (Fig. 36A) which is energized by the closure of overdraft contacts SC3a1 or by the closure of contacts SC4a1 when the "R" key on the keyboard is operated.

The punching of the third "segment" in the tape will be initiated by the closure of Record contacts SC1a1 at 220° in the cycle of operation of the accounting machine. The tape will be punched with a "0" to indicate a "+" sign followed by "0," "0," "1," and "0" to record the quantity 10. During the punching of this data, the stepping switch will be advanced through positions 17A and 17B, 18A and 18B, 19A and 19B, 20A and 20B, 21A and 21B and 22A and 22B. One of the contacts in position 23 of the switch will be connected by the usual connections to a Halt terminal to arrest further operation of the tape punch.

Near the end of the operation of the accounting machine to record the quantity, the carriage tabulates to the left to place stop (5) (Figs. 35A and 35B) in controlling position to control the machine in an operation in which the "item number" is to be recorded.

This "item number" is set up on rows 7, 6, 5, 4, and 3 of the keyboard of the accounting machine and the motor bar is operated to cause the machine to cycle and record the "item number" on the invoice, which number is also perforated in the tape, forming the fourth "segment" of the frame.

The program for the fourth "segment" is obtained by providing the proper connections in the form board to connect positions 24A and 24B to Start 3A and 3B terminals, to connect positions 25A and 25B, 26A and 26B, 27A and 27B, 28A and 28B and 29A and 29B to cause the "item number" to be read from rows 7, 6, 5, 4 and 3 of the accounting machine and to connect position 30A or 30B to a Halt terminal. Provision is made for five places in the item number and zeros will be punched in those positions in which no significant digits have been set up in these rows.

As before, punching of the tape will begin during the operation of the accounting machine and will continue until the Halt control becomes effective.

The next entries on the invoice, namely, the description of the item, its unit price and extension are not punched in the tape.

When the carriage is in "discount" position, where the stop (10) (Figs. 35A and 35B) is in controlling position, the tape is to be punched with "discount" data which makes up the fifth "segment" of the "frame."

The program for the fifth "segment" is obtained by providing the proper connections in the form board to connect positions 31A and 31B to Start 4A and 4B terminals, to connect positions 32A and 32B to terminals in the "normally +" section 749 of the terminal board; to connect positions 33A and 33B, 34A and 34B, 35A and 35B, 36A and 36B, 37A and 37B to cause the discount amount to be read from rows 5, 4, 3, 2 and 1 of the accounting machine; and to connect position 38A or 38B to a Halt terminal.

If the fifth "segment" is to be recorded, the punching operation will take place as usual and the stepping switch will move through positions 31A and 31B, 32A and 32B etc. to 38A or 38B where the Halt control becomes effective.

In the invoice (Figs. 35A and 35B) being used to explain the invention, there is no discount amount to be entered for the first item; hence the carriage is tabulated further to the left to the "amount" column where stop (12) is in controlling position.

When the carriage was tabulated to the "amount" column without an operation of the accounting machine having taken place with the carriage in "discount" position, the contacts SC11a4 were not closed by the stud 323 on the carriage position stop 321 which was in operative position with the carriage in "discount" position.

Since there was no "discount" entry, the fifth "segment" will not be punched on the tape but instead a Skip symbol will be punched to indicate to the data processing machine that the segment has been omitted. The controls for bringing about these results are as follows.

When the carriage is in the "amount" column, stop (12) causes a total to be taken from the accumulator #8, the total to be printed and punched in the tape. This punched data makes up the sixth "segment" of the "frame."

The program for the sixth "segment" is obtained by providing proper connections in the form board to connect positions 39A and 39B of the stepping switch to Start 5A and 5B terminals; to connect positions 40A and 40B, to the terminals in the "normally +" section 749 of the terminal board; to connect positions 41A and 41B, 42A and 42B, 43A and 43B, 44A and 44B, 45A and 45B, and 46A and 46B to proper locations in section 748 of the terminal board to cause the "amount" data to be read from rows 6, 5, 4, 3, 2, and 1 and to connect position 47A or 47B to the Halt terminal if it is desired that "void" controls may be used, or to the Reset terminals in section 758 of the terminal board if no "void" controls are to be used. The circumstances under which the Halt or the Reset controls will be used will be explained more fully hereinafter.

Since the last "segment" which was punched on the tape was the fourth "segment," the stepping switch at this time is in its 31A and 31B positions which are connected to Start 4A and 4B terminals.

Closure of Record contacts SC1a1 at 220° in the operation of the accounting machine energizes relay K1 which in turn closes contacts K1a5 to apply operating potential to the stepping switch magnet and to the wipers of the stepping switch.

The circuit over Start 4B terminal applies the short across the stepping switch magnet to prevent it from being energized and also supplies potential to the Skip Encode relay K6.

The circuit over Start 4A terminal is interrupted at carriage position contacts SC11a4 which are open because there was no contact setting operation of the accounting machine when the carriage was in the "discount" column. Since contacts SC11a4 are open, the short is not applied to the Skip Encode relay K6 nor is the Record relay K2 energized.

Inasmuch as the short is not applied to relay K6, the relay will be energized to cause the Skip symbol to be punched.

The energization of relay K6 closes contacts K6ad4 in a holding circuit which extends over conductor 835 and punch operated contacts SC6b2 (Fig. 36D) which circuit will keep relay K6 energized until 90° of the operation of the punch.

Energization of relay K6 opens contacts K6bd4 in its original energizing circuit and also opens contacts K6bd11 in the shorting circuit for the stepping switch magnet SS1, allowing the stepping switch magnet to be energized.

Contacts K6ad15 are closed by the energization of relay K6 and complete the energizing circuit for the stepping switch magnet over contacts K2bd13 and K4bd15, bypassing the self-interrupting contacts SS1b4 in the original energizing circuit for the stepping switch magnet. The stepping switch magnet will be maintained energized until the punch operated contacts SC6b1 open during the punching of the Skip symbol.

Energization of relay K6 closes contacts K6a12 and K6a13 (Fig. 36D) in the circuits to a pair of terminals in the Skip Symbol section 731 of plugboard 617, the circuit to one of the terminals extending over contacts SS1a2, K6a12, K1ac3, and K7bc4, and the circuit to the other of the pair of terminals extending over contacts SS1a2, K6a13, K1ac13 and K7bc12. Both of these circuits will be completed when contacts SS1a2 are closed by the energization of the stepping switch magnet.

The pair of terminals of the Skip symbol section 731 are connected by plugboard connectors to proper portions of section 727 which are connected to punch selector magnets PS5 and PS7 to cause the Skip symbol to be punched in the tape. The circuit for the punch selector magnets is completed over contacts K6a3 (Fig. 36C) which are closed at this time. Energization of the punch selector magnets releases their related punch selecting levers 634 (Fig. 31) which in turn close contacts SC7a1 to energize the clutch trip magnet L9 to initiate the Skip symbol punching cycle.

During this punching cycle contacts SC6b2 open to deenergize relay K6 and contacts SC6b1 open to deenergize the stepping switch magnet to cause the wipers to move to positions 32A and 32B.

Since relay K6 has been deenergized, there is no longer any return path for the punch selector magnets and punch clutch trip magnet, hence there will be no further punching as the wiper moves through the positions making up the fifth "segment."

The stepping switch will "hunt" or be operated by the circuit over the self interrupting contacts SS1b4 to traverse positions 32A and 32B through 38A and 38B which make up the fifth segment. It should be noted that the Halt control in position 38A is ineffective to short out Operate relay K1 because contacts K2a2 have not been closed.

When the wipers reach positions 39A and 39B, the starting position for the sixth "segment," the "hunting" will terminate and the stepping switch magnet will be shorted by the circuit over Start 5B terminal until relay K2 has been energized by the circuit over Start 5A terminal and the closed carriage position contacts SC11a5. The punching of the "+" sign and the amount data from rows 6, 5, 4, 3, 2 and 1 is effected in the same manner as for the other "segments" as the stepping switch steps through the positions programmed for this "segment."

If it is not desired to use the "void" or correction feature in connection with this frame of information, the positions 47A and 47B which are connected to proper terminals in section 725 of the terminal board are connected by plugboard connectors in the form board to the terminals in Reset section 758 of the terminal board 611, which in this operation serve the purpose of the Halt terminals as well as Reset terminals.

In the recording of the data from row 1, contacts SC6b1 open to deenergize the stepping switch magnet to cause the wipers to move to positions 47A and 47B and upon reclosing of these contacts the stepping switch magnet is reenergized over contacts K4bd15 and K2ad13. Reenergization of the stepping switch magnet closes contacts SS1a1 to apply potential to the wipers.

The circuit over the lower terminal (Fig. 36B) of the Reset section 758 of the terminal board is ineffective at this time since contacts K2bd4 are open.

The circuit over the upper terminal (Fig. 36B) of the Reset section 758 of the terminal board extends over contacts K4bd14 to Reset relay K4 and energizes the relay which closes a holding circuit for itself over contacts K4ad14 and the "off-normal" contacts SS1a3 which are closed in all positions except home position of the switch.

Contacts K4a4 are closed to apply a short over contacts K2a2 to deenergize Operate relay K1.

Contacts K4a13 close to complete a shorting circuit for the stepping switch magnet over contacts K2ad4 to cause the stepping switch magnet to be deenergized and move the wipers off positions 47A and 47B.

Contacts K4ad5 close to connect the energizing circuit for the stepping switch magnet to the "off-normal" contacts SS1a3 so that potential will still be applied to the magnet even after the contacts K1a5 open to remove potential from conductor 814.

Contacts K4bd15 open the circuit to the wipers and contacts K4bd5 open the normal energizing circuit for the stepping switch magnet.

Contacts K4b1 open the return circuit for the punch selector magnets to disable punching during the resetting of the stepping switch, and also open the circuit for the transfer relay K5 to prevent the energization of this relay in the reset operation.

Contacts K4bd14 open the original energizing circuit for relay K4.

Contacts K4b2 open to disable the various Start B terminals.

When Operate relay K1 was deenergized by the short applied over contacts K4a4, it opened contacts K1a5 to remove potential from the holding circuit for Record relay K2, allowing relay K2 to be deenergized to open contacts K2a2 and K2ad4 to remove the shorts from relay K1 and the stepping switch magnet.

The stepping switch will now be stepped to "home" position by the circuit over "off-normal" contacts SS1a3, K4ad5, self-interrupter contacts SS1b4, and K3b11, the stepping being terminated when the switch reaches "home" position and contacts SS1a3 open.

The opening of contacts SS1a3 also opens the holding circuit for Reset relay K4, which is deenergized.

The recording of the "frame" of data has been completed and the apparatus has been restored to condition to begin the recording of the next frame of data.

When the apparatus is to be used with the "void" feature, then provision must be made to punch a Void symbol in the tape at the end of the "frame" in "void" operations. This is accomplished by connecting the next position following the sixth "segment" to the Halt terminal. In the instant embodiment, this means that position 47A or 47B will be connected through form board connectors to the Halt terminal; positions 48A and 48B will be connected through form board connectors to terminals in the Void section 757 of terminal board and positions 49A and 49B will be connected through form board connectors to terminals in the Reset section 758 of the terminal board 611.

The Void Key 123 (Figs. 1, 3 and 5) is used whenever an error has been made and a correction procedure is required. It can be operated in conjunction with any accounting machine operation during the punching of a "frame" of information. The operation of this key will cause the normal recording process to be modified to punch a Skip symbol as each one of the remaining "segments" is by-passed, will cause a Void symbol to be punched at the end of the frame and will cause the Void counter 409 in the accounting machine to be operated.

When the Void Key is operated, the stud 309 thereon will prevent the cycling of the recorder control cam shaft 261 as explained earlier. The Void Key also will close contacts SC9a1 in the circuit to the Void relay K7 and will close contacts SC9a2 in the energizing circuit for solenoid L11.

During the operation of the accounting machine, the normal Record contacts SC1a1 will not be closed because the operation of shaft 261 has been disabled but contacts SC8a1 which are operated by the cam 395 (Fig. 12) driven directly from the main cam line of the accounting machine will close and complete the energizing circuit to relay K7 and to the "Non Rec" lamp 94 at the left of the keyboard of the accounting machine.

During the operation of the accounting machine contacts SC8a2 also will be closed by the cam 395 which is driven from the main accounting machine drive and will energize the solenoid L11 to cause a value of "one" to be entered in the counter 409. The count is used to keep an account of the number of Void operations which have taken place during a desired period of operation.

During this operation of the accounting machine the Void key 123 will be released by the usual key release action but the controls set up by relay K7 will be maintained because relay K7 closes a holding circuit for itself over contacts K7a14 and the carriage controlled contacts SC11b16. Contacts SC11b16 are normally closed but, as explained previously, are opened under control of a lug 323 in position 16 on the rear stop 321 when the carriage is in position to begin a new line of recording on the invoice, that is, the position where the stop (1) is in controlling position. This insures that the Void controls will remain effective throughout the "frame."

Relay K7 opens and closes various ones of its related contacts to provide the necessary controls in the Void operation.

Contacts K7b1 open to prevent relay K1 from being energized by the closure of contacts SC1a1 in subsequent accounting machine operations until the end of the "frame" is reached and the Void symbol is to be punched.

Contacts K7a5 close to by-pass contacts K1a5 to supply potential to conductor 814 from conductor 810 over the "off-normal" contacts SS1a3 and enable the stepping switch to operate in a "hunting" operation.

In the "hunting" operation, potential will be applied to the wipers and the stepping switch will continue to hunt until it encounters a position which is programmed as a Start position. As soon as it reaches this position a circuit will be completed over the Start B terminal, contacts K4b2, K6bd4, rectifier 819, contacts K6b11 and K2bd4 to apply a short to the stepping switch magnet to prevent further stepping of the switch. This circuit over Start B terminal is also effective to energize the Skip Encode relay K6 to cause a Skip symbol to be punched in the tape and also to cause the short to the stepping switch to be interrupted as explained earlier herein, allowing the stepping switch to move from the Start terminal and resume its hunting operation.

Contacts K7b11 open to prevent the Record relay K2 from being energized when the stepping switch moves into a Start position and the proper contact SC11a1 to SC11a15 has been operated. Contacts K7b11 also interrupt the shorting circuit for the Skip Encode relay K6 to cause a Skip symbol to be punched for each "segment" which is by-passed even though the carriage position switch has been closed.

Since relays K1 and K2 are not energized in these operations the Halt control is ineffective and the stepping switch will "hunt" through the various positions making up the "frame," stopping only momentarily at the Start position for each "segment" to enable the Skip symbol to be punched in the tape. Inasmuch as the relay K2 is prevented from being energized throughout the remainder of the "frame" after the Void Key has been operated, no data will be punched for the remaining "segments" but a Skip symbol will be punched for each by-passed "segment" of the "frame."

The stepping switch will continue to "hunt" until it reaches positions 48A and 48B which positions are connected over form board connectors to supply potential to the terminals in the Void section 757 of terminal board 611 to cause the Void symbol to be punched in the tape.

The Void symbol is punched under the joint control of the Operate relay K1, the Void relay K7 and the Skip Encode relay K6 as follows.

Potential applied to the right terminal of the Void section 757 (Fig. 36B) is applied over contacts K7a3 and K6bd4 and point 818 to one side of Skip Encode relay K6 and from point 818 over rectifier 819 and contacts K6bd11 and K2bd4 to short the stepping switch magnet. At the same time potential applied to the left terminal (Fig. 36B) is applied over contacts K1b1, conductor 836, point 828, conductor 827 and point 826 to the other side of relay K6 to short out the relay and prevent it from operating.

Potential on the right terminal is also applied over contacts K7ac2 to relay K1 to energize relay K1 which, in turn, opens contacts K1b1 to remove the short from relay K6 to allow it to become energized.

Energization of relay K6 opens contacts K6bd11 to remove the short from the stepping switch magnet SS1 to allow the magnet to be energized and close contacts SS1a2.

With relays K6, K7 and K1 energized, the circuit over contacts SS1a2 (Fig. 36D) will be continued over two branches, one branch over contacts K6a12, K1ac3 and K7ac4 to one of a pair of terminals in the Void symbol section 732 of plugboard 617, and the other branch over contacts K6a13, K1ac13 and K7ac12 to the other of the pair of terminals in the Void symbol section of the plugboard. These terminals are connected by plugboard connectors to proper terminals in section 727 of the plugboard to cause punch selector magnets PS6 and PS8 to be energized. The energized punch selector magnets will release their related selecting levers 634 (Fig. 31) to close contacts SC7a1 to energize clutch trip magnet L9 and cause the punching mechanism to cycle to punch the Void symbol.

During the punching of the Void symbol, contacts SC6b1 open to de-energize the stepping switch magnet to cause the wipers to move to positions 49A and 49B which are connected by connectors in the form board to the terminals of the Reset section 758. Contacts SC6b2 open the holding circuit for relay K6.

When the wipers move to their 49A and 49B positions Reset relay K4 will be energized to cause the various relays and the stepping switch to be restored to their normal or starting condition as previously explained. Void relay K7 will remain energized until the carriage is shifted completely to the right to the position where stop (1) (Figs. 35A and 35B) is in control to enter the first data on a new line on the invoice, in which operation contacts SC11b16 will open to interrupt the holding circuit for relay K7.

If the apparatus is programmed for the Void feature and the Void Key is not operated during the punching of a "frame" of data, the punching of the "frame" of data will take place in the usual manner. The Halt control for the sixth "segment" will arrest the stepping switch and will not allow it to hunt for further steps in the program. The stepping switch will remain in this position until the next tape punching operation is called for by the accounting machine controls.

When the carriage has been moved to the right to begin a new line and the accounting machine is operated with stop (1) in controlling position, contacts SC11b16 will open as before but will have no effect since relay K7 was not energized, and contacts SC1a1 will close to initiate a tape recording operation.

Closure of contacts SC1a1 will cause relay K1 to be energized to close contacts K1a5 to start the stepping switch hunting. The switch will pass through positions 48A and 48B without punching a Void symbol since relay K7 has not been energized, and, in positions 49A and 49B will apply potential to the terminals in Reset section 758.

The circuit over the lower terminal in Reset section 758 (Fig. 36B) will short out the stepping switch magnet over contacts K2bd4 and K6bd11 to momentarily arrest the "hunting" movement of the switch to insure that the Reset relay K4 will be energized.

The circuit over the upper terminal in Reset section 758 (Fig. 36B) will energize relay K4 which will open contacts K4bd15 to remove potential from the wipers, thereby removing the short from the stepping switch magnet. The resetting operation takes place as previously explained, the relay K4 remaining energized over the "off-normal" contacts SS1a3 until the stepping switch reaches home position.

Since the operation of the accounting machine which started the hunting and resetting operations of the stepping switch was the one which called for the punching of the first "segment" of the next "frame" on the tape, the stepping switch will not stop in home position but will resume "hunting" after the reset operation and will continue hunting until the first start position is reached. The controls will then be effective to control the punching of the first "segment" of the new "frame" in the manner previously described. The remaining "segments" of the "frame" will be recorded in the usual manner as the various items are recorded on the invoice.

In certain accounting systems, it may be desired to distinguish certain "frames" of information from other "frames" of information in order that they may be segregated at a later time.

The apparatus is provided with controls for bringing about the recording of a special "S" symbol at the end of a "frame" under control of a special symbol key 122 (Figs. 1, 3 and 5), "S," on the accounting machine keyboard. This key can be operated as an incident to any accounting machine operation and will cause a control relay K8 to be energized to maintain the control effective until the end of the frame is reached.

The "S" Key closes contacts SC2a1 (Figs. 5 and 36A) in the circuit to relay K8, which circuit is completed when contacts SC8a1 close in the operation of the accounting machine. Relay K8 closes contacts K8a1 to provide a holding circuit for itself over carriage controlled contacts SC11b16 which open only when the paper carriage is in its right-most position to begin the recording of a new line of data on the invoice; that is, the relay K8 will remained energized throughout the recording of a "frame" of information and will be released only when the recording of a new "frame" is started.

The program for recording with the provision for the "S" symbol is substantially the same as that for recording data without the Void feature. The various steps through the recording of the last digit of the last "segment" of the "frame" are the same but the "A" and "B" positions of the stepping switch which follow the last digit position are connected by plugboard connectors in the form board to terminals in the "S" symbol section 755 (Fig. 36D) of the terminal board 611. One of the terminals "A" or "B" of the next position of the stepping switch is connected by a form board connector to a Halt terminal and the following "A" and "B" positions are connected by form board connectors to terminals in the Reset section 758.

When relay K8 is energized, the terminals in the "S" symbol section 755 of the terminal board (Fig. 36D) are connected over contacts K8ad12 and K8ad2 to terminals in section 728 of plugboard 617, which terminals are connected by plugboard connectors to terminals in the section 727 of the plugboard which are connected to punch selector magnets PS5 and PS6. These magnets control the punching apparatus to punch the "S" symbol in channels 5 and 6 of the tape at the end of the "frame" if the "S" Key had been operated at any time during the punching of the "frame" of information.

If relay K8 has not been energized, the terminals in the "S" section 755 of the terminal board are connected over contacts K8bd12 and K8bd2 to the "S alt." section 729 of the plugboard board 617, which terminals can, if desired, be connected to punch selector magnets PS6 and PS7 to cause a special "S alt." symbol to be punched in the tape to indicate that the "S" Key had not been operated, or one of the terminals can be connected to a "Step" terminal in section 737 of the plugboard 617 to cause the stepping switch to be advanced to the Halt terminal without punching anything on the tape.

In either case, the Halt and Reset operations will follow the punching of the "frame" of data as explained earlier and the apparatus will be made ready for the recording of another frame of data on the tape.

In the accounting problem given above to explain the operation of the apparatus, only forty-nine positions of the stepping switch were used but, as explained earlier, the program controls have a capacity of one hundred and two positions. Levels 1 and 3 of the stepping switch provide positions 1A—1B to 51A—51B and when additional positions are needed the following controls become operative to render levels 2 and 4 effective to provide positions 52A—52B to 102A—102B.

When the wipers of levels 1 and 3 are advanced from positions 51A and 51B they engage positions X1A and X1B. The circuit over position X1A extends over contacts K5bd2 to the Transfer relay K5 and thence over contacts K4b1 to conductor 811, causing relay K5 to be energized.

Relay K5 closes contacts K5ad2 to complete a holding circuit for itself from conductor 810. This holding circuit will maintain relay K5 energized until the Reset relay K4 is energized and opens contacts K4b1.

The circuit over position X1B extends over conductor 838 to supply a short to the stepping switch magnet over contacts K6bd11 and K2bd4. This circuit will be effective to cause the stepping switch to stop momentarily in positions X1A and X1B if it is in a hunting operation to insure that relay K5 is energized. If positions X1A and X1B are encountered in a recording operation this shorting circuit will not be effective because contacts K2bd4 will be open, but in a recording operation the stepping switch is moving at a slower rate of speed and there will be ample time for relay K5 to be energized.

Energization of relay K5 closes contacts K5a1 (Fig. 36B) to by-pass "off-normal" contacts SS1a3 to allow completion of Void operations when the program exceeds 51 steps.

When relay K5 is energized it opens contacts K5bd12 and K5bd11 to remove potential from the wipers of levels 1 and 3 respectively and closes contacts K5ad12 and K5ad11 to close circuits to the wipers of levels 2 and 4 to enable positions 52A—52B to 102A—102B to be available for programming.

When contacts K5ad11 close and potential is applied to wiper in level 4 in position X2B in a recording operation, a circuit is completed over conductor 830, point 831, conductor 832 and contacts K2a3 to energize relay K3 and open contacts K3b11 to step the stepping switch to positions 52A—52B to continue the recording operation.

The programming of positions 52A and 52B to 102A and 102B is done in the same manner as the programming of positions 1A and 1B to 51A and 51B explained above.

As explained earlier herein, certain amounts are indicated as plus or minus amounts by being preceded on the tape by symbols representing either a + or a — sign. The recording apparatus is provided with controls by which signs preceding amounts can be reversed when necessary, as when negative totals are being punched or when reverse or corrective entries are being made in the accounting machine under control of the "R" key.

The reversal of signs is effected under control of a Sign Control relay K9 which can be energized under control of the overdraft contacts SC3a1 (Figs. 4 and 36A) which are closed in negative total or sub-total taking operations and under control of the "R" key contacts SC4a1 (Fig. 36A) which are closed when the "R" key 121 (Fig. 3) is operated. With either of the contacts SC3a1 or SC4a1 closed the circuit to relay K9 will be completed when the Start Record contacts SC1a1 close in the accounting machine operation.

Relay K9 closes a holding circuit for itself over contacts K9a13, conductor 814 and contacts K1a5 to maintain the relay energized during the recording of a "segment" of information.

When relay K9 is energized, it opens contacts K9bc1 and K9bc2 which normally connect the "Normally +" terminals in section 749 of terminal board 611 to the "+ Sign" terminals in section 750 of terminal board 611 and closes contacts K9ac1 and K9ac2 to connect the "Normally +" terminals to the "— Sign" terminals in section 752 of terminal board to cause the "— Sign" to be punched instead of the "+ Sign." Similarly contacts K9bc11 and K9bc12 will open to disconnect the "Normally —" terminals in section 751, of terminal board 611 from the "— Sign" terminals in section 752 of the terminal board, and contacts K9ac11 and K9ac12 will connect the "Normally —" terminals to the "+ Sign" terminals in section 750 of the terminal board to cause the "+ Sign" to be punched instead of the "— Sign."

The relay K9 will be de-energized when relay K1 is de-energized and opens contacts K1a5 at the end of the recording of a segment on the tape.

The recording apparatus is provided with terminals in section 760 of the terminal board 611 and terminals in section 738 of the plugboard 617 which are connected to the punch clutch trip magnet L9, which terminals can be selectively connected to other terminals in the terminal board or plugboard to cause an operation of the punching mechanism to punch sprocket or feed holes in the tape without punching data when it is desired to provide spacing between data punching.

It is to be understood that the invention is not limited to the particular punching program which is set forth in detail above as a means to explain the various functions of the apparatus, but rather is capable of many variations in programming. Changes in punching programs can readily be effected by substituting one form board wired according to one program for another wired according to another program and by changing the control stops at the rear of the carriage.

While the form of invention shown and described herein is admirably adapted to fulfill the objects primarily stated, it is to be understood that it is not intended to confine the invention to the form or embodiment disclosed herein, for it is susceptible of embodiment in various other forms.

What is claimed is:

1. In an apparatus for printing information in columnar form on record material and for punching related "frames" of data, each "frame" being made up of a series of "segments," the combination of a data-entry machine having a laterally movable carriage capable of holding record material to be printed upon in various columnar positions and settable to different lateral positions when the different "segments" are to be recorded, said machine also having switching means differentially settable in various operations of the data-entry machine according to data to be recorded in the several "segments"; punching mechanism of the step-by-step type for punching data under control of said switching means; programming means operable to provide a plurality of sub-programs, each sub-program controlling the punching of a "segment" and providing the controls for the punching mechanism from the data switches in the data-entry machine in a number of steps according to the length of the "segment" to be punched; a plurality of switch-actuating means on the carriage; carriage position switches arranged to cooperate with the switch-actuating means in different lateral positions of the carriage; means controlled by operation of the data-entry machine for causing certain of the carriage position switches to be closed under control of the switch-actuating means after the carriage has been set; and circuits in the programming means controlled by the carriage position switches to select punching sub-programs according to the lateral positions of the carriage.

2. In an apparatus for printing information in columnar form on record material and for punching related "frames" of data, each "frame" being made up of a plurality of "segments" recorded in a predetermined sequence, the combination of a data-entry machine having a laterally movable carriage capable of holding record material to be printed upon in various columnar positions and settable in different lateral positions in different operations of the data-entry machine when different "segments" are to be recorded, said machine also having switching means settable in various operations of the data-entry machine according to the data to be recorded in the several "segments"; punching mechanism of the step-by-step type for punching data under control of said switching means; programming means operable to provide a plurality of sub-programs, the sub-programs controlling the punching of the "segments" and providing the necessary number of steps of control required for the punching of the various "segments"; a plurality of switch-actuating means on the carriage; carriage position switches arranged to cooperate with the switch-actuating means in different lateral positions of the carriage; means controlled by operation of the data-entry machine for causing certain of the carriage position switches to be closed under control of the switch-actuating means after the carriage has been set; circuits in the programming means controlled by the carriage position switches to select the punching sub-programs according to the lateral positions of the carriage; and means controlled by the circuits in the programming means for controlling the punching mechanism to punch a special Skip symbol if any "segment" is skipped in the recording of the "frame" of data.

3. In an apparatus for punching "frames" of data, each "frame" being made up of a plurality of "segments" recorded in a predetermined sequence, the combination of a data-entry machine having a laterally movable carriage settable in different lateral positions in different operations of the data-entry machine when different "segments" are to be recorded, and having switching means settable in various operations of the data-entry machine according to the data to be recorded in the several "segments"; punching mechanism of the step-by-step type for punching data under control of said switching means; programming means operable to provide a plurality of sub-programs, the sub-programs controlling the punching of the "segments" and providing the necessary number of steps of control required for the punching of the various "segments"; carriage position switches selectively closed under control of the carriage in different lateral positions thereof; circuits in the programming means controlled by the carriage position switches to select the punching sub-programs according to the lateral positions of the carriage; a Void key in the data-entry machine operable in any operation of the machine before the completion of the recording of a "frame" of data; and means operated under control of the Void key for modifying the control by the programming means to prevent the punching of the remaining "segments" of the "frame" and to control the punching mechanism to punch a special Void symbol at the end of the "frame" to signal that any data which was punched in the "frame" prior to the operation of the Void key is to be disregarded.

4. In an apparatus for punching "frames" of data, each "frame" being made up of a plurality of "segments" recorded in a predetermined sequence, the combination of a data-entry machine having a laterally movable carriage settable in different lateral positions in different operations of the data-entry machine when different "segments" are to be recorded, and having a plurality of switching means differentially settable in the various operations of the data-entry machine according to the data to be recorded in the several "segments"; punching mechanism of the step-by-step type for punching data under control of said switching means; programming means operable to provide a plurality of punching sub-programs for punching the "segments," the sub-programs providing the necessary connections to enable the required number of data switches to control the punching mechanism in the desired sequence according to the "segment" to be punched; carriage position switches selectively closed under control of the carriage in different lateral positions of the carriage; circuits in the programming means controlled by the carriage position switches to select the punching sub-programs according to the lateral positions of the carriage; means controlled by the circuits in the programming means for controlling the punching mechanism to punch a Skip symbol if any segment is skipped in the recording of the "frame" of data; a Void key in the data-entry machine operable in any operation of the machine before the completion of the recording of the "frame" of data; and means operated under control of the Void key for modifying the control by the programming means to prevent the punching of the remaining "segments" of the "frame" and for controlling the punching means to punch a Void symbol at the end of the "frame"; said means which are controlled by the circuits in the programming means operating to cause the punching of a Skip symbol for each "segment" which was not punched after the Void key was operated.

5. In an apparatus for punching "frames" of data, each "frame" being made up of a series of "segments," the combination of a data-entry device including switching means settable according to data to be punched; punching mechanism of the step-by-step type for punching data under control of said switching means; programming means for controlling the punching of the "frames" of data, said programming means including a sequentially operable control device operable step-by-step, and including Start and Halt controls cooperating with the sequentially operable device to define sub-programs for recording the "segments," each sub-program including a Start control, a number of read-out controls for enabling the required ones of the switching means to control the punching means to punch the data for the "segment," and a Halt control, and the sub-programs making up the "frame" of data following one after another in series; means to initiate the punching of a "segment" of data; hunting means set into operation by the initiating means for causing the sequentially operable means to operate and "hunt" for a Start control; means operable when the sequentially operable means finds a Start control for terminating the hunting operation, for causing a punching operation to take place and for causing the sequentially operable means to advance as punching progresses; and means operable when the sequentially operable means cooperates with the Halt control for terminating the punching operation for the segment; a subsequent operation of the initiating means rendering the hunting means effective again to cause the sequentially operable means to hunt for the Start control of the next sub-program directly from the Halt control of the preceding sub-program.

6. In an apparatus for punching "frames" of data, each "frame" being made up of a series of "segments," the combination of a data-entry device including switching means settable according to data to be punched; punching mechanism of the step-by-step type for punching data under control of said switching means; programming means for controlling the punching of the "frames" of data, said programming means including a sequentially operable control device operable step-by-step, and including Start and Halt controls cooperating with the sequentially operable device to define sub-programs for recording the "segments," each sub-program including a Start control, a plurality of read-out controls for enabling the required ones of the switching means to control the punching means to punch the data for the "segment," and a Halt control; means to initiate the punching of a segment of data; hunting means set into operation by the initiating means for causing the sequentially operable means to operate and "hunt" for a Start control; means operable when the sequentially operable means cooperates with a Start control for terminating the "hunting" operation, for causing a punching operation to take place and for causing the sequentially operable means to advance as punching progresses; and means operable when the sequentially operable means cooperates with the Halt control for terminating the punching operation for the "segment"; said sub-programs being set up in the programming means serially so that upon each operation of the initiating means, the hunting means is rendered operable and causes the sequentially operable means to advance from the Halt control and "hunt" for the Start control for the sub-program for the next "segment" in the "frame."

7. In an apparatus for punching "frames" of data, each "frame" being made up of a series of "segments," the combination of a data-entry device including switching means settable according to data to be punched; punching mechanism of the step-by-step type for punching data under control of said switching means; programming means for controlling the punching of the "frames" of data, said programming means including a sequentially operable control device operable step-by-step from a home position, and including Start and Halt controls cooperating with the sequentially operable device to define sub-programs for recording the "segments," each sub-program including a Start control, a number of readout controls for enabling the required ones of the switching means to control the punching means to punch the data for the "segment," and a Halt control; means to initiate the punching of a "segment" of data; hunting means set into operation by the initiating means for causing the sequentially operable means to operate and "hunt" for a Start control; means operable when the sequentially operable means cooperates with a Start control, for terminating the "hunting" operation, for causing a punching operation to take place and for causing the sequentially operable means to advance as punching progresses; means operable when the sequentially operable means cooperates with the Halt control for terminating the punching operation for the segment; said sub-programs being set up in the programming means serially so that upon each operation of the initiating means, the hunting means is rendered operable and causes the sequentially operable means to advance from the Halt control and "hunt" for the Start control for the sub-program for the next "segment" in the "frame" and means controlled by the programming means and operable after the last "segment" of the "frame" has been punched, for returning the sequentially operable means to its home position.

8. In an apparatus for punching "frames" of data, each frame being made up of a series of "segments," the combination of a data-entry device including switching means settable according to data to be punched; punching mechanism of the step-by-step type for punching data under control of said switching means; programming means for controlling the punching of the "frames" of data, said programming means including a sequentially operable control device operable step-by-step, and including Start and Halt controls cooperating with the sequentially operable device to define sub-programs for recording the data for the "segments," each sub-program including a Start control, a plurality of read-out controls for enabling the required ones of the switching means to control the punching means to punch the data for the "segment," and a Halt control, and the sub-programs making up the "frame" of data being programmed serially; auxiliary control means cooperable with the Start controls of the several sub-programs to control whether or not the Start controls will be effective to cause the punching of the "segment" of data; means to initiate the punching of a segment of data; hunting means set into operation by the initiating means for causing the sequentially operable means to operate and "hunt" for an effective Start control; means operable when the sequentially operable means finds an effective Start control for terminating the hunting operation, for causing a punching operation to take place and for causing the sequentially operable means to advance as punching progresses; and means operable when the sequentially operable means cooperates with the Halt control for terminating the punching operation for the segment; a subsequent operation of the initiating means rendering the hunting means effective to cause the sequentially operable means to hunt for the next effective Start control.

9. In an apparatus for punching "frames" of data, each frame being made up of a series of "segments" the combination of a data entry device including switching means settable according to data to be punched; punching mechanism of the step-by-step type for punching data under control of said switching means; programming means for controlling the punching of the "frames" of data, said programming means including a sequentially operable control device operable step-by-step, and including Start and Halt controls cooperating with the sequentially operable device to define sub-programs for recording the "segments," each sub-program including a Start control, a plurality of read-out controls for enabling the required ones of the switching means to control the punching means to punch the data for the "segment," and a Halt control, and the sub-programs making up the "frame" of data being programmed serially; auxiliary control means cooperable with the Start controls of the several sub-programs to control whether or not the Start controls will be effective to cause the punching of the "segment" of data; means to initiate the punching of a "segment" of data; hunting means set into operation by the initiating means for causing the sequentially operable means to operate and "hunt" for an effective Start control; means operable when the sequentially operable means finds an effective Start control for terminating the "hunting" operation, for causing a punching operation to take place and for causing the sequentially operable means to advance as punching progresses; means operable when the sequentially operable means cooperates with the Halt control for terminating the punching operation for the "segment"; and means operable when the sequentially operable means finds an ineffective Start control for causing a special symbol to be punched to indicate that the "segment" has been skipped, for preventing punching operations throughout the skipped sub-program and for rendering the Halt control ineffective.

10. In an apparatus for punching "frames" of data, each frame being made up of a series of "segments," the combination of a data-entry device including switching means settable according to data to be punched; punching mechanism of the step-by-step type for punching data under control of said switching means; programming means for controlling the punching of the "frames" of data, said programming means including a sequentially operable control device operable step-by-step, and including Start and Halt controls cooperating with the sequentially operable device to define sub-programs for recording the "segments," each sub-program including a Start control, a plurality of read-out controls for enabling the required ones of the switching means to control the punching means to punch the data for the "segment," and a Halt control, and the sub-programs making up the "frame" of data being programmed serially; auxiliary control means cooperable with the Start controls of the several sub-programs to control whether or not the Start controls will be effective to cause the punching of the "segment" of data; means to initiate the punching of a "segment" of data; hunting means set into operation by the initiating means for causing the sequentially operable means to operate and "hunt" for an effective Start control means operable when the sequentially operable means finds an effective Start control for terminating the "hunting" operation, for causing a punching operation to take place and for causing the sequentially operable means to advance as punching progresses; means operable when the sequentially operable means cooperates with the Halt control for terminating the punching operation for the segment; means operable when the sequentially operable means finds an ineffective Start control for controlling the punching mechanism to cause a special symbol to be punched to indicate that the "segment" has been skipped, for preventing punching operations throughout the sub-program and for rendering the Halt control ineffective; and Void control means operable at any desired time during the punching of a "frame" of data for rendering the effective Start controls ineffective thereby to cause all sub-programs to be skipped and special symbols to be punched to indicate that the segments have been skipped, and for controlling the punching mechanism at the end of the recording of the "frame" of data, to punch a further special symbol to indicate that the Void controls have been effective.

11. In an apparatus for punching "frames" of data, each "frame" being made up of a plurality of "segments" which may vary in length according to the data to be punched, the combination of a data-entry device including switching means settable according to data to be punched in various ones of the "segments"; punching mechanism of the step-by-step type for punching data under control of the switching means; programming means for controlling the punching of the "frames" of data, said programming means including a sequentially operable control device operable step-by-step, and including Start and Halt controls cooperating with the sequentially operable device to define sub-programs for recording "segments," each sub-program being only of a length required to punch the data for the "segment" and including a Start control, read-out controls for enabling the desired ones of the switching means to control the punching means in the desired sequence to punch the data for the "segment," the number of read-out controls varying with the length of the "segment," and a Halt control; means to initiate the punching of a "segment" of data; "hunting" means set into operation by the initiating means for causing the sequentially operable means to operate and "hunt" for a Start control; means operable when the sequentially operable means cooperates with a Start control for terminating the "hunting" operation, for causing a punching operation to take place and for causing the sequentially operable means to be advanced as punching progresses to render the read-out means operable in succession; and means operable when the sequentially operable means cooperates with the Halt control for terminating the punching operation for the "segment"; said sub-programs being set up in the programming means serially so that upon each operation of the initiating means, the "hunting" means is rendered operable and causes the sequentially operable means to advance from the Halt control of a sub-program and "hunt" for the Start control for the sub-program for the next "segment" in the "frame" until all of the "segments" making up the "frame" of data have been punched.

12. In an apparatus for punching "frames" of data, each frame being made up of a series of "segments," the combination of a data-entry device including switching means settable according to data to be punched; punching mechanism of the step-by-step type for punching data under control of said switching means; programming means for controlling the punching of the "frames" of data, said programming means including a stepping switch having a plurality of contacts and wipers which engage various ones of the contacts as the switch operates step-by-step, and including Start and Halt control circuits to define sub-programs for recording the "segments," each sub-program utilizing a Start control circuit, a plurality of read-out control circuits for enabling the required ones of the switching means to control the punching means to punch the data for the "segment," and a Halt control circuit; means for connecting Start control circuits, read-out control circuits and Halt control circuits to the contacts of the stepping switch according to the desired sub-programs which are necessary to punch the data for the "segments" making up the "frame," the connections connecting the controls for each sub-program to successive contacts of the stepping switch, with the sub-programs following one another in sequence; means to initiate the punching of a segment of data; "hunting" means set into operation by the initiating means for causing the stepping switch to operate and cause its wipers to "hunt" for a contact connected to a Start control circuit; means operable when the wipers cooperate with said Start control circuit for causing a punching operation to take place and to cause the stepping switch to cause its wipers to advance to cooperate with read-out control circuits as punching progresses; and means operable when the wipers cooperate with a Halt control circuit for terminating the punching operation for the "segment"; a subsequent operation of the initiating means rendering the "hunting" means effective to cause the stepping switch to drive its wipers to hunt for the next Start control circuit.

13. In an apparatus for punching "frames" of data, each frame being made up of a series of "segments," the combination of a data-entry device including switching means variably settable in a plurality of operations of the data-entry device according to data to be punched in the several "segments" and including a laterally positionable paper carriage which occupies a different lateral position during each operation of the data-entry device in supplying data controls for the punching of the several "segments"; punching mechanism of the step-by-step type for punching data under control of said switching means; programming means for controlling the punching of the "frames" of data, said programming means including a stepping switch having a plurality of contacts and wipers which engage various ones of the contacts as the switch operates step-by-step, and including Start and Halt control circuits to define sub-programs for recording the "segments," each sub-program utilizing a Start control circuit, a plurality of read-out control circuits for enabling the required ones of the switching means to control the punching means to punch the data for the "segment," and a Halt control circuit; means for connecting Start control circuits, read-out control circuits and Halt control circuits to the contacts of the stepping switch according to the desired sub-programs which are necessary to punch the data for the "segments" making up the "frame," the connection connecting the controls for each sub-program to successive contacts of the stepping switch, with the sub-programs following one another in sequence; auxiliary control means settable under control of the paper carriage and cooperable with the Start control circuits of the several sub-programs to control whether or not the Start control circuits of any particular sub-program will be effective to cause the punching of a "segment" with the carriage in a particular position; means in the data-entry device to initiate the punching of a segment of data as an incident to the operation of the data-entry device; "hunting" means set into operation by the initiating means for causing the stepping switch to operate and cause its wipers to "hunt" for a contact connected to an effective Start control circuit; means operable when the wiper co-operates with an effective Start control circuit for terminating the "hunting" operation, for causing a punching operation to take place and for causing the stepping switch wipers to advance and cooperate with read-out control circuits as punching progresses; means operable when the wiper cooperates with the Halt control circuit for terminating the punching operation for the "segment"; and means operable when the wipers engage contacts which are connected to ineffective Start control circuits, for causing a special Skip symbol to be punched to indicate that the "segment" has been skipped, for preventing punching operations throughout the skipped sub-program, and for rendering the Halt control circuit ineffective.

14. In an apparatus for punching "frames" of data, each frame being made up of a series of "segments," the combination of a data-entry device including switching means settable according to data to be punched; punching mechanism of the step-by-step type for punching data under control of said switching means; programming means for controlling the punching of the "frames" of data, said programming means including a stepping switch having a plurality of contacts and wipers which engage various ones of the contacts as the switch operates step-by-step, and including Start and Halt control circuits to define sub-programs for recording the "segments," each sub-program utilizing a Start control circuit, a plurality of read-out control circuits for enabling the required ones of the switching means to control the punching means to punch the data for the "segment," and a Halt control circuit; an insertable form board including connectors for connecting Start control circuits, read-out control circuits and Halt control circuits to the contacts of the stepping switch according to the desired sub-programs which are necessary to punch the data for the "segments" making up the "frame," the connections connecting the controls for each sub-program to successive contacts of the stepping switch, with the sub-programs following one another in sequence; means to initiate the punching of a segment of data; "hunting" means set into operation by the initiating means for causing the stepping switch to operate and cause its wipers to "hunt" for a contact connected to a Start control circuit; means operable when the wipers cooperate with said Start control circuit for causing a punching operation to take place and to cause the stepping switch to cause its wipers to advance to cooperate with read-out control circuits as punching progresses; and means operable when the wipers cooperate with a Halt control circuit for terminating the punching operation for the "segment"; a subsequent operation of the initiating means rendering the "hunting" means effective to cause the stepping switch to drive its wipers to hunt for the next Start control circuit.

15. In an apparatus for punching "frames" of data, each frame being made up of a series of "segments," the combination of a data-entry device including switching means variously settable according to data to be punched; punching mechanism of the step-by-step type for punching data under control of said switching means; programming means for controlling the punching of the "frames" of data, said programming means including a stepping switch having a plurality of contacts and wipers which engage various ones of the contacts as the switch operates step-by-step from a home position, and including Start and Halt control circuits to define sub-programs for recording the "segments," each sub-program utilizing a Start control circuit, a plurality of read-out control circuits for enabling the required ones of the switching means to control the punching means to punch the data for the "segment," the number of read-out circuits varying with the length of the segment, and a Halt control circuit; reset means for restoring the stepping switch to home position; an insertable form board including connectors for connecting the Start control circuits, the read-out control circuits, the Halt control circuits and the reset means to the contacts of the stepping switch according to the desired sub-programs which are necessary to punch the data for the "segments" making up the "frame," the connections connecting the controls for each sub-program to successive contacts of the stepping switch, with the sub-programs following one another in sequence, and connecting the reset means to become operative after the punching of the last "segment" of the "frame"; means to initiate the punching of a segment of data; "hunting" means set into operation by the initiating means for causing the stepping switch to operate and cause its wipers to "hunt" for contacts connected to Start control circuits; means operable when the wiper cooperates with a Start control circuit for causing a punching operation to take place and to cause the stepping switch to cause its wipers to advance to cooperate with read-out control circuits as punching progresses; and means operable when the wiper cooperates with the Halt control circuit for terminating the punching operation for the "segment"; said reset means becoming operative when the stepping switch moves past the controls for the last "segment" of the "frame" for restoring the stepping switch to home position in preparation for the punching of a new "frame" of data.

16. In an apparatus for punching "frames" of data, each frame being made up of a series of "segments," the combination of a data-entry device including switching means variably settable according to data to be punched in the several "segments" and including a laterally positionable paper carriage which occupies a different lateral position during the punching of each "segment" of the frame; punching mechanism of the step-by-step type for punching data under control of said switching means; programming means for controlling the punching of the "frames" of data, said programming means including a stepping switch having a plurality of contacts and wipers which engage various ones of the contacts as the switch operates step-by-step, and including Start and Halt control circuits to define sub-programs for recording the "segments," each sub-program utilizing a Start control circuit, a plurality of read-out control circuits for enabling the required ones of the switching means to control the punching means to punch the data for the "segment," and a Halt control circuit; means for connecting Start control circuits, read-out control circuits and Halt control circuits to the contacts of the stepping switch according to the desired sub-programs which are necessary to punch the data for the "segments" making up the "frame," the connections connecting the controls for each sub-program to successive contacts of the stepping switch, with the sub-programs following one another in sequence; auxiliary control means controlled by the paper carriage in the lateral positions thereof and cooperable with the Start control circuits of the several sub-programs to control the effectiveness of the Start control circuits and thereby coordinate the punching with the operation of the data-entry device; means in the data-entry device to initiate the punching of a segment of data; "hunting" means set into operation by the initiating means for causing the stepping switch to operate and cause its wipers to "hunt" for a contact connected to an effective Start control circuit; means operable when the wiper cooperates with an effective Start control circuit for causing a punching operation to take place and to cause the stepping switch to cause its wipers to advance to cooperate with read-out control circuits as punching progresses; and means operable when the wiper cooperates with the Halt control circuit for terminating the punching operation for the "segment"; a subsequent operation of the initiating means in a further operation of the data-entry device rendering the hunting means effective to cause the stepping switch to drive its wipers to hunt for the next effective Start control circuit.

References Cited in the file of this patent

UNITED STATES PATENTS

| | | |
|---|---|---|
| 1,843,772 | Lasker | Feb. 2, 1932 |
| 2,390,486 | Doty | Dec. 4, 1945 |
| 2,647,581 | Gardinor et al. | Aug. 4, 1953 |
| 2,684,719 | Johnson et al. | July 27, 1954 |

UNITED STATES PATENT OFFICE
CERTIFICATE OF CORRECTION

Patent No. 2,905,244                          September 22, 1959

Edgar H. Sonnanstine, Jr.

It is hereby certified that error appears in the printed specification of the above numbered patent requiring correction and that the said Letters Patent should read as corrected below.

Column 3, line 32, strike out "including switches which can be selectively closed" and insert instead -- for inter-relating the operation of a recorder with --; column 4, line 55, for "seelectively" read -- selectively --; column 9, line 40, for "withdrawn" read -- overdrawn --; column 22, line 43, for "plate", first occurrence, read -- plates --; column 23, line 72, for "260" read -- 269 --; column 28, line 33, for "318" read -- 319 --; line 46, for "324" read -- 325 --; column 46, line 11, for "feed" read -- feel --.

Signed and sealed this 8th day of March 1960.

(SEAL)
Attest:

KARL H. AXLINE                                        ROBERT C. WATSON
Attesting Officer                                     Commissioner of Patents